(12) United States Patent
Yoshiura et al.

(10) Patent No.: US 9,853,585 B2
(45) Date of Patent: Dec. 26, 2017

(54) MOTOR CONTROL APPARATUS, MOTOR CONTROL METHOD AND MOTOR CONTROL PROGRAM

(71) Applicant: Kabushiki Kaisha Yaskawa Denki, Kitakyushu-shi (JP)

(72) Inventors: Yasufumi Yoshiura, Kitakyushu (JP); Yasuhiko Kaku, Kitakyushu (JP); Takuhiro Suganuma, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/167,607

(22) Filed: May 27, 2016

(65) Prior Publication Data
US 2016/0359435 A1 Dec. 8, 2016

(30) Foreign Application Priority Data
Jun. 2, 2015 (JP) .................................. 2015-111930

(51) Int. Cl.
G05B 11/28 (2006.01)
H02P 23/18 (2016.01)
G05D 1/00 (2006.01)

(52) U.S. Cl.
CPC .............. *H02P 23/18* (2016.02); *G05D 1/00* (2013.01)

(58) Field of Classification Search
CPC .. H02P 6/17; H02P 21/18; H02P 21/20; H02P 6/08; H02P 6/16
See application file for complete search history.

(56) References Cited

U.S. PATENT DOCUMENTS

2012/0000189 A1* 1/2012 Wang .................... F01N 3/208
60/286

FOREIGN PATENT DOCUMENTS

| JP | 10-128812 A | 5/1998 |
|---|---|---|
| JP | 2009-141987 A | 6/2009 |
| WO | WO 2011/093281 A1 | 8/2011 |
| WO | WO 2012/008222 A1 | 1/2012 |

OTHER PUBLICATIONS

Office Action dated Jun. 1, 2017 in Japanese Patent Application No. 2015-111930 (with Machine English translation).

* cited by examiner

*Primary Examiner* — Karen Masih
(74) *Attorney, Agent, or Firm* — Oblon, McClelland, Maier & Neustadt, L.L.P.

(57) ABSTRACT

A control apparatus for controlling a motor performing pressure control includes circuitry which calculates a detected speed of a motor based on an input pressure command, sensor reaction force, movable part viscous damping force and movable part mass, outputs the detected speed, calculates the movable part viscous damping force by multiplying the detected speed by a movable part viscous damping coefficient to calculate the detected speed, calculates a detected position of the motor by integrating the detected speed, outputs the detected position, calculates a sensor viscous damping pressure by multiplying the detected speed by a sensor viscous damping coefficient, calculates a sensor spring pressure by multiplying the detected position by a sensor spring constant, calculates a detected pressure of a pressure sensor by adding the sensor spring pressure to the sensor viscous damping pressure, and outputs the sensor reaction force which is the detected pressure to calculate the detected speed.

20 Claims, 48 Drawing Sheets

MOTOR CONTROL APPARATUS, MOTOR CONTROL METHOD AND MOTOR CONTROL PROGRAM

CROSS-REFERENCE TO RELATED APPLICATIONS

The present application is based upon and claims the benefit of priority to Japanese Patent Application No. 2015-111930, filed Jun. 2, 2015, the entire contents of which are incorporated herein by reference.

BACKGROUND OF THE INVENTION

Field of the Invention

The present invention relates to a motor control apparatus, a motor control method and a motor control program.

Description of Background Art

Japanese Patent Laid-Open Publication No. HEI 10-128812 describes a control device that performs pressure feedback control by feeding back, to a pressure command, a detected pressure in a machine, the detected pressure being detected using a load cell.

Japanese Patent Laid-Open Publication No. 2009-141987 describes a motor control apparatus that performs position control and pressure control by switching over time between the position control and the pressure control by separately providing and switching a position control feedback loop and a pressure control feedback loop.

The entire contents of these publications are incorporated herein by reference.

SUMMARY OF THE INVENTION

According to one aspect of the present invention, a motor control apparatus for controlling a motor that performs pressure control includes circuitry which calculates a detected speed of a motor based on an input pressure command, a sensor reaction force, a movable part viscous damping force and a movable part mass, outputs the detected speed, calculates the movable part viscous damping force by multiplying the detected speed by a movable part viscous damping coefficient to calculate the detected speed, calculates a detected position of the motor by integrating the detected speed, outputs the detected position, calculates a sensor viscous damping pressure by multiplying the detected speed by a sensor viscous damping coefficient, calculates a sensor spring pressure by multiplying the detected position by a sensor spring constant, calculates a detected pressure of a pressure sensor by adding the sensor spring pressure to the sensor viscous damping pressure, and outputs the sensor reaction force which is the detected pressure to calculate the detected speed.

According to another aspect of the present invention, a motor control apparatus for controlling a motor that drives a control object with a pressure sensor includes circuitry which calculates a position deviation between a high-level position command that is externally input and a detected position of a motor that drives a control object, calculates a speed command based on the position deviation, calculates a speed deviation between the speed command and an output speed of the motor, calculates a torque command based on the speed deviation, inputs the torque command to the motor, calculates a pressure deviation between a high-level pressure command that is externally input and a detected pressure that is detected from a pressure sensor of the control object, calculates a position correction command based on the pressure deviation, and adds the position correction command to the high-level position command to calculate the position deviation.

According to another aspect of the present invention, a method for controlling a motor that drives a control object with a pressure sensor includes calculating a position deviation between a high-level position command that is externally input and a detected position of a motor that drives a control object, calculating a speed command based on the position deviation, calculating a speed deviation between the speed command and an output speed of the motor, calculating a torque command based on the speed deviation, inputting the torque command to the motor, calculating a pressure deviation between a high-level pressure command that is externally input and a detected pressure that is detected from a pressure sensor of the control object, calculating a position correction command based on the pressure deviation, and adding the position correction command to the high-level position command to calculate the position deviation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
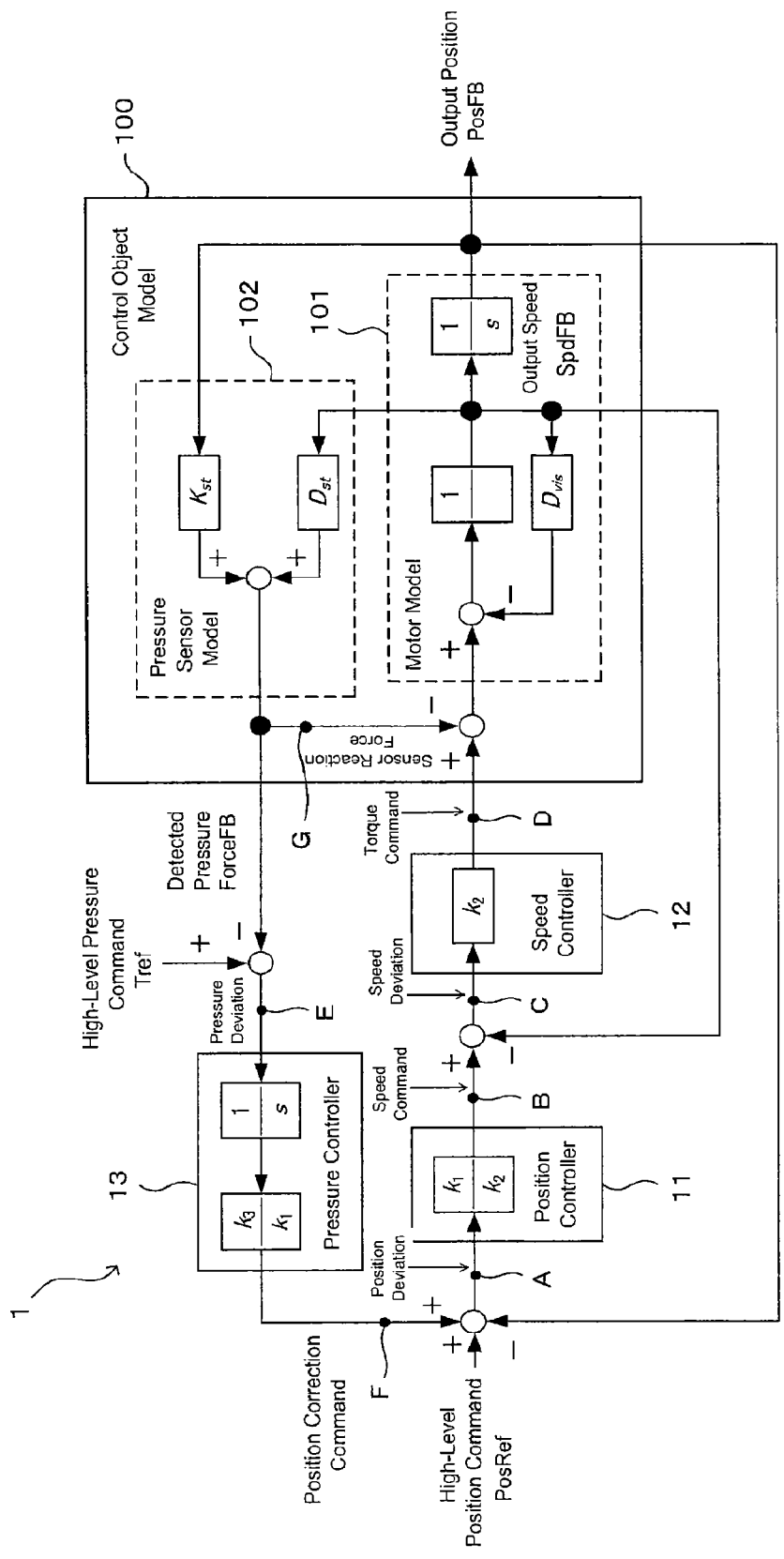
FIG. 1 is a block diagram illustrating a system structure of a servo amplifier that corresponds to a motor control apparatus of an embodiment.

The embodiments will now be described with reference to the accompanying drawings, wherein like reference numerals designate corresponding or identical elements throughout the various drawings.

Schematic Structure of Servo Amplifier

First, a schematic structure of a servo amplifier that corresponds to a motor control apparatus according to an embodiment of the present invention is described using FIG. 1. A servo amplifier 1 illustrated in FIG. 1 performs position control and pressure control in the same control block structure. That is, the servo amplifier 1 controls a rotation position of a motor (in this example, a rotary type motor; see FIG. 2 to be described later) and an output position of a movable part of a control machine that drives the motor, based on a high-level position command (PosRef) that is input from a high-level control device 2 (see FIG. 2 to be described later). On the other hand, the servo amplifier 1 controls an output pressure (in this example, a pressing force; see FIG. 2 to be described later) of the movable part, based on a pressure command (Tref) that is input from the same high-level control device 2. Illustration and description of the control block in the following are all presented in a transfer function form. In FIG. 1, the servo amplifier 1 of the present embodiment includes a position controller 11, a speed controller 12 and a pressure controller 13.

Based on a position deviation (see "A" in FIG. 1) that is a difference between the input high-level position command (PosRef) and an output position (PosFB) of the motor, the position controller 11 outputs a speed command (see "B" in FIG. 1) so as to reduce the position deviation. In the present embodiment, the position controller 11 is structured to perform so-called proportioning control in which a proportioning device is provided that multiplies the position deviation.

Based on a speed deviation (see "C" in FIG. 1) that is a difference between the speed command from the position controller 11 and an output speed (SpdFB) of the motor, the speed controller 12 generates a torque command (see "D" in FIG. 1) and outputs the torque command to the motor so as to reduce the speed deviation. In the present embodiment, the speed controller 12 is structured to perform so-called proportioning control in which a proportioning device is provided that multiplies the speed deviation.

Based on a pressure deviation (see "E" in FIG. 1) that is a difference between the input high-level pressure command (Tref) and a detected pressure (ForceFB) that is detected from a pressure sensor (see FIG. 2 to be described later) that is provided in the control machine, the pressure controller 13 outputs a position correction command (see "F" in FIG. 1) that is added to the high-level position command (PosRef) so as to reduce the pressure deviation. In the present embodiment, the pressure controller 13 is structured to perform so-called integral control in which an integrator is provided that integrates the pressure deviation.

The servo amplifier 1 of the present embodiment having the above-described structure has a three-loop structure that includes a feedback loop of a position control system, a feedback loop of a speed control system and a feedback loop of a pressure control system. That is, the servo amplifier 1 has a position control feedback loop in which, after the high-level position command is input from the high-level control device 2, a control signal is transmitted in the order of the position controller 11, the speed controller 12 and the motor, and the output position (PosFB) of the motor is fed back. Further, the servo amplifier 1 also has a speed control feedback loop in which a control signal is transmitted in the order of the speed controller 12 and the motor, and the output speed (SpdFB) of the motor is fed back. Further, the servo amplifier 1 has a pressure control feedback loop in which, after the high-level pressure command (Tref) is input from the high-level control device 2, a control signal is transmitted in the order of the pressure controller 13, the position controller 11, the speed controller 12 and the motor, and the detected pressure (ForceFB) that is detected from the control machine that is driven by the motor is fed back. In the present embodiment, in order to simplify the description, a current controller that outputs a drive current, for example, by PWM control, to the motor based on a torque command, and a feedback loop of a current control system that is provided inside the current controller are omitted.

An object that is controlled by the servo amplifier 1 of the present embodiment is a control machine (see FIG. 2 to be described later) such as a production machine that operates using the motor as a drive source. In FIG. 1, a mathematical model of the control machine is illustrated as a control object model 100 in a transfer function form. The control object model 100 mainly has a motor model 101 and a pressure sensor model 102. A value that is obtained by subtracting a sensor reaction force from a torque command that is input from the servo amplifier 1 is input to the motor model 101. The motor model 101 is a model that simulates a mathematical structure of the motor that includes a movable part mass of the control machine, and outputs the above-described output speed (SpdFB) and the above-described output position (PosFB) based on the input value. The pressure sensor model 102 is a model that simulates a mathematical structure of a pressure sensor (see FIG. 2 to be described later) that is provided in the control machine, and outputs the above-described detected pressure (ForceFB) based on the output speed (SpdFB) and the output position (PosFB) that are output from the motor model 101. The above-described sensor reaction force is a reaction force that is received by the motor from a pressure sensor in a pressure detection state, that is, is equivalent to the detected pressure (ForceFB) that is output from the pressure sensor (see "G" in FIG. 1).

Contents of the motor model 101 and the pressure sensor model 102, and contents of the proportioning devices and the integrator that are respectively provided in the position controller 11, the speed controller 12 and the pressure controller 13, will be described in detail later when mathematical analysis is described.

In the control machine such as a production machine, in a process until the pressure sensor that is provided in the movable part is brought into contact with a contact object, as will be described in detail later, it is desirable that the position control and the pressure control be performed by switching over time between the position control and the pressure control. In order to perform such switching between the position control and the pressure control, it is possible to adopt a structure in which a control block that has a position control feedback loop and a control block that has a pressure control feedback loop are separately provided in the servo amplifier 1 and the control blocks are separately switched. However, in this case, due to differences in block structures and various gains between the two feedback loops, linearity is not maintained. Therefore, depending on some condition, an impact occurs during the switching.

In contrast, the servo amplifier 1 of the present embodiment is integrally provided with the position control feedback loop, the speed control feedback loop and the pressure control feedback loop in the control block. On the high-level control device 2 side, a sequence is performed in which input of the high-level position command (PosRef) and input of the high-level pressure command (Tref) are switched using software. As a result, the position control and the pressure control can be performed in the same control block. Therefore, the above-described occurrence of an impact during the switching can be avoided.

Here, in a usual pressure control feedback loop, it is common to adopt a design in which, based on the pressure deviation, the pressure command that is generated by the pressure controller 13 is fed back to a torque command of the same dimension. However, even when pressure control is actually performed using the servo amplifier 1 that is so designed, it has been confirmed that a phenomenon occurs in which the motor and the movable part only clamp at a position of the high-level position command (PosRef) and pressure control due to pressing movement is not performed.

With respect to this phenomenon, the pressure command is regarded as merely a disturbance when viewed from the position control feedback loop, and position control is performed on the position control feedback loop side so as to offset the pressure command, and thus the motor and the movable part clamp at the position of the high-level position command (PosRef).

In contrast, in the present embodiment, as described above, in the pressure control feedback loop, the pressure controller 13 adds to the high-level position command (PosRef) a command that is generated based on the pressure deviation as a position correction command. As a result, the pressure control feedback loop performs the position control that reflects the pressure deviation via the position control feedback loop, and thus the above-described offsetting phenomenon can be avoided.

Application Example

Figure 2:
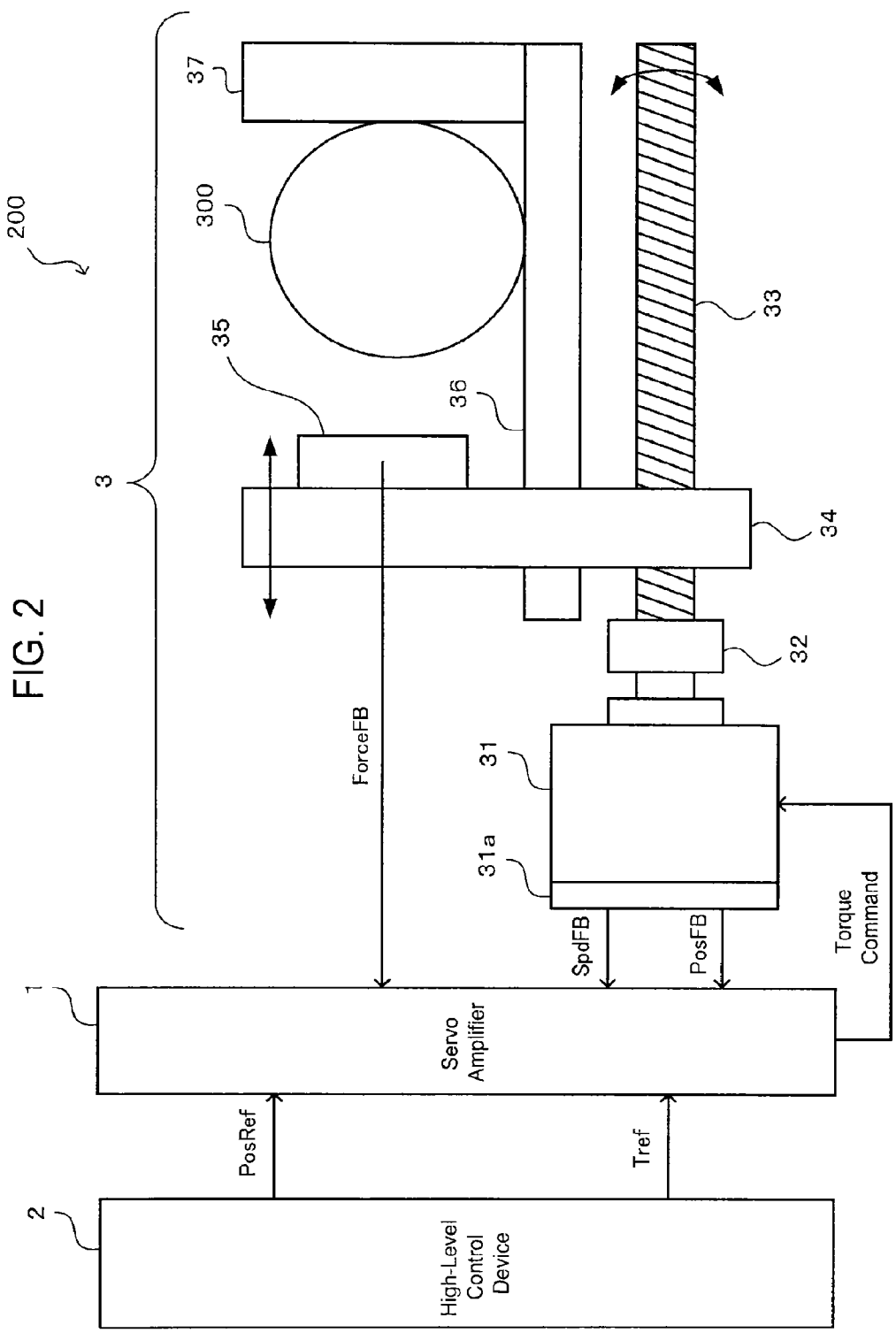
FIG. 2 illustrates an example of a specific structure of a pressure control system that is applied to the servo amplifier.

FIG. 2 illustrates an example of a specific structure of a pressure control system 200 that is applied to the above-described servo amplifier 1 of the present embodiment. The pressure control system 200 of the example illustrated in FIG. 2 mainly includes a high-level control device 2, a servo amplifier 1, and a control machine 3 that has a motor 31.

The high-level control device 2 is formed, for example, using a general-purpose personal computer or the like (not particularly illustrated in the drawings) that is provided with a CPU, a ROM, a RAM, an operation part, a display, and the like, and generates the above-described high-level position command (PosRef) and high-level pressure command (Tref) based on various settings and commands that are input from an operator via the operation part, and inputs the high-level position command (PosRef) and the high-level pressure command (Tref) to the servo amplifier 1.

The servo amplifier 1 generates a torque command based on the high-level position command (PosRef) and the high-level pressure command (Tref), which are input from the high-level control device 2, and inputs the torque command to the motor 31 of the control machine 3. In this case, feedback control of position and pressure is performed based on the output position (PosFB) and the output speed (SpdFB) that are output from an encoder (31a) (to be described later) that is provided in the motor 31 and the detected pressure (ForceFB) that is detected from a pressure sensor 35 (to be described later) that is provided in the control machine 3. A control block that is illustrated in FIG. 1 excluding the control object model 100 forms the servo amplifier 1.

In the example illustrated in FIG. 2, the control machine 3 is a machine that grips an object by sandwiching the object using two plate members, and operates to press-sandwich with a predetermined pressure an object 300 that has a fragile structure such as an egg so as to be able to reliably hold the object 300 without causing any damage to the object 300. A control block of the control object model 100 illustrated in FIG. 1 corresponds to the control machine 3. The control machine 3 has the motor 31, a coupling 32, a feeding screw 33, a movable plate 34, the pressure sensor 35, a seating 36, and a fixed plate 37.

In this example, the motor 31 is a motor of a rotary type. The feeding screw 33 is coupled via the coupling 32 to an output shaft of the motor 31. Further, the motor 31 is integrally provided with the encoder (31a). The encoder (31a) outputs, as the output position (PosFB), a rotation position of the output shaft of the motor 31, and further calculates the output speed (SpdFB), which is a rotational speed of the output shaft, by differentiating the output position (PosFB), and outputs the output speed (SpdFB).

The methods for detecting the output position (PosFB) and the output speed (SpdFB) can be embodied in various other forms. For example, it is also possible that the encoder (31a) outputs only the output position (PosFB), and the servo amplifier 1, to which the output position (PosFB) is input, calculates the output speed (SpdFB) by performing differentiation calculation. Or, it is also possible that the motor 31 is provided with a tachogenerator instead of the encoder (31a) and outputs the output speed (SpdFB), and the servo amplifier 1, to which the output speed (SpdFB) is input, calculates the output position (PosFB) by performing integration calculation.

The movable plate 34 is a plate member that is slidably coupled to the seating 36 (to be described later). The feeding screw 33 is screwed to an end portion of the movable plate 34. As a result, when the motor 31 rotates forward or backward, the movable plate 34 is driven via the feeding screw 33 to move forward or backward along a predetermined direction (left-right direction in FIG. 2) while in sliding contact with the seating 36.

The pressure sensor 35 is formed, for example, using a load cell, and is a sensor that detects as the detected pressure (ForceFB) a pressure that is applied from the outside in a thickness direction of the sensor. The pressure sensor 35 is affixed to a side surface of the movable plate 34 on one side in a movement direction.

The seating 36 is a member on an upper surface of which the object 300 is placed, and has the fixed plate 37 by fixing the fixed plate 37 on an extension line in the movement direction of the movable plate 34. As a result, the movable plate 34 moves in a direction approaching or away from the fixed plate 37 in a state in which a side surface on the side where the pressure sensor 35 is positioned opposes the fixed plate 37.

In the above-described structure, based on the output position (PosFB) and the output speed (SpdFB) that are output from the encoder (31a), the servo amplifier 1 performs position feedback control in which the motor 31 is controlled such that the position of the movable plate 34 follows the high-level position command (PosRef). Further, based on the detected pressure (ForceFB) that is detected from the pressure sensor 35, the servo amplifier 1 also performs pressure feedback control in which the motor 31 is controlled such that the movable plate 34 presses against the object 300 according to the high-level pressure command (Tref).

Operation Process

Figure 3:
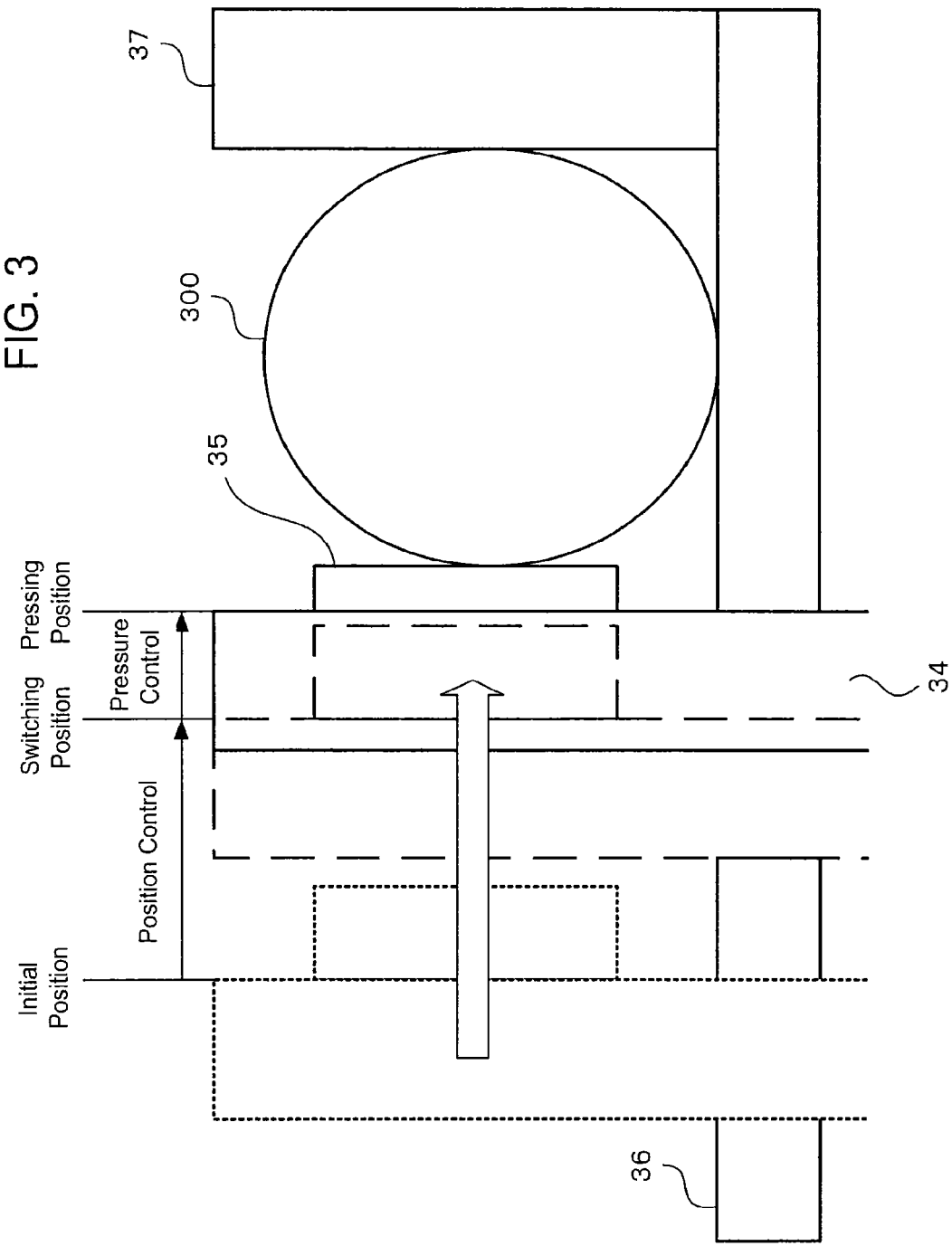
FIG. 3 is an enlarged view around a seating of a control machine and describes a specific operation process of the pressure control system.

FIG. 3 is an enlarged view around the seating 36 of the control machine 3. A specific operation process of the pressure control system 200 is described using FIG. 3. In the example illustrated in FIG. 3, first, the object 300 is placed on the seating 36 while in contact with the fixed plate 37. In this state, the movable plate 34 that is positioned at an initial position that is spaced apart from the object 300 moves toward the object 300 side (right side in FIG. 3), and at a contact position (not illustrated in the drawings), the pressure sensor 35 becomes in contact with the object 300. By further moving the movable plate 34 from the contact position toward the object 300 side, the pressure sensor 35 is pressed against the object 300 and outputs a detected pressure. By moving the movable plate 34 to a pressing position at which the detected pressure and the high-level pressure command (Tref) become equal to each other, the movable plate 34 and the fixed plate 37 can sandwich the object 300 with a pressing force equal to the high-level pressure command (Tref).

In the above gripping process, for example, when the movable plate 34 is moved by only constant pressure control from the initial position that is largely spaced apart from the object 300, in the pressure control feedback loop, since the pressure controller 13 performs integral control, the movable part is over-accelerated and a movement speed of the movable part becomes excessively high (see description about a process (S15) of FIG. 4 to be described later), and the pressure sensor 35 in a state accompanying a large inertia force of the movable part impactively comes into contact with the object 300. In order to avoid this, it is desirable that the servo amplifier 1 control the motor 31 by switching over time between position control and pressure control. That is, the movable plate 34 is moved by the position control between when the movable plate 34 is moved from the initial position at the beginning and when the movable plate 34 is brought close to a position (switching position in FIG. 3) that is near a planned contact position of the pressure sensor 35, and thereafter the control is switched to the pressure control to allow the pressure sensor 35 to softly touch the object 300.

The switching as described above between the positioning operation of the movable plate 34 by the position control and the pressing operation of the movable plate 34 by the pressure control is performed by a software-based switching input of the high-level position command (PosRef) and the high-level pressure command (Tref) in the high-level control device 2. Further, when the movable plate 34 is pulled back to the initial position from the state in which the object 300 is press-sandwiched by the movable plate 34 and the fixed plate 37, a reverse process may be performed. That is, it is possible that the operation in which the movable plate 34 returns from the pressing position to the switching position is performed by the pressure control; the positioning operation in which the movable plate 34 returns from the switching position to the initial position is performed by the position control; and the switching between the operations is performed by a software-based switching input of the high-level position command (PosRef) and the high-level pressure command (Tref) in the high-level control device 2.

Control Flow

Figure 4:
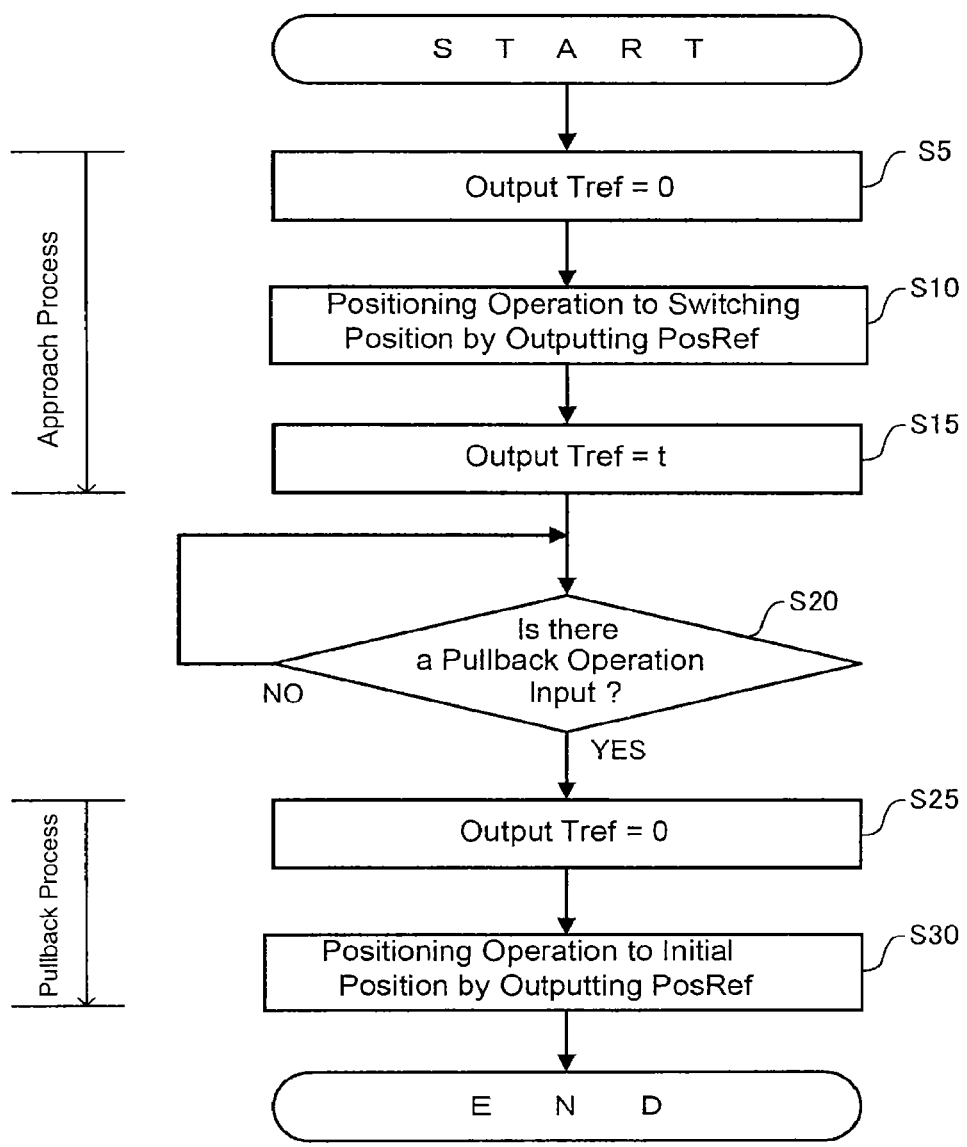
FIG. 4 is a flowchart illustrating control procedures that are executed by a CPU of a high-level control device.

Control procedures that are executed by a CPU (corresponding to a processor; not particularly illustrated in the drawings), which is provided in the high-level control device 2, in order to realize the above-described function are described step by step using FIG. 4. Execution of processes illustrated in the flow in FIG. 4 starts when an operation command is input from an operator via the operation part to the high-level control device 2 in a state in which the object 300 is placed on the seating 36 while in contact with the fixed plate 37 and the movable plate 34 is positioned at the initial position.

First, at a process (S5), the CPU of the high-level control device 2 outputs a high-level pressure command (Tref)=0 to the servo amplifier 1.

Next, the processing proceeds to a process (S10), at which the CPU of the high-level control device 2 outputs a high-level position command (PosRef) to the servo amplifier 1 and thereby performs a positioning operation in which the movable plate 34 is moved to the switching position. In this case, for example, the high-level position command (PosRef) is preferably output in such a manner that a distance from the initial position to the switching position is finely divided and is repeatedly put out so that the movable plate 34 is caused to perform a so-called inching operation. During the positioning operation at the process (S10), the high-level pressure command (Tref)=0 is maintained by the process (S5). Further, basically, the pressure sensor 35 is also in a non-contact state. Therefore, a detected pressure (ForceFB)=0 is detected. Therefore, the pressure control feedback loop generates only a position correction command=0, and the position control is substantially performed by only the position control feedback loop and the speed control feedback loop. When the put out position of the high-level position command (PosRef) has reached the switching position, the movement of the movable plate 34 temporarily stops.

Next, the processing proceeds to the process (S15), at which the CPU of the high-level control device 2 outputs to the servo amplifier 1 a high-level pressure command (Tref) at a predetermined pressure (t) and thereby causes the movable plate 34 to performed a pressing operation. The predetermined pressure (t) is set to an appropriate pressing pressure that is enough to allow the movable plate 34 and the fixed plate 37 to reliably sandwich the object 300 without damaging the object 300. During the pressing operation at the process (S15), the high-level position command (PosRef) is maintained at the switching position that is output at the process (S10). Further, when the movable plate 34 is positioned between the switching position and the contact position (not illustrated in the drawings), the pressure sensor 35 continues to detect the detected pressure (ForceFB)=0. Therefore, in the pressure control feedback loop, the high-level pressure command (Tref) is always the pressure deviation, and the pressure controller 13 continues to continuously integrate the pressure deviation and generates a position correction command that gradually increases, and continues to add the position correction command to the switching position of the high-level position command (PosRef). As a result, the position control feedback loop and the speed control feedback loop cause the movable plate 34 to move toward the object 300 side.

However, after the movable plate 34 reaches the contact position and the pressure sensor 35 comes into contact with the object 300, along with a pushing-in movement of the movable plate 34, the detected pressure (ForceFB) from the pressure sensor 35 increases. Therefore, the pressure deviation in the pressure control feedback loop gradually decreases, and the increase in the position correction command according to the pressure controller 13 is also gradually suppressed. Then, when the detected pressure (ForceFB) gradually approaches and matches the high-level pressure command (Tref), the pressure deviation becomes 0, and the pressure controller 13 continuously generates the position correction command at a constant value, that is, that movable plate 34 stops moving and is fixed at the pressing position (position obtained by adding the position correction command at the time to the switching position). As described above, at the process (S15), the pressing operation of the movable plate 34 toward the object 300 is performed by the pressure control.

Next, the processing proceeds to a process (S20), at which the CPU of the high-level control device 2 is in a standby state until an input for a pullback operation from the operator via the operation part (not particularly illustrated in the drawings) is detected. When the pullback operation is input to the operation part, the processing proceeds to a subsequent process (S25).

At the process (S25), the CPU of the high-level control device 2 outputs to the servo amplifier 1 a high-level pressure command (Tref)=0. Here, when the process (S25) is executed, since the movable plate 34 is in the state of pressing against the object 300, a detected pressure (ForceFB)=t is output from the pressure sensor 35. As a result, the pressure deviation in the pressure control feedback loop becomes a negative value, and the position correction command according to the pressure controller 13 is reduced and the movable plate 34 moves in a direction away from the object 300. Then, along with the pullback movement of the movable plate 34, the detected pressure (ForceFB) from the pressure sensor 35 is reduced, and when the movable plate 34 is returned to the contact position, the pressure deviation becomes 0, and the pressure controller 13 continuously generates the position correction command at a constant value. In the example of the present embodiment, immediately after the high-level pressure command (Tref)=0 is output, the processing proceeds a subsequent process (S30), and thereby movement control is also performed in parallel to the pullback movement of the movable plate 34 by the pressure control.

At the process (S30), the CPU of the high-level control device 2 outputs to the servo amplifier 1 a high-level position command (PosRef), and thereby causes the movable plate 34 to move away from the object 300. In this case, the high-level position command (PosRef) is output in absolute coordinates and thereby the operation can perform the position control in the same feeling as in a normal positioning operation. Then, the flow terminates.

According to the above-described flow, by the procedures of the processes (S5-S15), an approach process is performed in which the movable plate 34 is moved from the initial position toward the object 300 side to approach the object 300 and is caused to press against the object 300, and thereafter, after an input for a pullback operation is detected, by the procedures of the processes (S25-S30), a pullback process is performed in which the movable plate 34 is caused to move away from the object 300 side.

Figure 5:
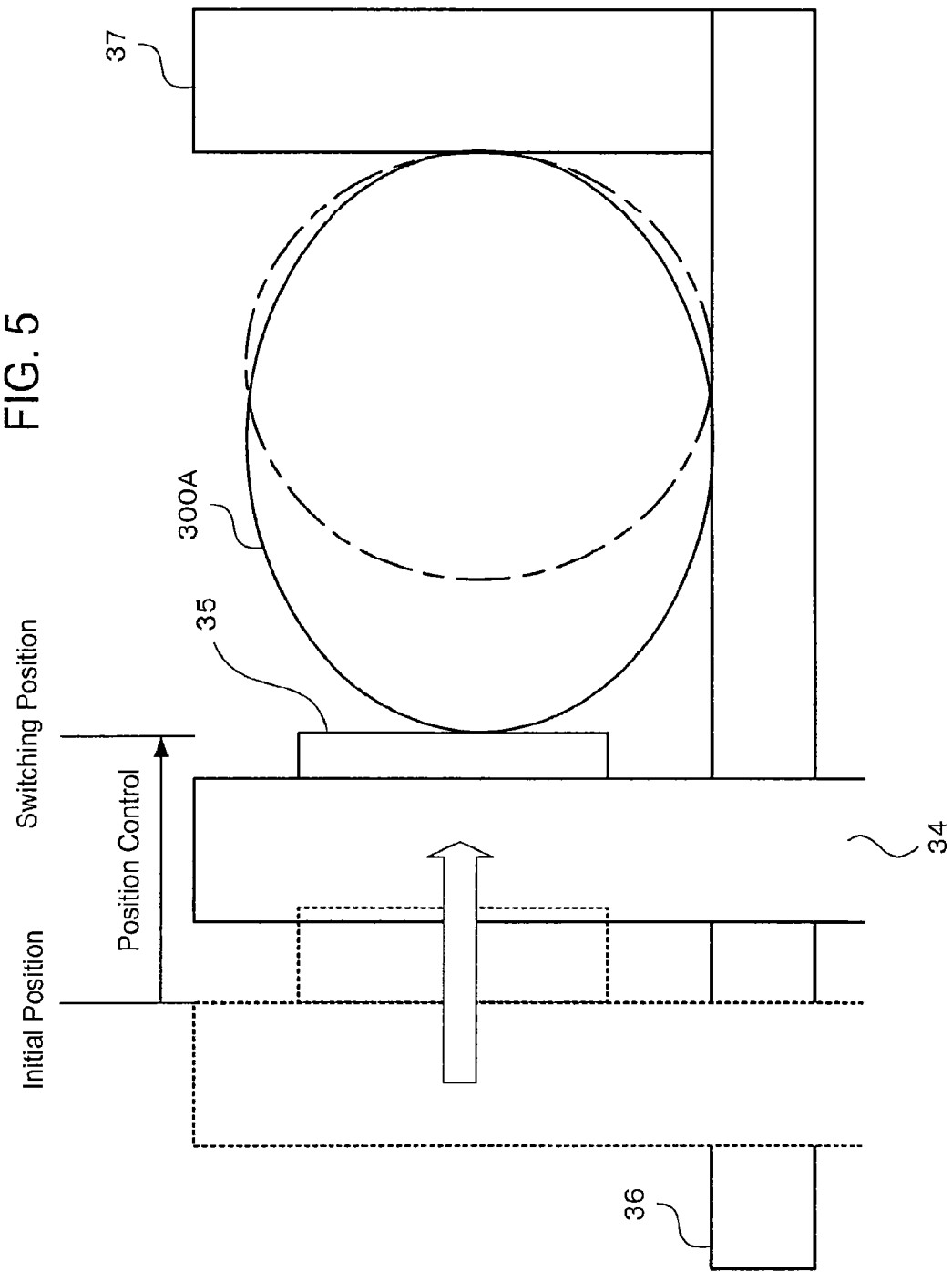
FIG. 5 describes a specific operation process of the pressure control system in a case where an object is larger than a standard one.

In the above-described approach process, the description is given based on an assumption that the object 300 has specified dimensions and the pressure sensor 35 does not come into contact with the object 300 up to the switching position on a front side of the planned contact position. However, as illustrated in FIG. 5 that corresponds to the above-described FIG. 3, for example, even in a case where, due to variations in dimensions of an object (300A), the pressure sensor 35 comes into contact with the object (300A) on a front side of a planned switching position, the servo amplifier 1 of the present embodiment is also applicable. That is, when the detected pressure (ForceFB) is output during the position control, at the time, the high-level pressure command (Tref)=0. Therefore, the pressure deviation in the pressure control feedback loop becomes a negative value, and the pressure controller 13 outputs a position correction command of a negative value. Therefore, even when the high-level control device 2 continues to output the high-level position command (PosRef) up to the planned switching position as described in the above process (S10), in the end, the pressure control feedback loop maintains a balance in the pressure deviation and causes the movable plate 34 to be positioned at the contact position (where the detected pressure (ForceFB)=0) of the pressure sensor 35. Thereafter, when the pressure control is performed at the process (S15), the movable plate 34 is caused to perform a pressing movement until the pressure sensor 35 detects the predetermined pressure (t).

Effects of the Present Embodiment

As described above, according to the servo amplifier 1 of the present embodiment, the position control feedback loop, the speed control feedback loop and the pressure control feedback loop are integrally provided in the same control block. On the high-level control device 2 side, a sequence is performed in which input of the high-level position command (PosRef) and input of the high-level pressure command (Tref) are switched using software. As a result, the position control and the pressure control can be performed in the same control block. Therefore, linearity of parameter values and gain settings in circuits is maintained also in the switching between these control modes, and occurrence of an impact during the switching can be avoided.

Further, in the present embodiment, as described above, in the pressure control feedback loop, the pressure controller 13 adds to the position command a command that is generated based on the pressure deviation as a position correction command. As a result, the pressure control feedback loop performs the position control that reflects the pressure deviation via the position control feedback loop, and thus the phenomenon in which the pressure command is offset by the position control can be avoided. As a result, a functional constant pressure control can be realized.

Further, in the present embodiment, in particular, the pressure controller 13 is provided with an integrator (1/s). As a result, occurrence of a steady-state deviation of the detected pressure in the pressure control feedback loop can be avoided.

Further, in the present embodiment, in particular, the high-level control device 2 executes the procedure of the process (S10) in which the high-level position command (PosRef) is input until the movable plate 34 is positioned at the switching position while the high-level pressure command (Tref) is set to a value that is substantially equal to 0, and the procedure of the process (S15) in which, after the movable plate 34 is positioned at the switching position, the high-level pressure command (Tref) is input at a predetermined value (t) while the high-level position command (PosRef) is set to the switching position. As a result, with respect to the servo amplifier 1 of the present embodiment, switching between the position control and the pressure control can be functionally executed.

In the above-described embodiment, a rotary type motor is adopted for the motor 31. However, the present invention is not limited to this. In addition, also for a linear motor of a linear motion type, constant pressure control can be realized by applying the servo amplifier 1 that is provided with the control block of the above-described embodiment. In this case, the torque command is replaced by a thrust force command. Further, regarding the control machine 3, the servo amplifier 1 of the above-described embodiment can be suitably applied to, for example, an injection molding machine, a press machine, and the like in addition to the above-described gripping mechanism illustrated in FIG. 2.

Mathematical Analysis of Control Block

In the following, mathematical analysis of the control block that is provided with the pressure control feedback loop of the above-described embodiment, including also various derived modified embodiments, is described in detail.

First, as illustrated in FIG. 2, a motor control apparatus is considered that, with respect to the control machine 3 or the like in which the pressure sensor 35 is provided on the movable part that is driven by the motor, controls the driving of the motor based on the detected pressure that is detected by the pressure sensor 35. Such a motor control apparatus can perform functional constant pressure control by using the pressure control feedback loop in which the detected pressure is multiplied by various gains and is fed back to the high-level pressure command (Tref) that is a target pressure.

However, in order for the pressure control feedback loop to operate stably and with high command responsiveness, it is desirable that the various gains be strictly adjusted, and these control gains greatly depend on a block structure of the pressure control feedback loop. In this regard, the block structure (not particularly illustrated in the drawings) of the pressure control feedback loop that is conventionally applied is complex and gain adjustment is difficult.

Therefore, a model of a control object that includes a motor and a pressure sensor is structured using a method of state feedback, and various gains of a pressure control feedback loop are set corresponding to the control object model. In the following, first, whether or not the stabilization of the control object by state feedback is possible is examined. Thereafter, a structure of a feedback control device is examined in which pressure control feedback is performed such that the detected pressure matches the high-level pressure command (Tref).

Stabilization of Control Object by State Feedback

Figure 6:
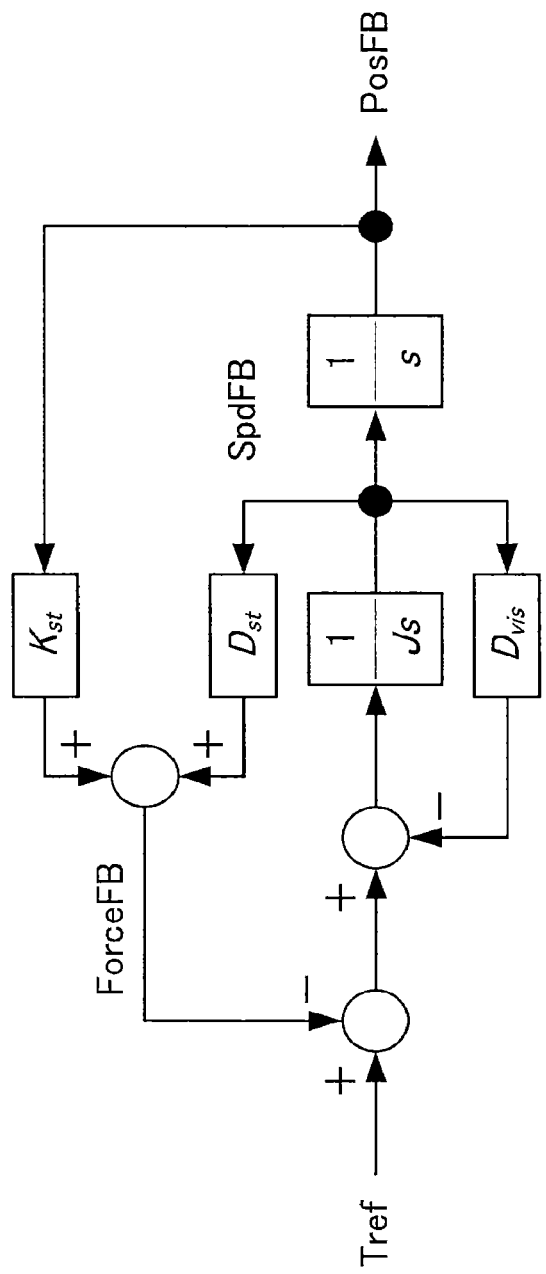
FIG. 6 is a block diagram of a control object that is designed by state feedback.

FIG. 6 illustrates a block diagram of a control object model. In FIG. 6, "J" corresponds to an inertia moment (inertia) of an entire combination including an entire rotor, which includes the output shaft of the motor, and the movable part of the control machine that is driven by the motor. Further, "$D_{vis}$" corresponds to a viscous damping coefficient of the movable part in the control machine. Further, "$K_{st}$" corresponds to a spring constant of the pressure sensor. Further, "$D_{st}$" corresponds to a viscous damping coefficient of the pressure sensor.

Here, a value obtained by multiplying the detected speed (SpdFB) by the movable part viscous damping coefficient ($D_{vis}$) is a movable part viscous damping force; a value obtained by multiplying the detected speed (SpdFB) by the viscous damping coefficient ($D_{st}$) (sensor viscous damping coefficient) is a sensor viscous damping pressure; a value obtained by multiplying the detected position (PosFB) by the spring constant ($K_{st}$) (sensor spring constant) is a sensor spring pressure; and a sensor reaction force is equal to the detected pressure (ForceFB). In this case, the control object (control object model) outputs as the detected speed (SpdFB) of the motor a value that is obtained by integrating a value that is obtained by dividing, by the inertia moment (J) (movable part mass), a value that is obtained by subtracting the sensor reaction force and the movable part viscous damping force from the input torque command (pressure command), and further outputs as the detected position (PosFB) of the motor a value that is obtained by integrating the detected speed (SpdFB). Further, the control object outputs, as the detected pressure (ForceFB) of the pressure sensor, a value that is obtained by adding the sensor spring pressure to the sensor viscous damping pressure.

Figure 7:
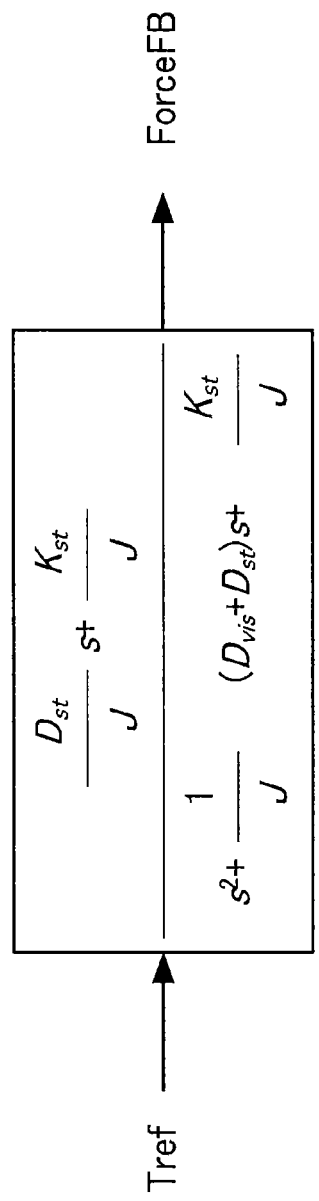
FIG. 7 summarizes a control block of FIG. 6 as a transfer function of a closed loop from a high-level pressure command to a detected pressure.

When the control block of FIG. 6 is summarized as a transfer function of a closed loop from the high-level pressure command (Tref) to the detected pressure (ForceFB), the transfer function is as illustrated in FIG. 7. When the transfer function of FIG. 7 is described as a state equation of an observable canonical form, the transfer function can be described as the following equation (1):

$$\begin{bmatrix} \dot{\theta} \\ \ddot{\theta} \end{bmatrix} = \begin{bmatrix} 0 & -\frac{K_{st}}{J} \\ 1 & -\frac{1}{J}(D_{vis} + D_{st}) \end{bmatrix} \begin{bmatrix} \theta \\ \dot{\theta} \end{bmatrix} + \begin{bmatrix} \frac{K_{st}}{J} \\ \frac{D_{st}}{J} \end{bmatrix} T_{ref} \quad (1)$$

Further, an observation equation is defined as the following equation (2):

$$y = \begin{bmatrix} K_{st} & D_{st} \end{bmatrix} \begin{bmatrix} \theta \\ \dot{\theta} \end{bmatrix} \quad (2)$$

Observability in this case is confirmed as follows. With respect to $$A = \begin{bmatrix} 0 & -\frac{K_{st}}{J} \\ 1 & -\frac{1}{J}(D_{vis} + D_{st}) \end{bmatrix}, b = \begin{bmatrix} \frac{K_{st}}{J} \\ \frac{D_{st}}{J} \end{bmatrix}, c = \begin{bmatrix} K_{st} & D_{st} \end{bmatrix},$$

when $$U_0 = \begin{bmatrix} c \\ cA \end{bmatrix}$$

is calculated, it becomes:

$$U_0 = \begin{bmatrix} K_{st} & D_{st} \\ D_{st} & -\frac{K_{st}^2}{J} - \frac{D_{st}}{J}(D_{vis} + D_{st}) \end{bmatrix}.$$

Here, since $$\det U_0 = -\frac{K_{st}}{J}(K_{st}^2 + D_{st}D_{vis} + D_{st}^2) - D_{st}^2 \neq 0,$$

the observation equation (2) is observable. Therefore, an observer that estimates various state quantities can be formed.

Next, controllability is confirmed. When $$U_c = [b\,Ab]$$

is calculated, it becomes:

$$U_c = \begin{bmatrix} \frac{K_{st}}{J} & -\frac{K_{st}D_{st}}{J^2} \\ \frac{D_{st}}{J} & \frac{K_{st}}{J} - \frac{D_{st}}{J^2}(D_{vis} + D_{st}) \end{bmatrix}.$$

Here, since $$\det U_c = \frac{K_{st}^2}{J^2} - \frac{K_{st}D_{st}D_{vis}}{J^3} \neq 0,$$

the state equation (1) is controllable. Therefore, by feeding back various state quantities, the control system can be stabilized.

When coefficients with which the state quantities are multiplied are $$k = [k_1 k_2]^T,$$

from $$A - kc = \begin{bmatrix} -k_1 K_{st} & -\frac{K_{st}}{J} - k_1 D_{st} \\ 1 - k_2 K_{st} & -\frac{1}{J}(D_{vis} - D_{st}) - k_2 D_{st} \end{bmatrix},$$

since $$sI - (A - kc) = \begin{bmatrix} s + k_1 K_{st} & \frac{K_{st}}{J} + k_1 D_{st} \\ -1 + k_2 K_{st} & s + \frac{1}{J}(D_{vis} + D_{st}) + k_2 D_{st} \end{bmatrix}, \quad (3)$$

$$|sI - (A - kc)| = s^2 + \left\{\frac{1}{J}(D_{vis} + D_{st}) + k_1 K_{st} + k_2 D_{st}\right\} s + \frac{K_{st}}{J}\{1 + k_1(D_{vis} + D_{st}) - k_2 K_{st}\} + k_1 D_{st}.$$

From the equation (3), since $k_1$ or $k_2$ appears in a constant term and a first-order term in a characteristic polynomial, by feeding back θ (the "PosFB" in FIG. 6) and $\dot{\theta}$ (the "SpdFB" in FIG. 6), the control loop can be stabilized.

In the case of a linear motion type motor, that is, a linear motor, the "SpdFB" and the "PosFB" in FIG. 6 can be directly detected. In the case of a rotary type motor, for full-closed control, direct detection is possible. However, for semi-closed control, since springs or damping elements of a transmission mechanism or a driving mechanism are involved, strictly speaking, observation is not possible. However, in the pressing state, even when there is a spring element, since the spring element is sufficiently compressed, a motor detected position and a relative position of the movable part are in a constant relationship. Therefore, in the present application, it is assumed that all state quantities are approximately observable.

Pressure Control by Pressure Feedback

Figure 8:
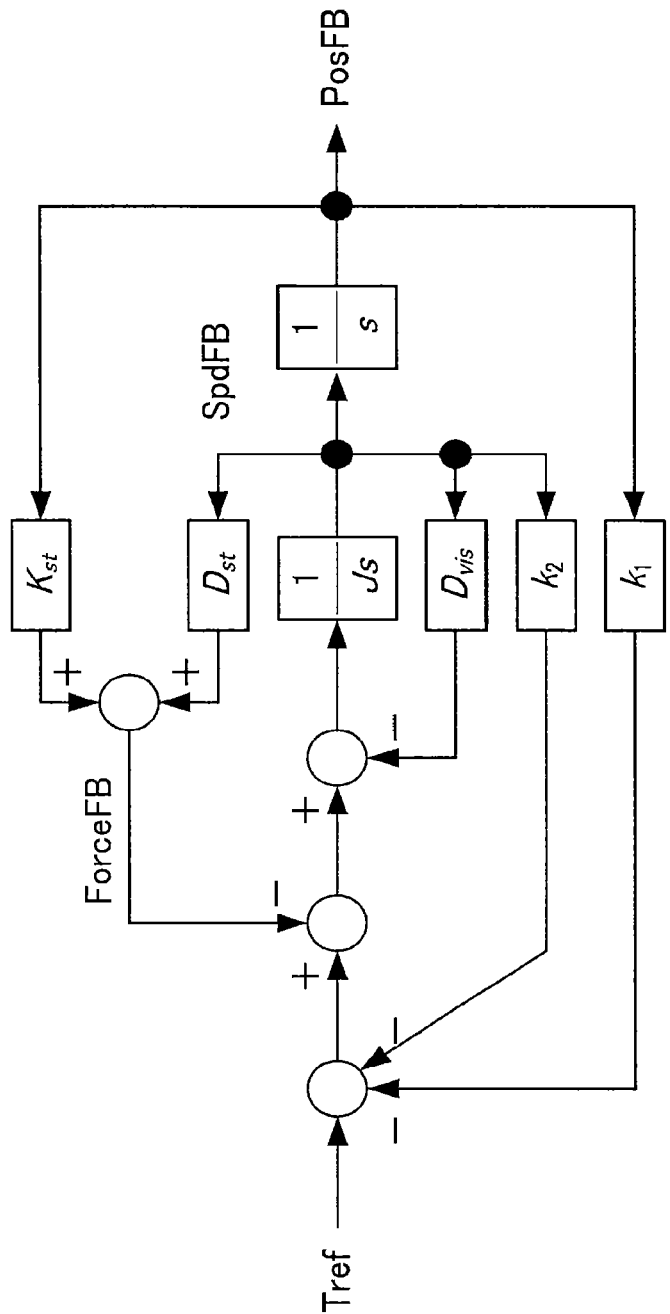
FIG. 8 is a block diagram illustrating a control object in a state in which state feedback has been performed.
Figure 9:
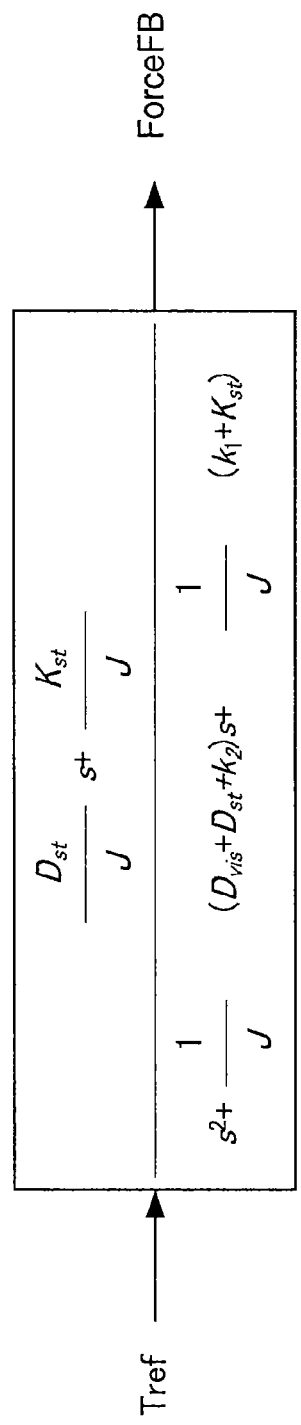
FIG. 9 summarizes a control block of FIG. 8 as a transfer function of a closed loop from a high-level pressure command to a detected pressure.

FIG. 8 illustrates a control object in a state in which the state feedback has been performed. When the block structure of FIG. 8 is summarized as a transfer function of a closed loop from the high-level pressure command (Tref) to the detected pressure (ForceFB), the transfer function is as illustrated in FIG. 9. From the transfer function of FIG. 9, it is clear that stabilization of the control loop and modification of the command responsiveness are possible. However, when s=0, since the transfer function does not become 1, a steady-state deviation remains with respect to the high-level pressure command (Tref). Therefore, a countermeasure is necessary.

Figure 10:
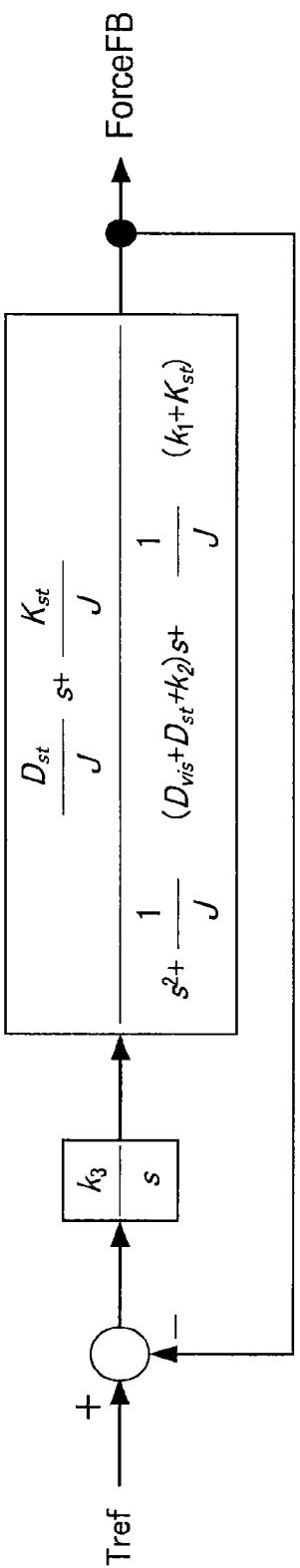
FIG. 10 is a control block diagram in a case where integral control has been performed to a difference between a high-level pressure command and a detected pressure, with respect to the transfer function of FIG. 9.
Figure 11:
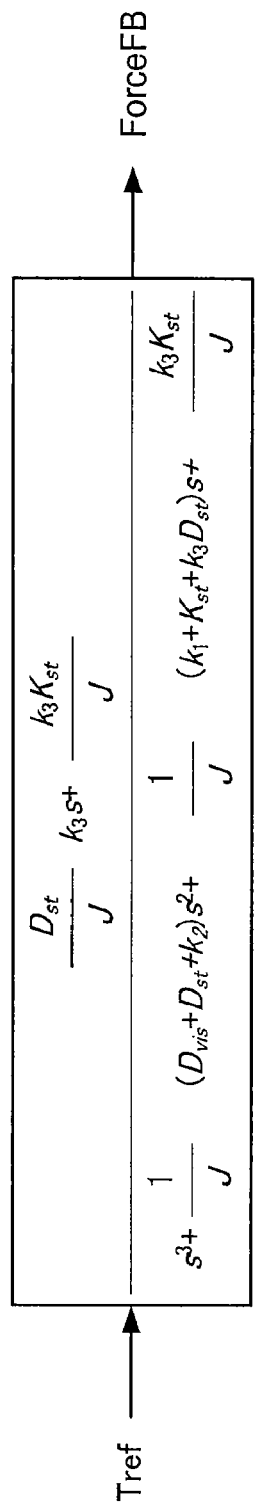
FIG. 11 summarizes a control block of FIG. 10 as a transfer function of a closed loop from a high-level pressure command to a detected pressure.

As a simplest countermeasure, an integrator can be added. When integral control is performed to the difference between the high-level pressure command (Tref) and the detected pressure (ForceFB), the result is as illustrated in FIG. 10. When FIG. 10 is summarized as a transfer function of a closed loop from the high-level pressure command (Tref) to the detected pressure (ForceFB), the transfer function is as illustrated in FIG. 11. From the transfer function of FIG. 11, it is clear that stabilization of the control loop and modification of the command responsiveness are possible and even when s=0, since the transfer function becomes 1, a steady-state deviation does not remain.

Figure 12:
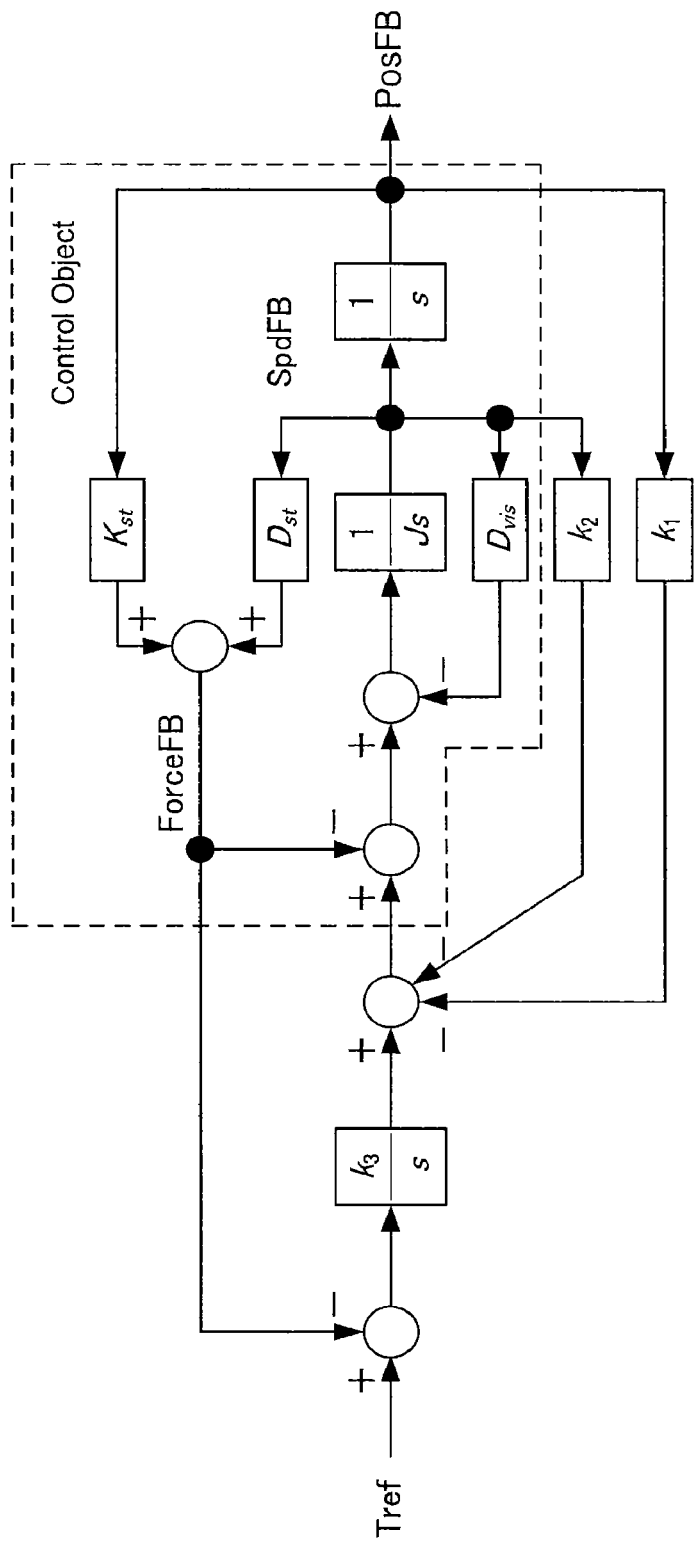
FIG. 12 is a block diagram of a first example in which the transfer function of FIG. 11 is rewritten as a control block.
Figure 13:
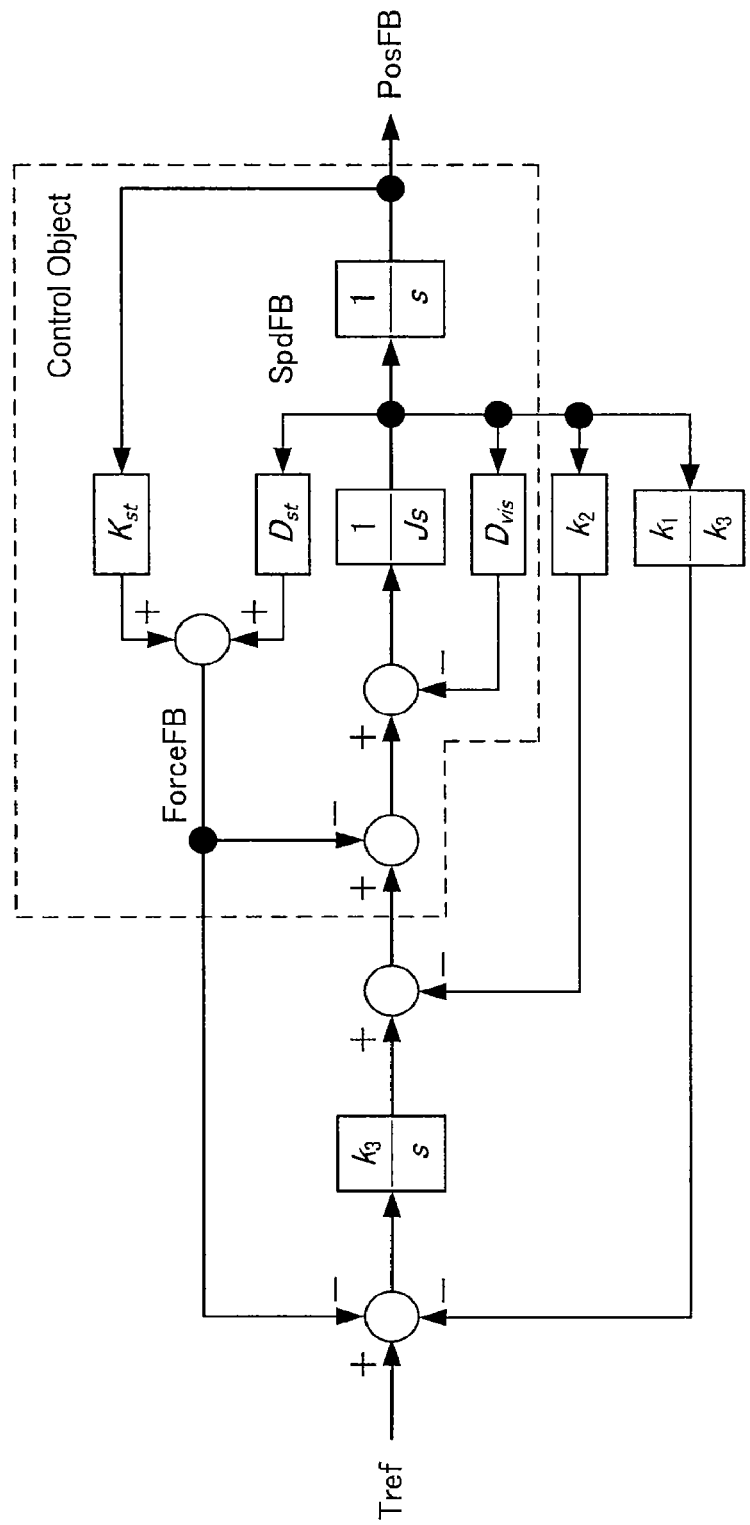
FIG. 13 is a block diagram of a second example in which the transfer function of FIG. 11 is rewritten as a control block.

When FIG. 11 is rewritten as a block diagram, it becomes as illustrated in FIG. 12 or FIG. 13. FIG. 12 and FIG. 13 are equivalent to each other in terms of control, and thus, one of the two that is easier to implement may be adopted. For example, for the pressure control feedback loop that is provided in the control block of FIG. 12, a value as a torque command (pressure command) is input to the control object, the value being obtained by multiplying a deviation between the high-level pressure command (Tref) that is externally input and the detected pressure (ForceFB) by a gain ($k_3$) (third gain) and integrating the resulting value and then subtracting from the resulting value a product of the detected position (PosFB) and a gain ($k_1$) (first gain) and a product of the detected speed (SpdFB) and a gain ($k_2$) (second gain).

Confirmation of Stability

Stability of the above-examined pressure control feedback loop is confirmed as follows. From the Routh-Hurwitz stability criterion, a necessary and sufficient condition for a control loop to be stable satisfies the following equation (4):

$$\begin{vmatrix} \frac{1}{J}(D_{vis} + D_{st} + k_2) & \frac{k_3 K_{st}}{J} \\ 1 & \frac{1}{J}(k_1 + K_{st} + k_3 D_{st}) \end{vmatrix} > 0 \quad (4)$$

When expanded, the equation (4) becomes the following equation (4)':

$$\frac{1}{J^2}(D_{vis} + D_{st} + k_2)(k_1 + K_{st} + k_3 D_{st}) - \frac{k_3 K_{st}}{J} > 0 \quad (4)'$$

For simplicity, assuming that $D_{vis}=D_{st}=0$, when expanded, the equation (4)' becomes the following equation (4)":

$$\frac{K_{st}}{J^2}k_2 + \frac{1}{J^2}k_1 k_2 - \frac{K_{st}}{J}k_3 > 0. \quad (4)''$$

When the equation (4)" is solved, the following equation (5) or equation (5)' is obtained:

$$k_3 < \frac{1}{J}\left(1 + \frac{k_1}{K_{st}}\right)k_2, \quad (5)$$

$$k_1 > \frac{JK_{st}k_3}{k_2} - K_{st}. \quad (5)'$$

Further, since k1>0, $$\frac{JK_{st}k_3}{k_2} - K_{st} \leq 0,$$

that is, when $k_2 \geq Jk_3$, the control loop is always stable; and $$\frac{JK_{st}k_3}{k_2} - K_{st} > 0,$$

that is, when $$k_2 < Jk_3,$$

$$k_1 > \frac{JK_{st}k_3}{k_2} - K_{st}$$

is obtained.

Derivation of Optimum Gain Setting Value

Next, an optimum gain formula is derived using a coefficient diagram method. From the characteristic polynomial of FIG. 11, stability indexes are as follows:

$$\gamma_1 = \frac{\frac{1}{J^2}(k_1 + K_{st} + k_3 D_{st})^2}{\frac{k_3 K_{st}}{J^2}(D_{vis} + D_{st} + k_2)}, \tag{6}$$

$$\gamma_2 = \frac{\frac{1}{J^2}(D_{vis} + D_{st} + k_2)^2}{\frac{1}{J}(k_1 + K_{st} + k_3 D_{st})}. \tag{7}$$

For simplicity, assuming that $D_{vis}=D_{st}=0$, the stability indexes are specified so as to be in coefficient diagram method standard forms:

$$\gamma_1 = \frac{(k_1 + K_{st})^2}{k_2 k_3 K_{st}} = 2.5, \tag{6}'$$

$$\gamma_2 = \frac{1}{J}\frac{k_2^2}{k_1 + K_{st}} = 2. \tag{7}'$$

From the equation (6)' and the equation (7)', $$k_2 = \sqrt{2J(k_1 + K_{st})}, \tag{8}$$

$$k_3 = \frac{(k_1 + K_{st})^2}{2.5 K_{st}\sqrt{2J(k_1 + K_{st})}}. \tag{9}$$

By arbitrarily selecting $k_1$ in a range within which the stability condition equation (5)' is satisfied, a response of a coefficient diagram method standard form can be obtained from gains of the equation (8) and the equation (9). Further, in this case, an equivalent time constant ($\tau$) can be obtained from the following equation (10):

$$\tau = \frac{k_1 + K_{st} + k_3 D_{st}}{k_3 K_{st}}. \tag{10}$$

Figure 14:
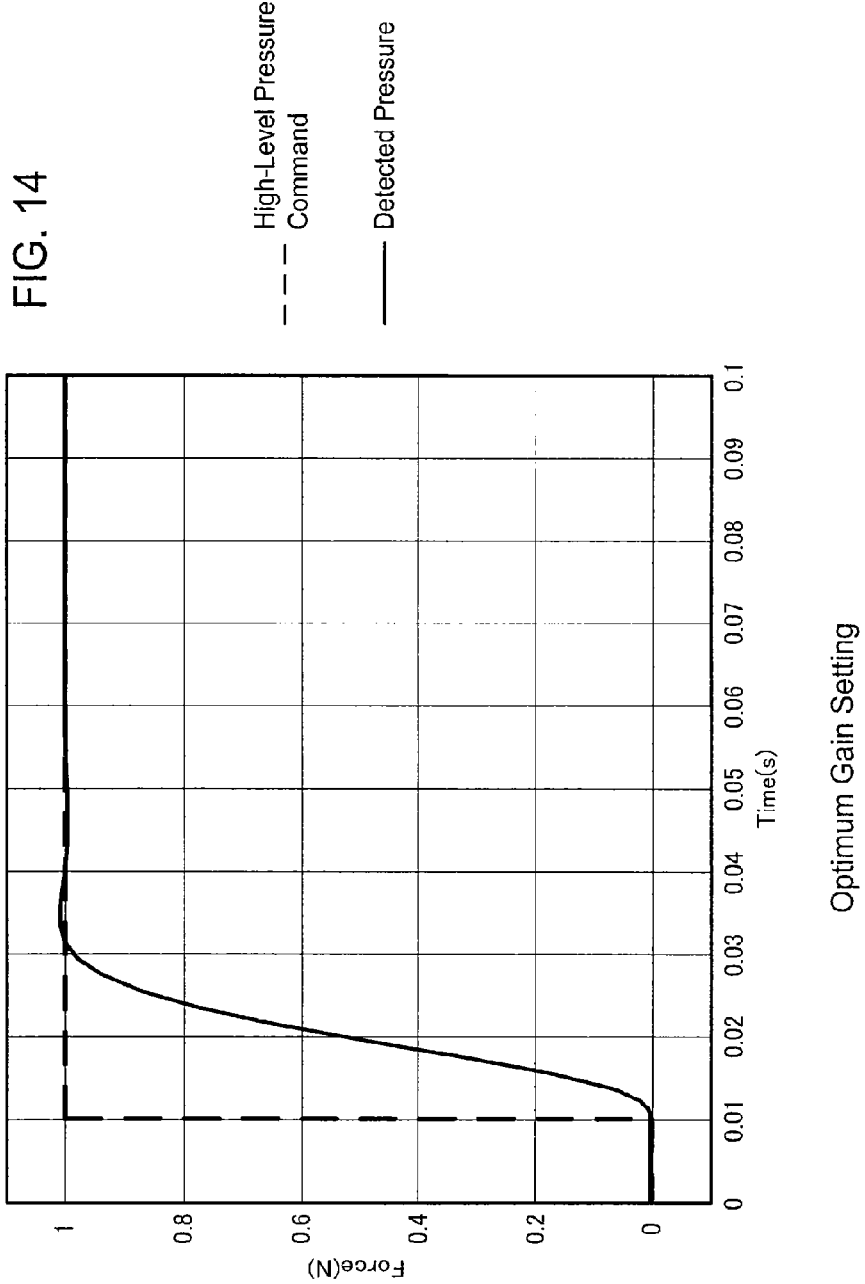
FIG. 14 illustrates simulation results of a step response in a case where an optimum gain has been applied to control blocks of FIGS. 12 and 13.

For example, when $k_1=10$, $K_{st}=0.424$ (Nm/rad) and $J=8.375\times10-5$ (kgm$^2$), $k_2=0.042$ and $k_3=2440.696$ are obtained. In this case, since the right-hand side of the equation (5)' is 1.640 ($<k_1$), the stability condition is satisfied, and the equivalent time constant is about 10 ms. FIG. 14 illustrates a step response simulation in the case where the optimum gain that is derived as described above is applied to the control blocks of FIGS. 12 and 13.

Examination of Application of Pole Placement Method

The optimum gain formula is derived using the coefficient diagram method. However, in actual servo adjustment, a method, in which the adjustment is started from a state in which the equivalent time constant is large and then the equivalent time constant is gradually reduced, is more intuitive and can be more easily performed. Here, as an example, a condition that allows the characteristic polynomial of FIG. 11 to have three roots is examined.

When a comparison between $(s+\omega)^3=s^3+3\omega s^2+3\omega^2 s+\omega^3$ and the coefficients of the characteristic polynomial of FIG. 11 is performed, the following equations can be obtained:

$$3\omega = \frac{1}{J}(D_{vis} + D_{st} + k_2), \tag{11}$$

$$3\omega^2 = \frac{1}{J}(k_1 + K_{st} + k_3 D_{st}), \tag{12}$$

$$\omega^3 = \frac{k_3 K_{st}}{J}. \tag{13}$$

From the equations (11)-(13), when $D_{vis}=D_{st}=0$ is assumed for simplicity, the gains ($k_1$, $k_2$, $k_3$) can be expressed as functions of the response frequency ($\omega$):

$$k_1 = 3\omega^2 J - K_{st}, \tag{14}$$

$$k_2 = 3\omega J, \tag{15}$$

$$k_3 = \frac{J}{K_{st}}\omega^3. \tag{16}$$

For example, when $\omega=2\pi\times10$ (rad/s), $K_{st}=0.424$ (Nm/rad) and $J=8.375\times10-5$ (kgm$^2$), the gains are $k_1=0.568$, $k_2=0.016$ and $k_3=48.996$. In this case, since the right-hand side of the equation (5)' is $-0.314$ ($<0$), the stability condition is satisfied, and the equivalent time constant is about 48 ms.

When the above condition is modified to $\omega=2\pi\times100$ (rad/s), the gains are $k_1=98.766$, $k_2=0.158$ and $k_3=48995.767$. In this case, since the right-hand side of the equation (5)' is 10.597 ($<k_2$), the stability condition is satisfied, and the equivalent time constant is about 5 ms.

Figure 15:
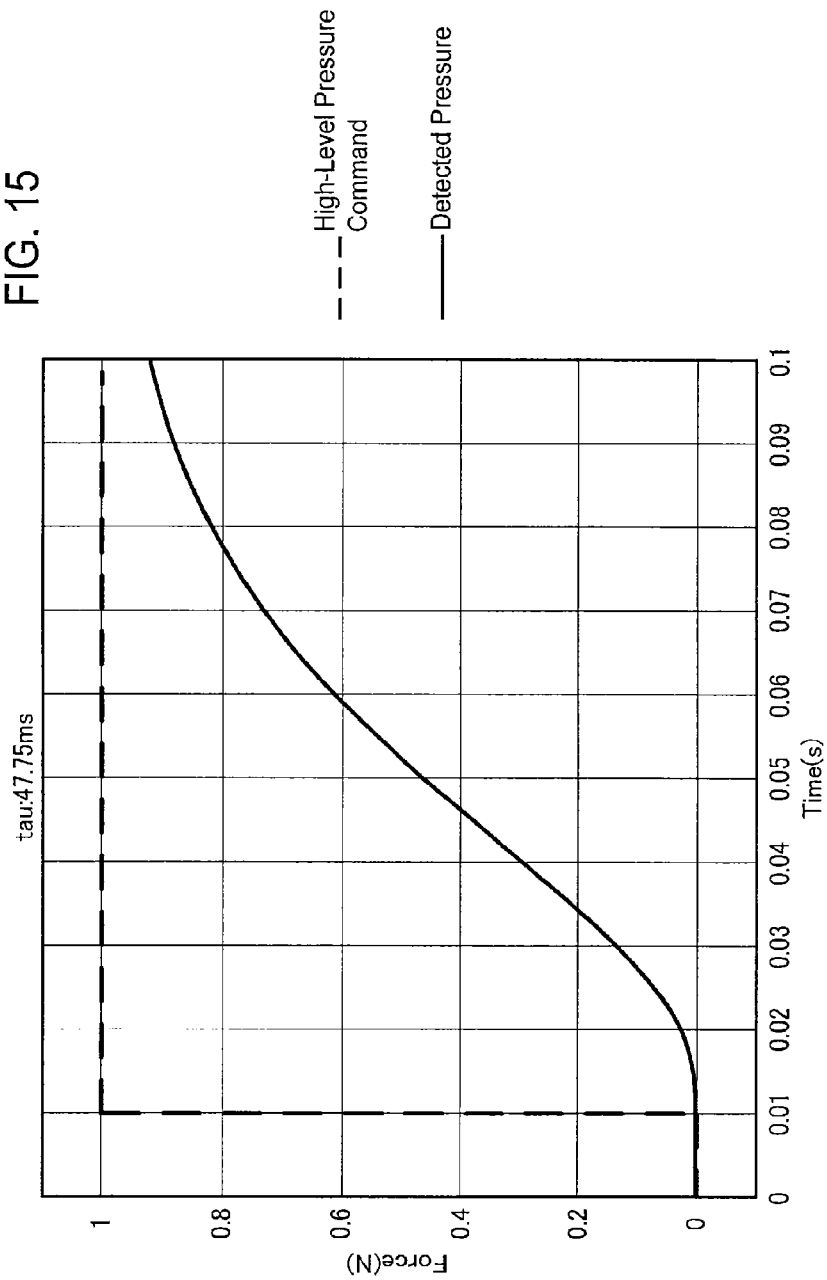
FIG. 15 is a diagram of a first example illustrating simulation results of a step response in a case where a gain that is set using a pole placement method has been applied to the control blocks of FIGS. 12 and 13.
Figure 16:
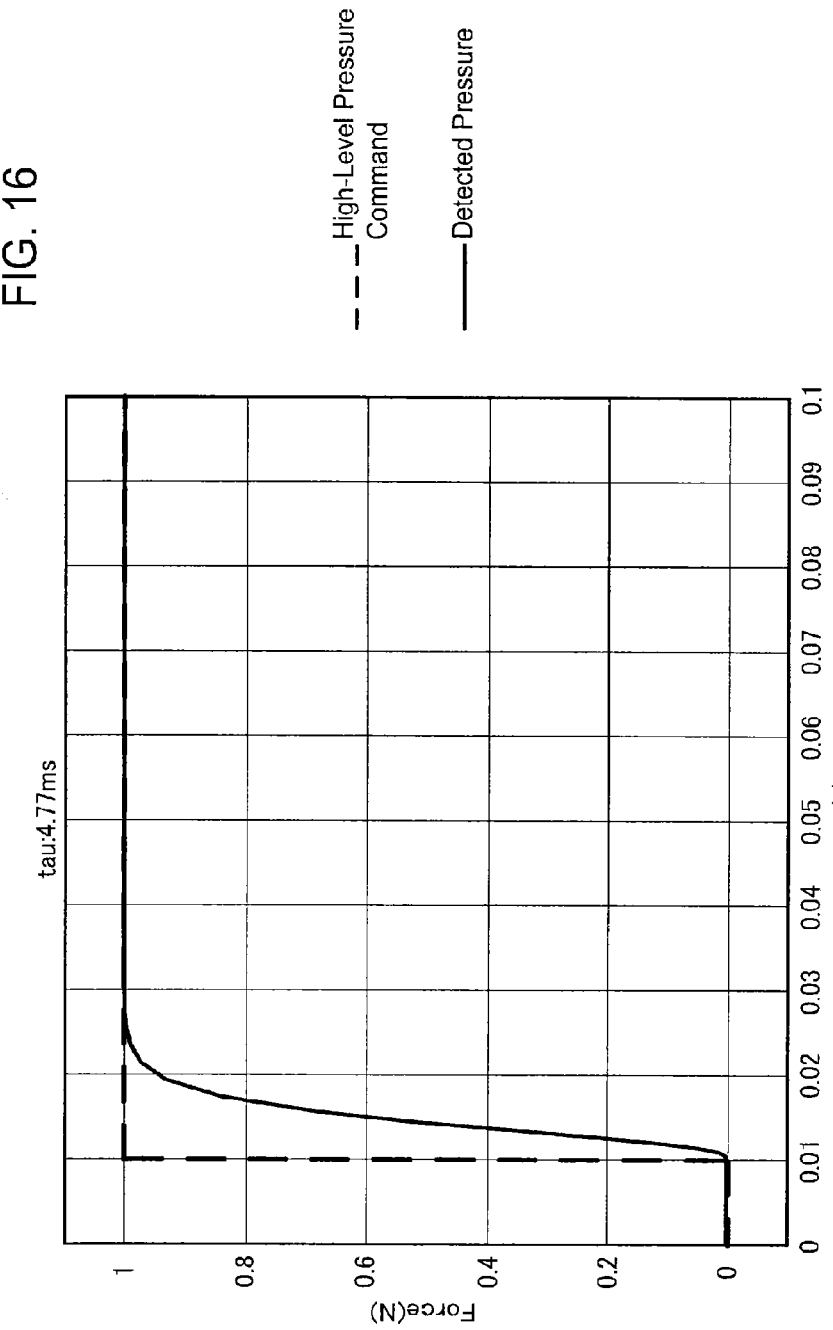
FIG. 16 is a diagram of a second example illustrating simulation results of a step response in a case where a gain that is set using the pole placement method has been applied to the control blocks of FIGS. 12 and 13.

FIGS. 15 and 16 respectively illustrate step response simulations when the gains that are set in the case of $\omega=2\pi\times10$ (rad/s) and in the case of $\omega=2\pi\times100$ (rad/s) are respectively applied to the control blocks of FIGS. 12 and 13.

Estimation Method of Mechanical Specifications

In the settings of the gains in the above-described control block, it is desirable that, as physical specifications, the inertia moment or mass of the movable part that corresponds to the above-described J and the spring constant of the pressure sensor that corresponds to the above-described $D_{st}$ be already known. In the following, methods for estimating these quantities based on experiment or calculation are each described in turn.

For example, in the case where a rotary type motor is used for the control machine, an inertia moment of a movable part that corresponds to the above-described J is a sum (in units of (kgm$^2$)) of an inertia moment of a rotor of the motor and a load inertia moment of a movable part of the control machine. Further, in the case where a linear motor is used for the control machine, a mass of a movable part that corresponds to the above-described J is a sum (in units of (kg)) of a mass of a movable element of the motor and a load mass of a movable part of the control machine. The inertia moment or the mass can be obtained, for example, by dividing a torque command or a thrust force by an acceleration of the motor, the torque command or the thrust force being detected in an experimental operation using the servo amplifier for which gains have been appropriately set. The acceleration of the motor can be obtained by subjecting the detected speed (SpdFB) to first order differentiation.

Further, for the spring constant of the pressure sensor, assuming a spring of a machine in small displacement is a linear spring and according to Hooke's Law, the following equation can be defined:

$$F_0 - F = K_{st}(x_0 - x).$$

Here, $F_0$ is an initial detected pressure (in units of N); F is a detected pressure (in units of N) when a certain displacement has occurred; x0 is an initial position (in units of m) of the movable part; x is a displacement (in units of m) from the initial position of the movable part; and $K_{st}$ is the spring constant (in units of N/m). When the pressure sensor is in an initial state of being in contact with the object, a detected pressure ($F_0$) and a detected position ($x_0$) at the time are measured. Thereafter, in a pressure control mode, the pressure sensor presses against the object, and a detected pressure (F) and a detected position (x) are measured. The spring constant ($K_{st}$) can be calculated using these measured values from the following equation:

$$K_{st} = \frac{F_0 - F}{x_0 - x}.$$

Further, the pressure control in a broad sense is not only the pressure control in the linear motion mechanism illustrated in FIG. 2, but can also be pressure control in a rotating mechanism (not particularly illustrated in the drawings). In this case, by using torques ($T_0$, T) (Nm) instead of the detected pressures ($F_0$, F) (N) that are linear motion thrust forces and using rotation positions ($\theta_0$, $\theta$) (rad) instead of the linear motion positions ($x_0$, x) (m), a spring constant ($K_{st}$) (Nm/rad) can be calculated from the following equation:

$$K_{st} = \frac{T_0 - T}{\theta_0 - \theta}.$$

Extension to Speed Control

Figure 17:
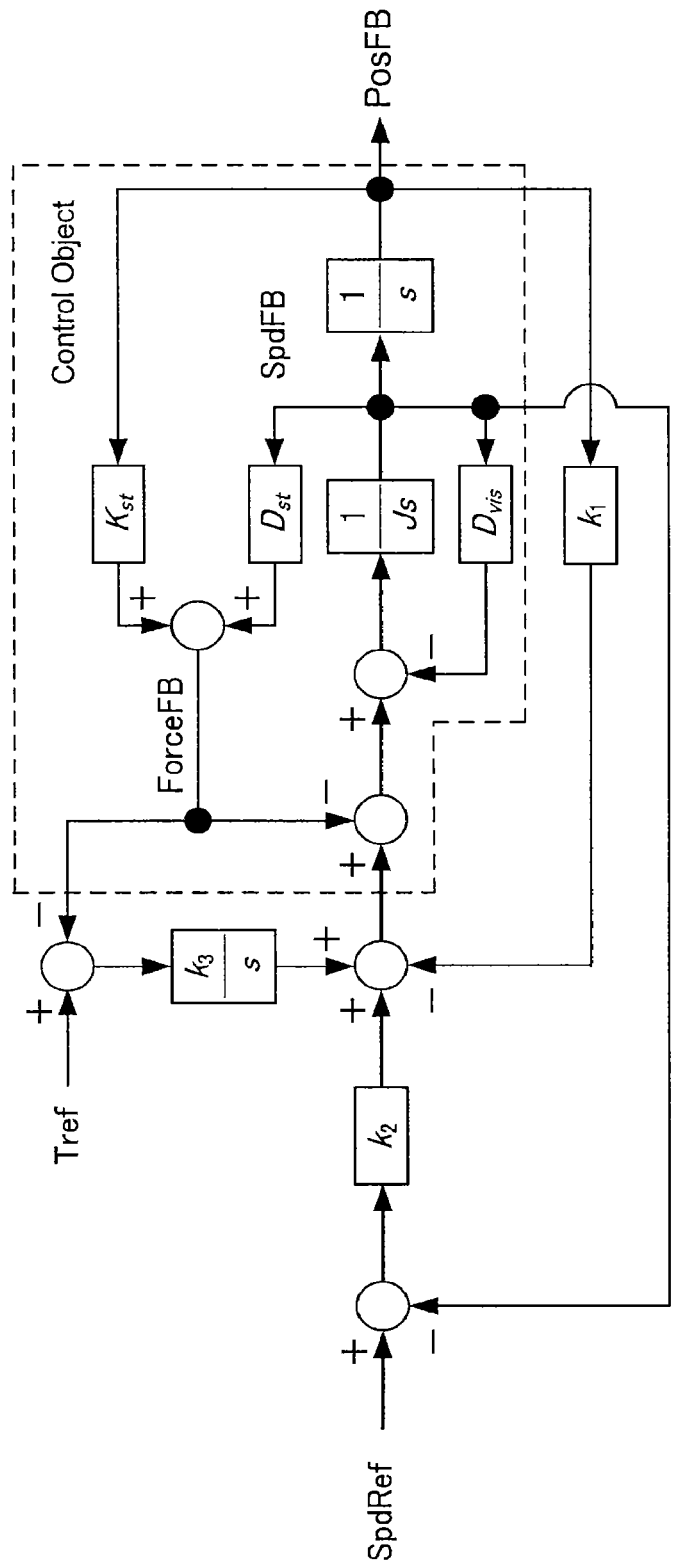
FIG. 17 is a block diagram in a case where the control block of FIG. 12 has been deformed in a form of speed control.

Next, extension from the control block of the pressure control illustrated in FIG. 12 to speed control is examined. The signal (SpdFB) immediately before being multiplied by the gain ($k_2$) in FIG. 12 can also be regarded as a difference (speed deviation) between a speed command=0 and a speed feedback. From this point of view, when the control block of FIG. 12 is deformed in a form in which a speed command (SpdRef) is input to the control block, the control block becomes as illustrated in FIG. 17. In FIG. 17, when the speed command (SpdRef)=0, the control block is equivalent to that of FIG. 12.

Figure 18:
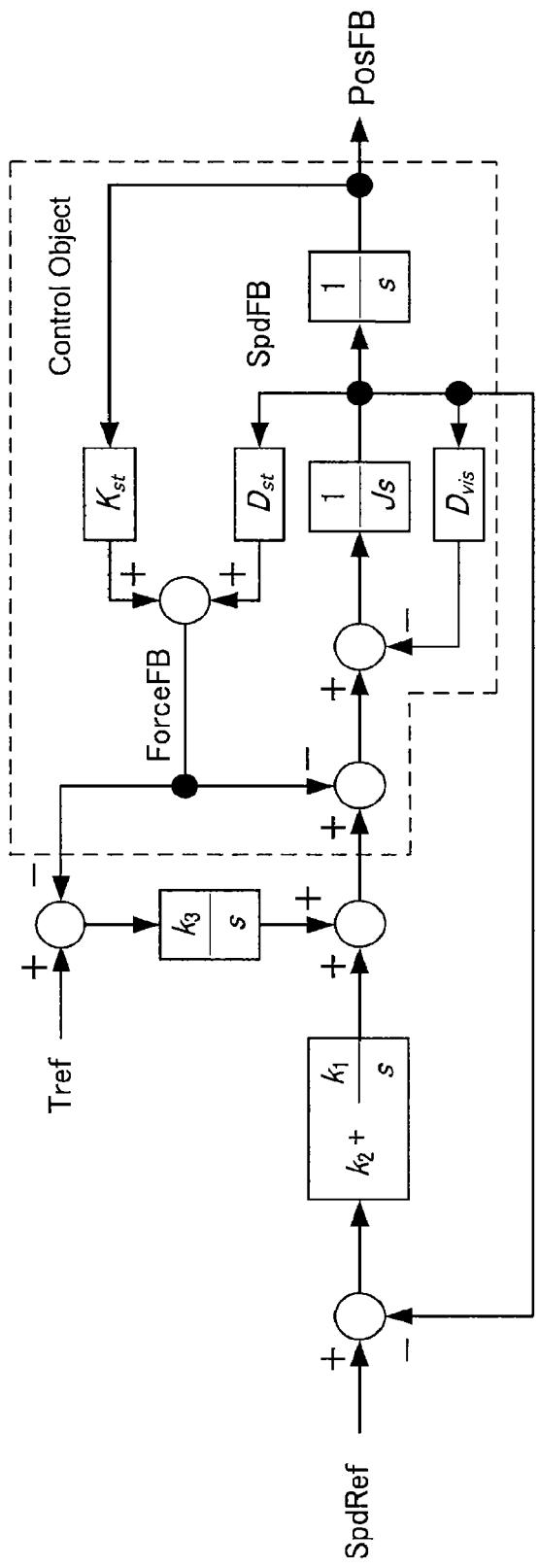
FIG. 18 is a block diagram in a case where a path of a gain (k1) in a control block of FIG. 17 has been deformed.
Figure 19:
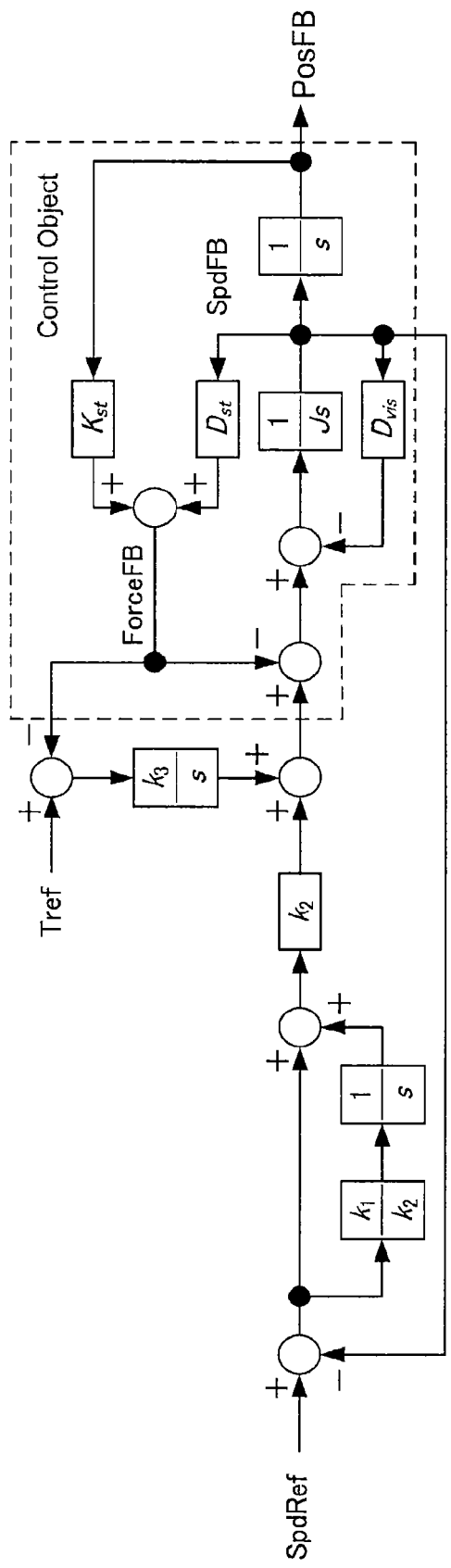
FIG. 19 is a block diagram in a case where a speed controller of FIG. 18 has been rewritten in the same form as normal PI control.

Further, when a path of the gain ($k_1$) is deformed, the control block can be rewritten as in FIG. 18. The gains ($k_1$, $k_2$) in FIG. 18 correspond to an integral gain and a proportional gain of speed P1 control. As a result, the control block of FIG. 18 matches the control block of FIG. 12. When the speed controller in FIG. 18 is rewritten in the same form as normal PI control, the speed controller becomes as illustrated in FIG. 19. In FIG. 19, the gain ($k_2$) corresponds to a product of a speed proportional gain and a total inertia moment that is calculated from an inertia moment ratio. Further, $k_2/k_1$ corresponds to a speed loop integration time.

Examination of Stability of Speed Control and Application of Pole Placement Method The control block of FIG. 19 is obtained by completely equivalent-converting the control block of FIG. 12. Therefore, when the speed command (SpdRef) is 0, stability from the high-level pressure command (Tref) to the detected pressure (ForceFB) matches the above-described examination result in the confirmation of the stability in the control block of FIG. 12. That is, the control is stable when the following is satisfied:

$$\frac{JK_{st}k_3}{k_2} - K_{st} \le 0,$$

that is, when $k_2 \ge Jk_3$, the control loop is always stable; and $$\frac{JK_{st}k_3}{k_2} - K_{st} > 0,$$

that is, when $$k_2 < Jk_3, k_1 > \frac{JK_{st}k_3}{k_2} - K_{st}$$

is obtained.

Further, for gain formulas due to the application of the pole placement method, similar to the control block of FIG. 12, the equations (14)-(16) can be applied.

Operation Confirmation of Speed Control by Simulation

Figure 20:
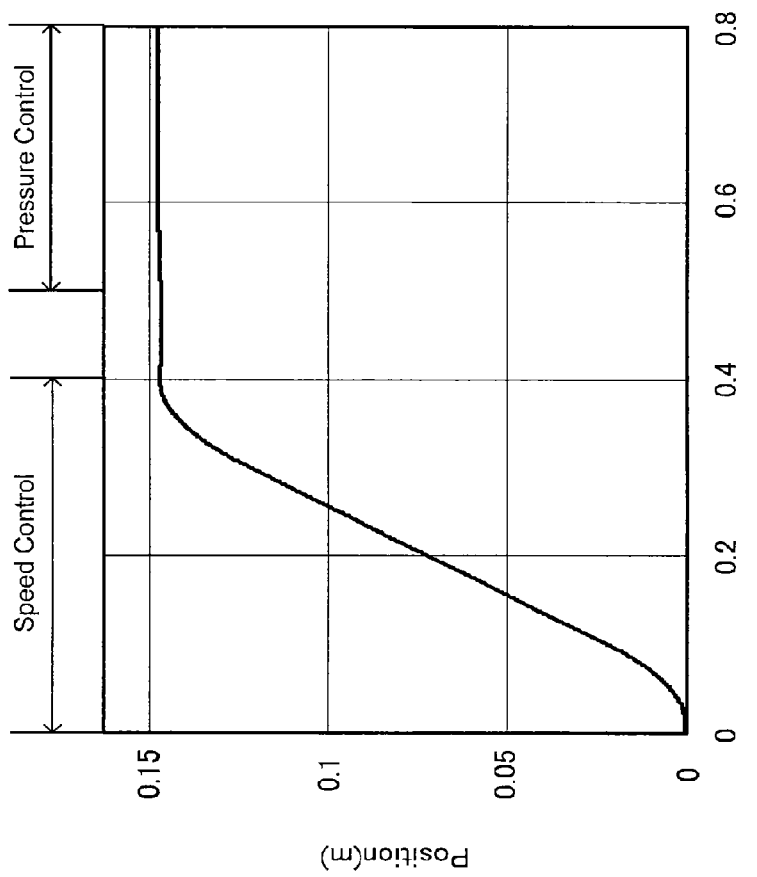
FIG. 20 illustrates simulation results of a detected position in a case where a gain that is set using the pole placement method has been applied to the control block of FIG. 12.
Figure 21:
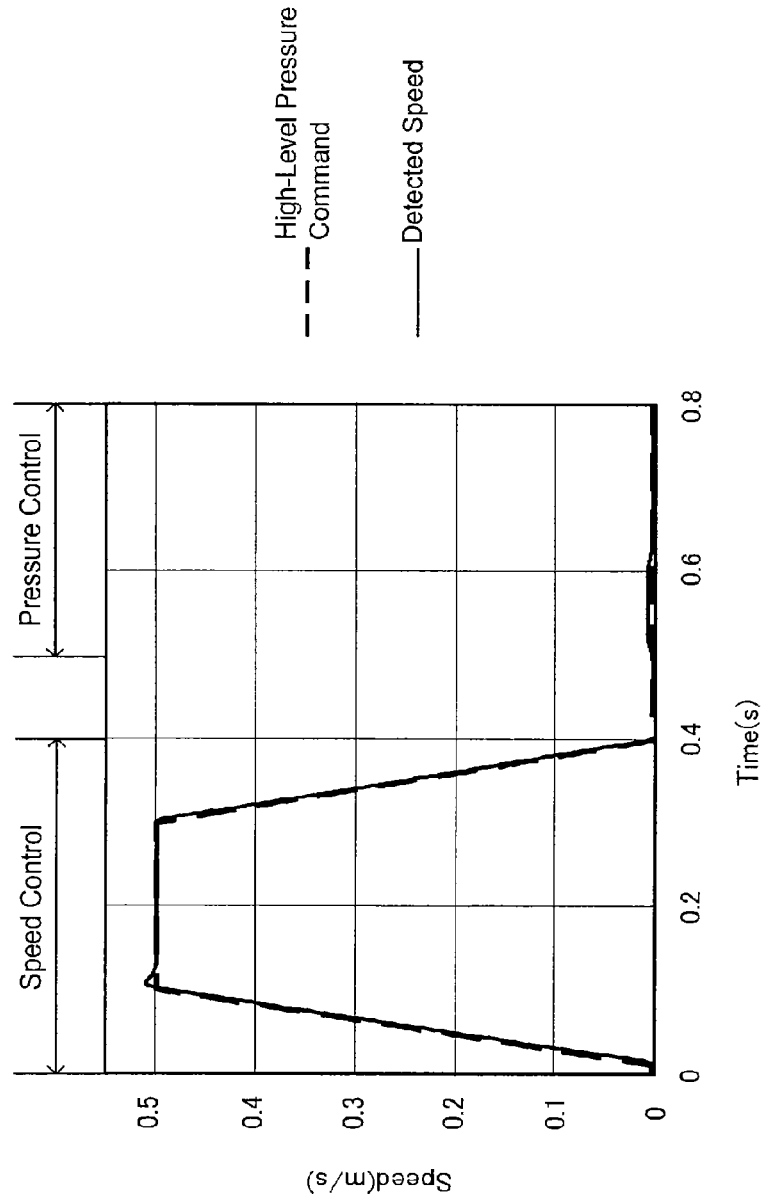
FIG. 21 illustrates simulation results of a detected speed in a case where a gain that is set using the pole placement method has been applied to the control block of FIG. 12.
Figure 22:
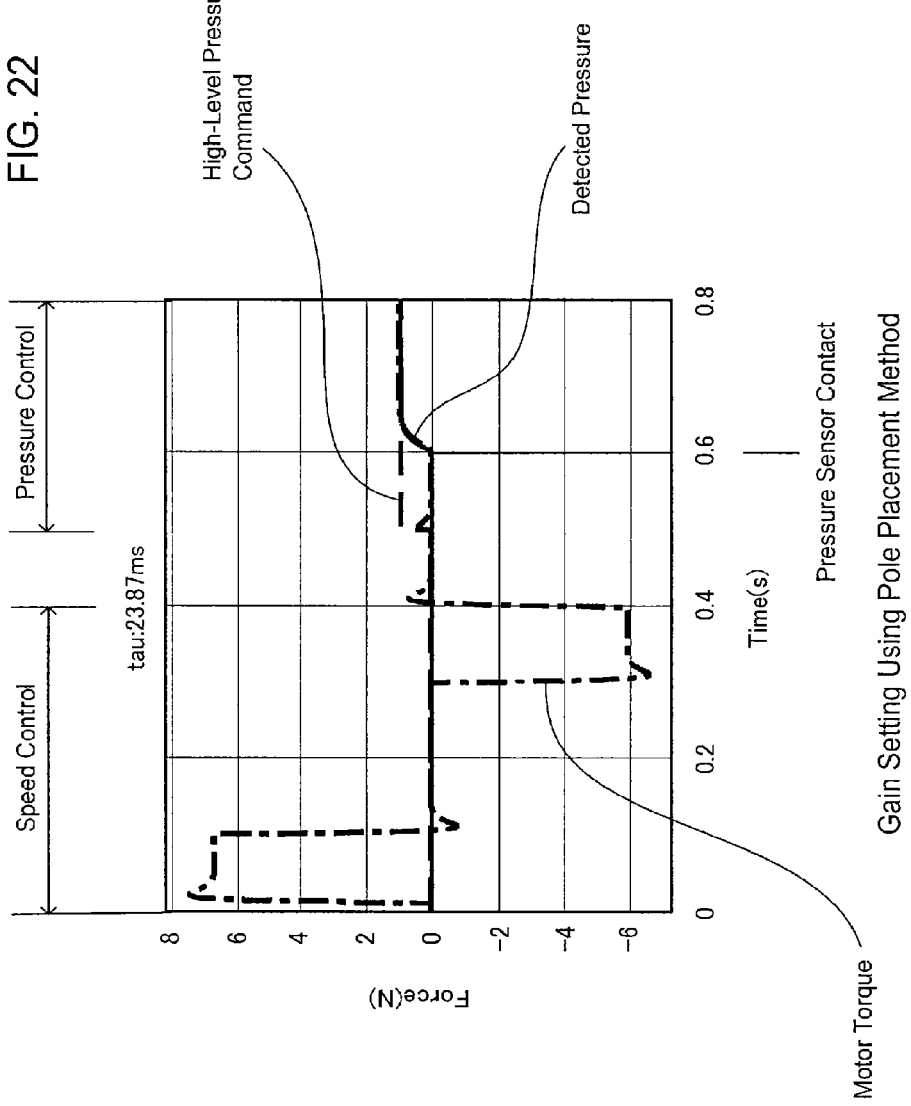
FIG. 22 illustrates simulation results of a detected pressure in a case where a gain that is set using the pole placement method has been applied to the control block of FIG. 12.

Operation waveforms in the case where simulation is performed using gains that are calculated using the equations (14)-(16) are illustrated in FIG. 20-22. FIG. 20 corresponds to the detected position (PosFB); FIG. 21 corresponds to the high-level speed command (SpdRef) and the detected speed (SpdFB); and FIG. 22 corresponds to the motor torque, the high-level pressure command (Tref), and the detected pressure (ForceFB). Since the control block is speed control, the position deviation is omitted. As an operation, which is the same in each of FIG. 20-22, after the high-level control device inputs the high-level speed command (SpdRef) from 0 sec to 0.4 sec, from 0.5 sec, input of the high-level pressure command (Tref) is automatically switched. The pressure sensor becomes in contact with the object from about 0.6 sec. From FIG. 20-22, it is clear that the speed control and the pressure control can operate in the same control block of FIG. 19.

Figure 23:
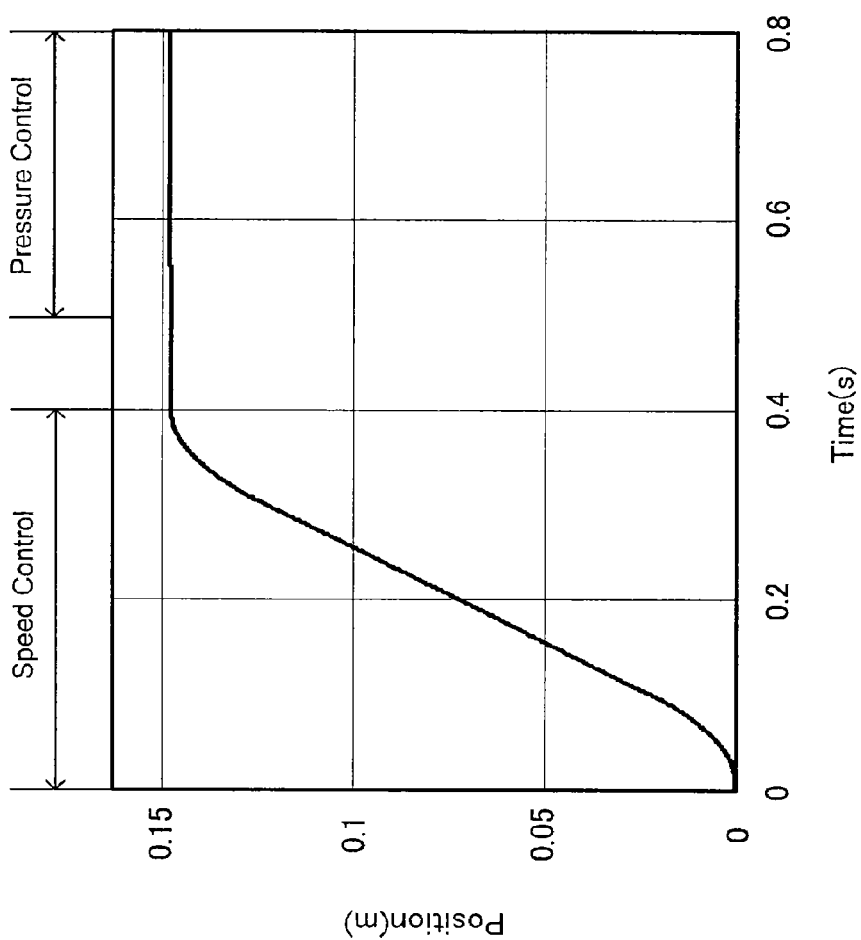
FIG. 23 illustrates simulation results of a detected position in a case where a gain that is set using a speed control reference has been applied to the control block of FIG. 12.
Figure 24:
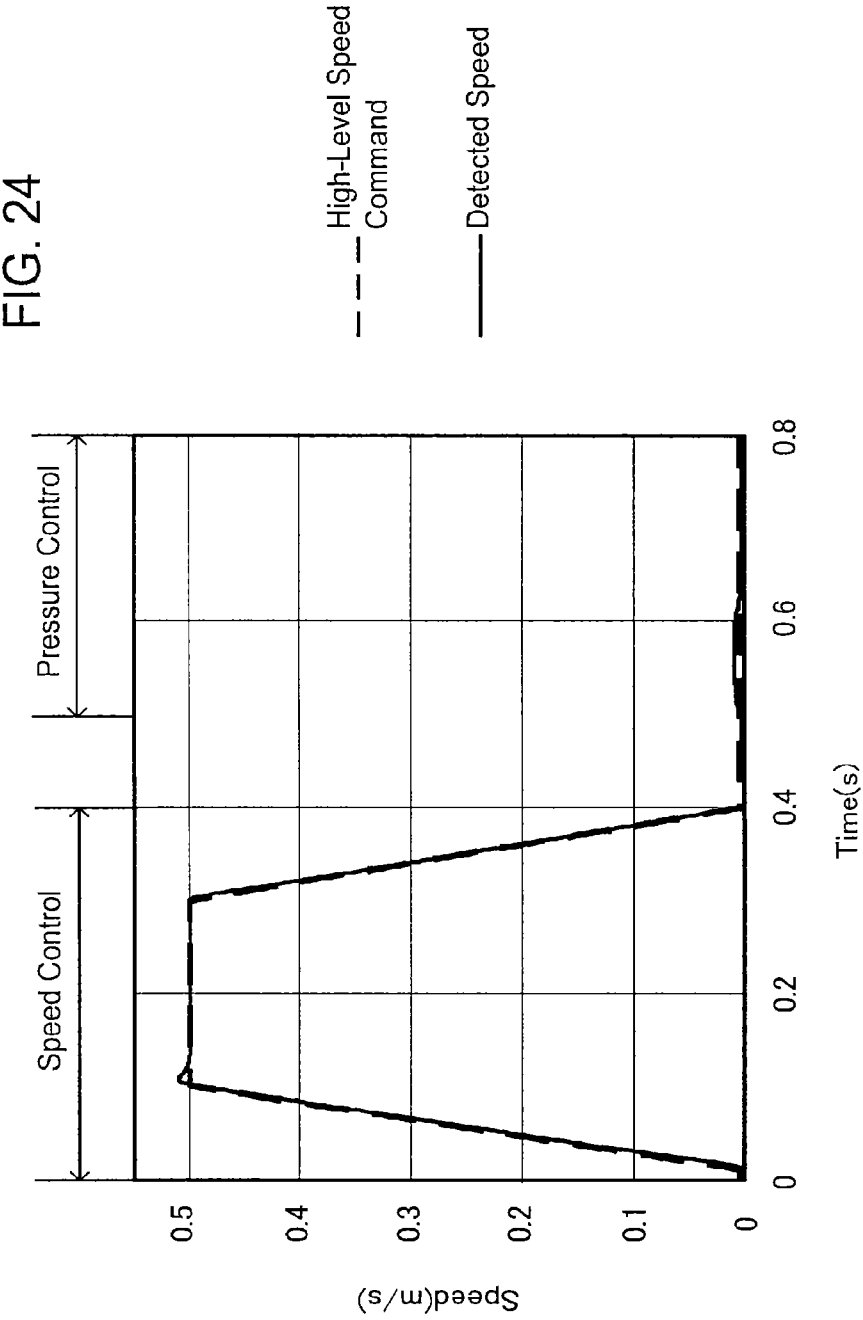
FIG. 24 illustrates simulation results of a detected speed in a case where a gain that is set using the speed control reference has been applied to the control block of FIG. 12.
Figure 25:
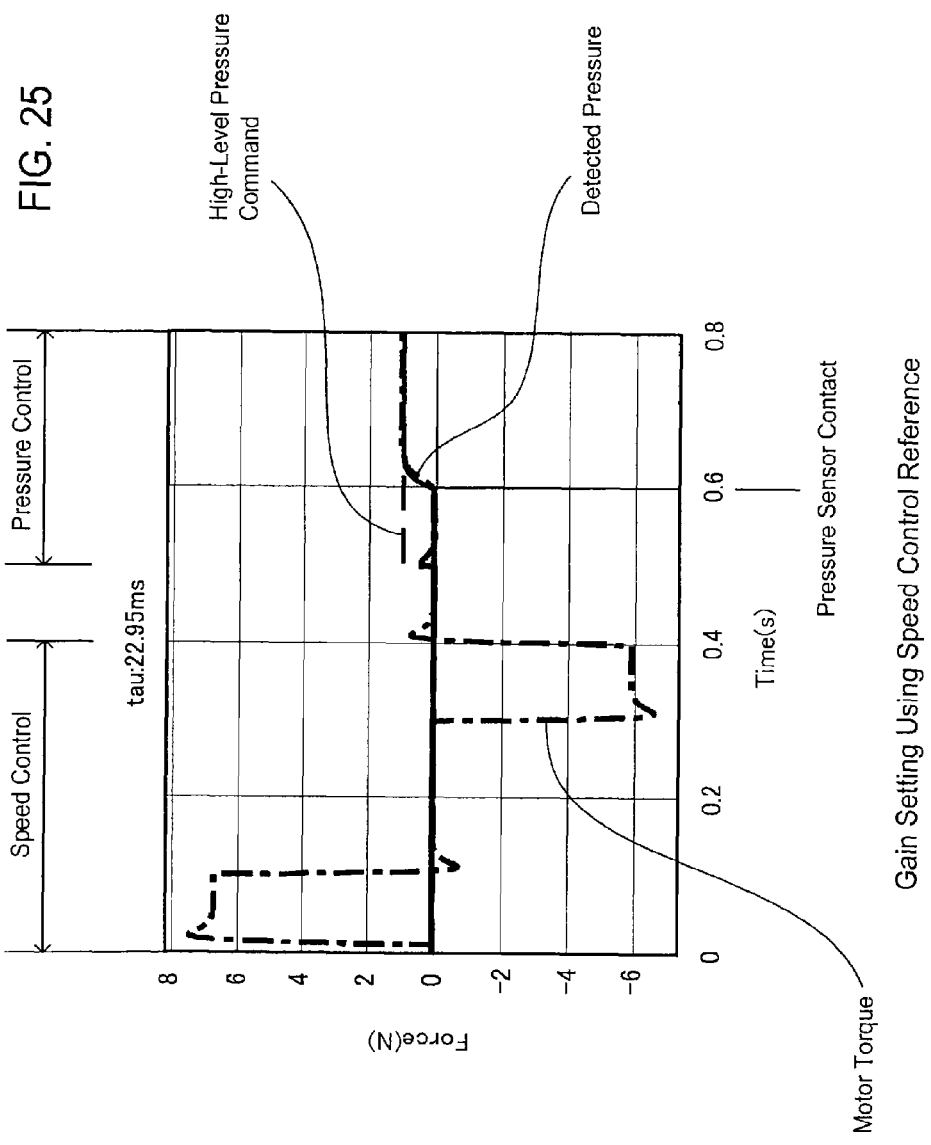
FIG. 25 illustrates simulation results of a detected pressure in a case where a gain that is set using the speed control reference has been applied to the control block of FIG. 12.

In the example illustrated in FIG. 20-22, the speed proportional gain ($k_2$) and a speed loop integration time ($k_1/k_2$) are determined based on the pressure control. However, when a speed loop gain ($k_2$) and a speed loop integration time ($k_2/k_1$), which are determined based on the speed control in a usual way, and a gain ($k_3$) that is calculated using the equation (16) are used, the gains are as illustrated in FIG. 23-25. Since the stability condition is satisfied also with the gains of FIG. 23-25, it is clear that there is no problem. Therefore, when a relation with the gain ($k_3$) is appropriate, it is also possible that the speed controller performs adjustment by one-parameter tuning as usual and thereafter adjusts the pressure control gain ($k_3$).

Specifications that are used in the above-described simulations of FIG. 20-22 and FIG. 23-25 are as listed in the following Table 1. Further, values of the control object are defined as appropriate as common-sense numerical values, and are not values obtained by assuming a particular mechanism.

TABLE 1

|  | FIG. 20-22 | FIG. 23-25 |
|---|---|---|
| J |  | 1.0 |
| $K_{st}$ |  | 10000 |
| $D_{st}$ |  | 0.01 |
| $D_{vis}$ |  | 0.02 |
| ω (rad/s) |  | 2π × 20 |
| $k_1$ | 37372 | 35530 (=integration time of about 10.6 ms) |
| $k_2$ | 376.9611 | 2π × 60 |
| $k_3$ |  | 198.4402 |

Extension to Position Control

Figure 26:
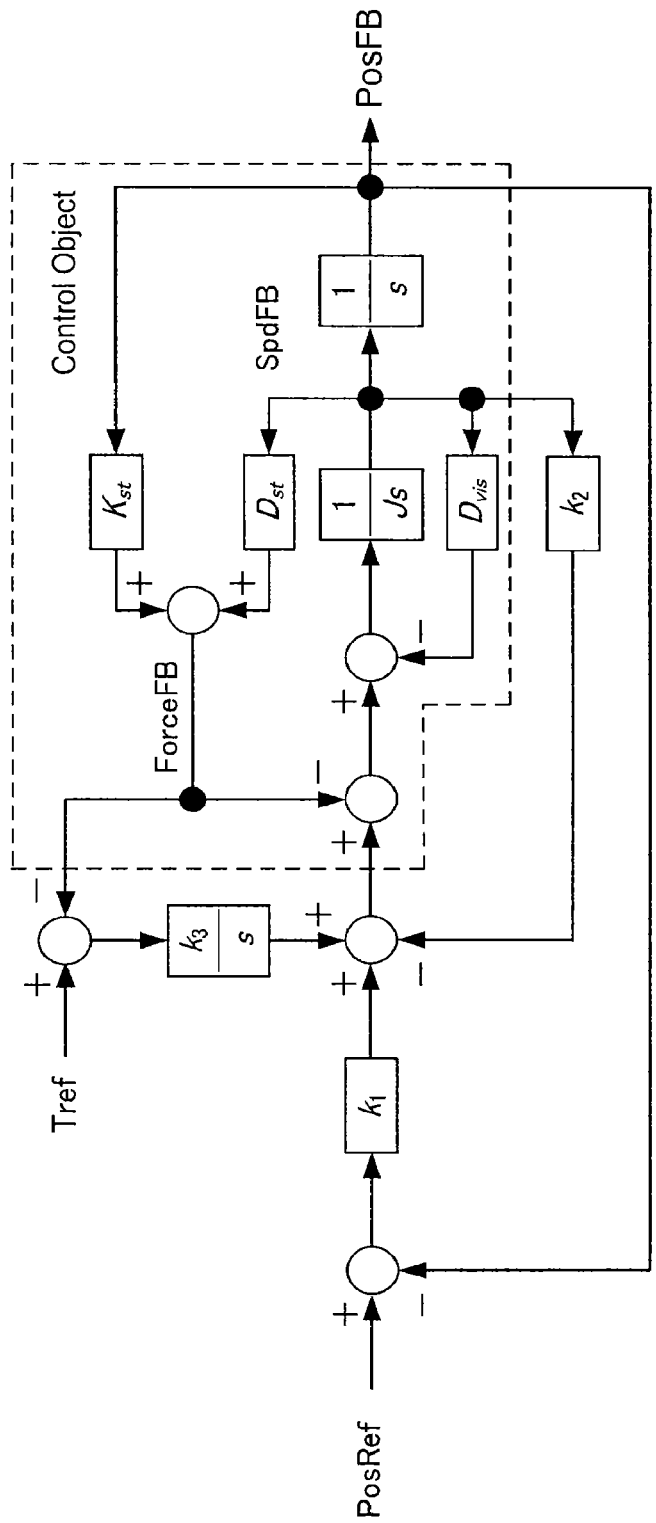
FIG. 26 is a block diagram in which the control block of FIG. 12 has been deformed in a form of position control.

Next, extension from the control block of the pressure control illustrated in FIG. 12 to position control is examined. The signal (SpdFB) immediately before being multiplied by the gain ($k_1$) in FIG. 12 can also be regarded as a difference (speed deviation) between a position command=0 and a position feedback. From this point of view, when the control block of FIG. 12 is deformed in a form in which a position command (PosRef) is input to the control block, the control block becomes as illustrated in FIG. 26. In FIG. 26, when the position command (PosRef)=0, the control block is equivalent to that of FIG. 12.

Here, in the case of the position control, when a difference between the high-level pressure command (Tref) and the detected pressure (ForceFB) is fed back to the torque command, the difference becomes a disturbance to the position control. Therefore, when an integrator is added to the position controller in order to prevent positional displacement, the pressure control does not function normally. With regard to this point, the problem can be solved by deforming the control block of FIG. 26 and rewriting the control block in a form in which, as in a control block of FIG. 27 or FIG. 28, a position correction command due to pressure control is added to a two-loop structure for position control and speed control. The control block of FIG. 1 is equivalent to the control block illustrated in FIG. 28.

Figure 27:
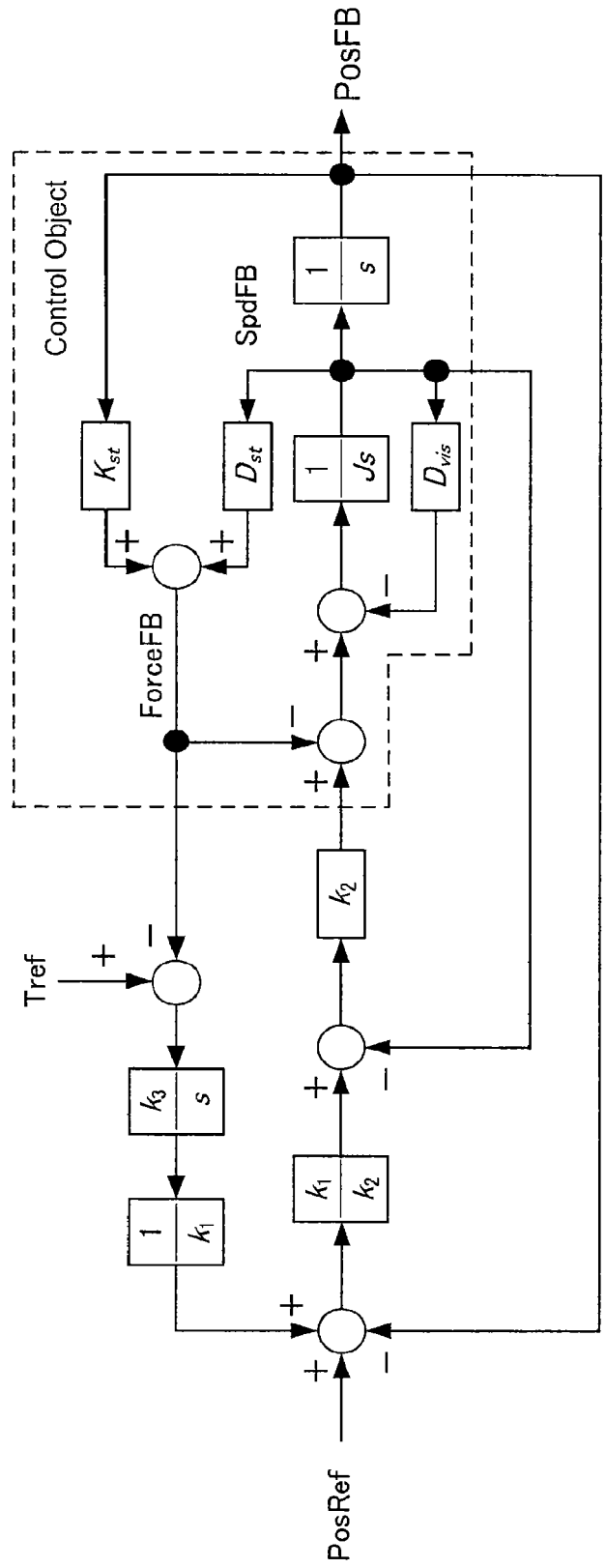
FIG. 27 is a block diagram in a case where a pressure control feedback loop in a control block of FIG. 26 has been deformed.
Figure 28:
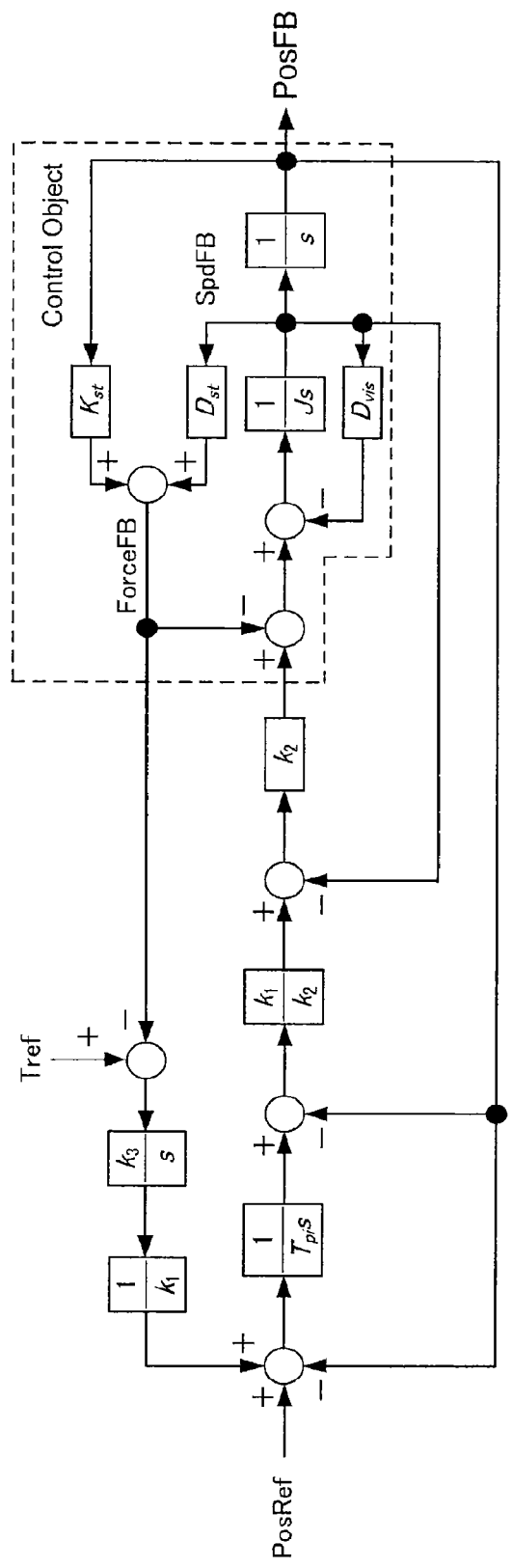
FIG. 28 is a block diagram in a case where an integrator has been added to a position controller in a control block of FIG. 27.

Since the deformation up to FIG. 27 is completely equivalent deformation, there is no change in the stability of the control loop. However, when the control loop is actually used in practice, there is a risk that positional displacement due to a steady-state disturbance may occur. In order to solve this problem, an integrator may be added to any one of the position controller and the speed controller. Here, keeping also in mind an extension to simple multiaxial synchronous control to be described later, a position integral ($1/T_{pi}s$) is added as illustrated in FIG. 28. In the control block of FIG. 28, the feedback position (PosFB) always matches the high-level position command (PosRef). Therefore, when the detected pressure (ForceFB) matches the high-level pressure command (Tref), the control block of FIG. 28 can control both the position and the pressure.

When the high-level position command (PosRef)=0, the transfer function from the high-level pressure command (Tref) to the detected pressure (ForceFB) is the following equation (17):

$$\frac{\frac{D_{st}k_3}{JT_{pi}}s + \frac{K_{st}k_3}{JT_{pi}}}{s^4 + \frac{1}{J}(D_{st} + D_{vis} + k_2)s^3 + \frac{1}{J}(K_{st} + k_1)s^2 + \frac{1}{JT_{pi}}(k_1 + D_{st}k_3)s + \frac{K_{st}k_3}{JT_{pi}}} \quad (17)$$

When s=0, the equation (17) becomes 1. Therefore, it is clear that the detected pressure (ForceFB) matches a constant high-level pressure command (Tref). Therefore, the control block of FIG. 28 can control both the position and the pressure.

Confirmation of Stability of Position Control

Stability of the position control block is confirmed as follows. From the Routh-Hurwitz stability criterion, a necessary and sufficient condition for a control loop to be stable satisfies both of the following equation (18) and equation (19):

$$\begin{vmatrix} \frac{1}{J}(D_{vis} + D_{st} + k_2) & \frac{1}{JT_{pi}}(k_1 + D_{st}k_3) & 0 \\ 1 & \frac{1}{J}(k_1 + K_{st}) & \frac{K_{st}k_3}{JT_{pi}} \\ 0 & \frac{1}{J}(D_{vis} + D_{st} + k_2) & \frac{1}{JT_{pi}}(k_1 + D_{st}k_3) \end{vmatrix} > 0, \quad (18)$$

$$\begin{vmatrix} \frac{1}{J}(D_{vis} + D_{st} + k_2) & \frac{1}{JT_{pi}}(k_1 + D_{st}k_3) \\ 1 & \frac{1}{J}(k_1 + K_{st}) \end{vmatrix} > 0. \quad (19)$$

When expanded, the equation (18) becomes the following equation (18)':

$$\frac{1}{J^3T_{pi}}(D_{vis} + D_{st} + k_2) \qquad (18)'$$

$$\{(k_1 + D_{st}k_3)(K_{st} + k_1) - (D_{vis} + D_{st} + k_2)K_{st}\} - \frac{(k_1 + D_{st}k_3)^2}{J^2T_{pi}}.$$

For simplicity, assuming that $D_{vis}=D_{st}=0$, when expanded, the equation (18)' becomes the following equation (18)":

$$-\frac{k_1^2}{J^2T_{pi}^2} + \frac{k_2}{J^3T_{pi}}(k_1K_{st} + k_1^2 - k_2k_3K_{st}) > 0. \quad (18)''$$

When the equation (18)" is solved, the following equation (20) is obtained:

$$k_3 > \frac{k_1^2}{k_2K_{st}}\left(\frac{K_{st}}{k_1} + 1 - \frac{J}{k_2T_{pi}}\right). \quad (20)$$

Similarly, assuming that $D_{vis}=D_{st}=0$, when expanded, the equation (19) becomes the following equation (19)':

$$-\frac{k_1}{JT_{pi}} + \frac{k_2}{J^2}(K_{st} + k_1) > 0. \quad (19)'$$

When the equation (19)' is solved, the following equation (21) is obtained.

$$k_2 > \frac{Jk_1}{T_{pi}(K_{st} + k_1)}. \quad (21)$$

As a result, it is clear that in order to satisfy the equation (18) and the equation (19) at the same time, it is sufficient to satisfy the equation (20) and the equation (21) at the same time.

Examination of Application of Pole Placement Method of Position Control

Here, as an example, a condition that allows the characteristic polynomial of the equation (17) to have four roots is examined.

When a comparison between $(s+\omega)^4 = s^4 + 4\omega s^3 + 6\omega^2 s^2 + 4\omega^3 s + \omega^4$ and the coefficients of the characteristic polynomial of the equation (17) is performed, the following equations can be obtained:

$$4\omega = \frac{1}{J}(D_{vis} + D_{st} + k_2), \quad (22)$$

$$6\omega^2 = \frac{1}{J}(k_1 + K_{st}), \quad (23)$$

$$4\omega^3 = \frac{1}{JT_{pi}}(k_1 + k_3 D_{st}), \quad (24)$$

$$\omega^4 = \frac{k_3 K_{st}}{JT_{pi}}. \quad (25)$$

From the equations (22)-(25), when $D_{vis} = D_{st} = 0$ is assumed for simplicity, the gains ($k_1$, $k_2$, $k_3$) and an integration time ($T_{pi}$) can be expressed as functions of the response frequency ($\omega$) as follows:

$$k_1 = 6\omega^2 J - K_{st}, \quad (26)$$

$$k_2 = 4\omega J, \quad (27)$$

$$k_3 = \frac{\omega k_1}{4K_{st}}, \quad (28)$$

$$T_{pi} = \frac{k_1}{4\omega^3 J}. \quad (29)$$

Since the above equations do not guarantee the stability, confirmation is required separately using the equations (20) and (21).

Operation Confirmation of Position Control by Simulation

Figure 29:
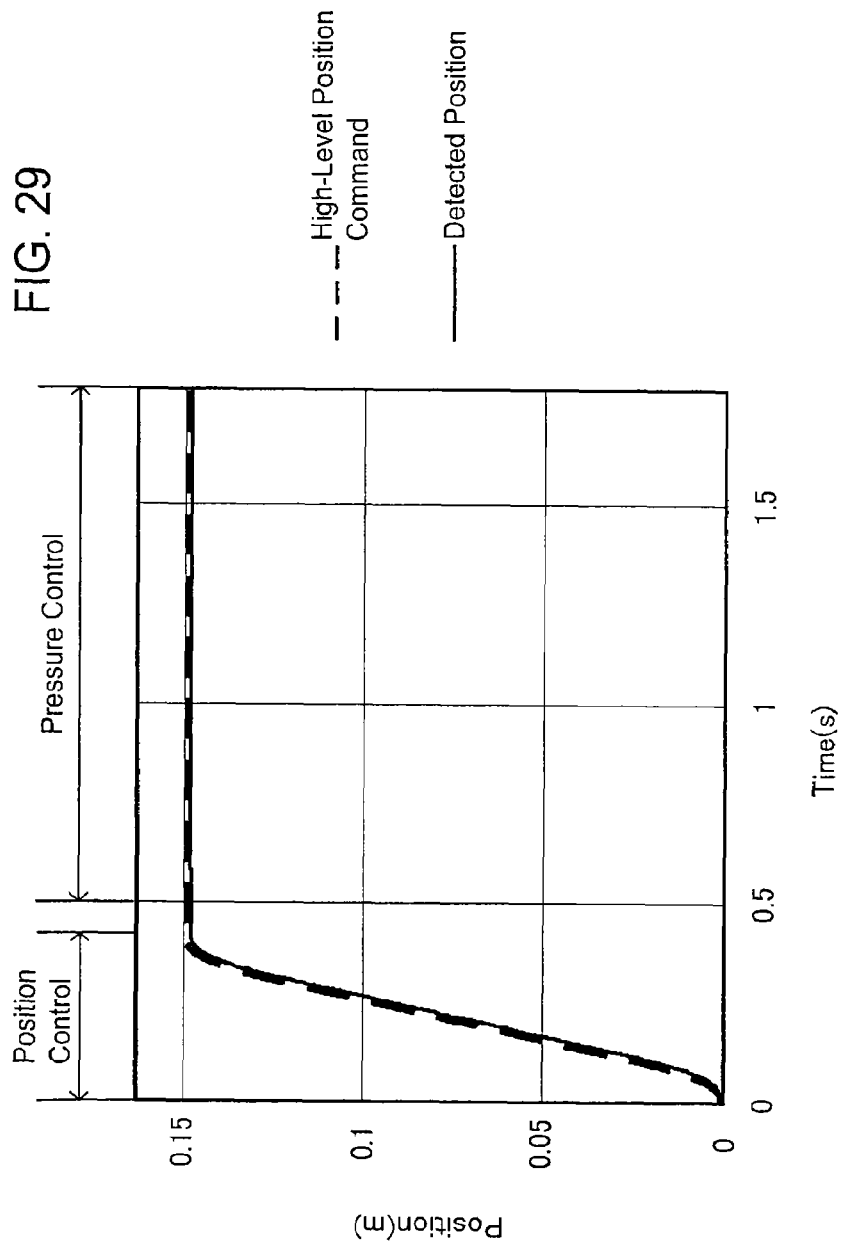
FIG. 29 illustrates simulation results of a detected position in a case where a gain that is set using the pole placement method has been applied to a control block of FIG. 28.
Figure 30:
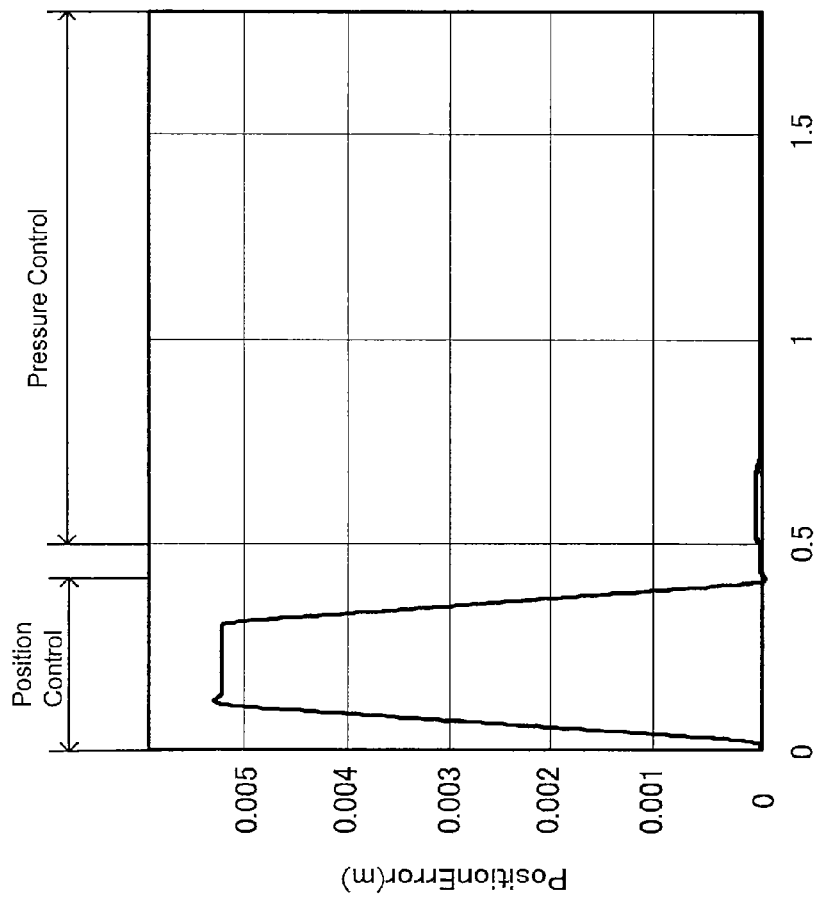
FIG. 30 illustrates simulation results of a position deviation in a case where a gain that is set using the pole placement method has been applied to the control block of FIG. 28.
Figure 31:
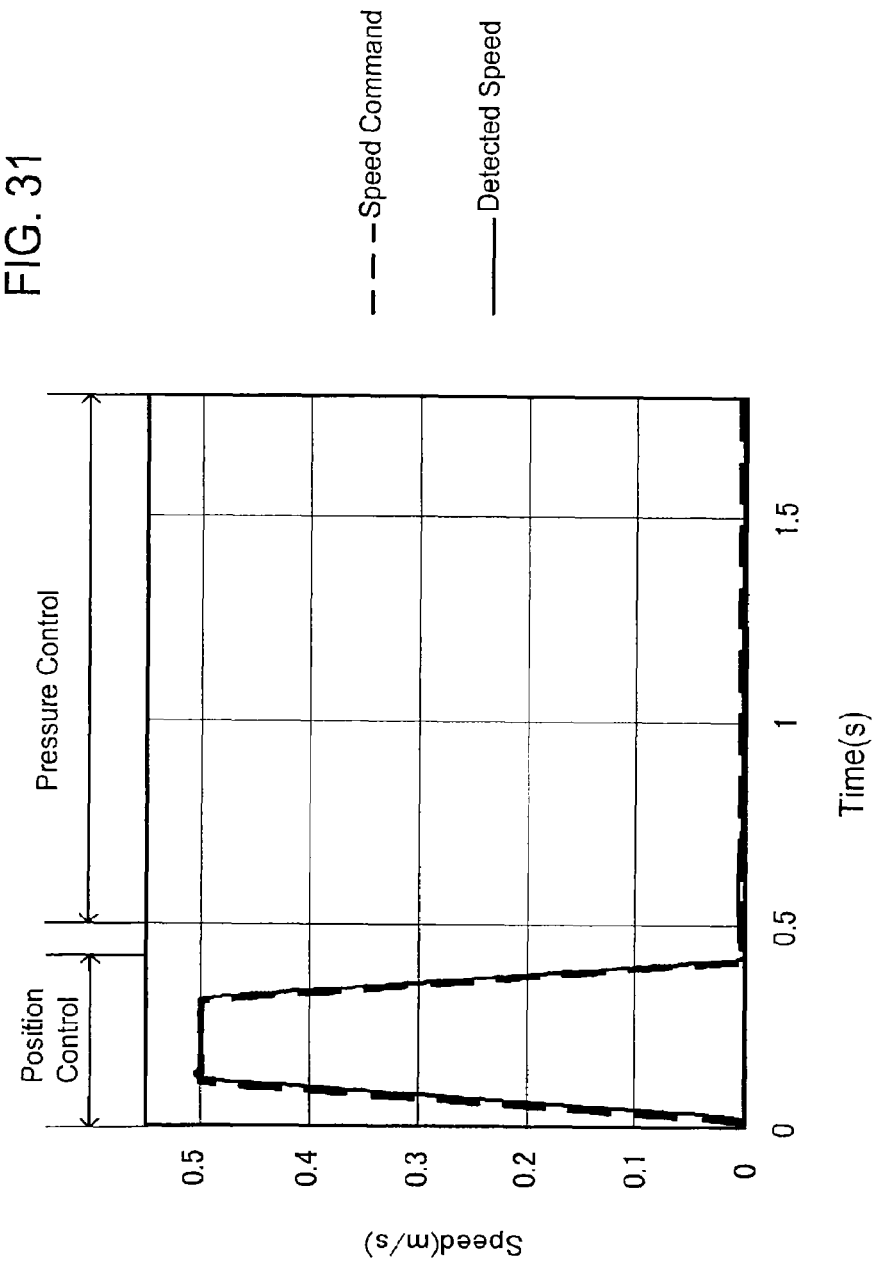
FIG. 31 illustrates simulation results of a detected speed in a case where a gain that is set using the pole placement method has been applied to the control block of FIG. 28.
Figure 32:
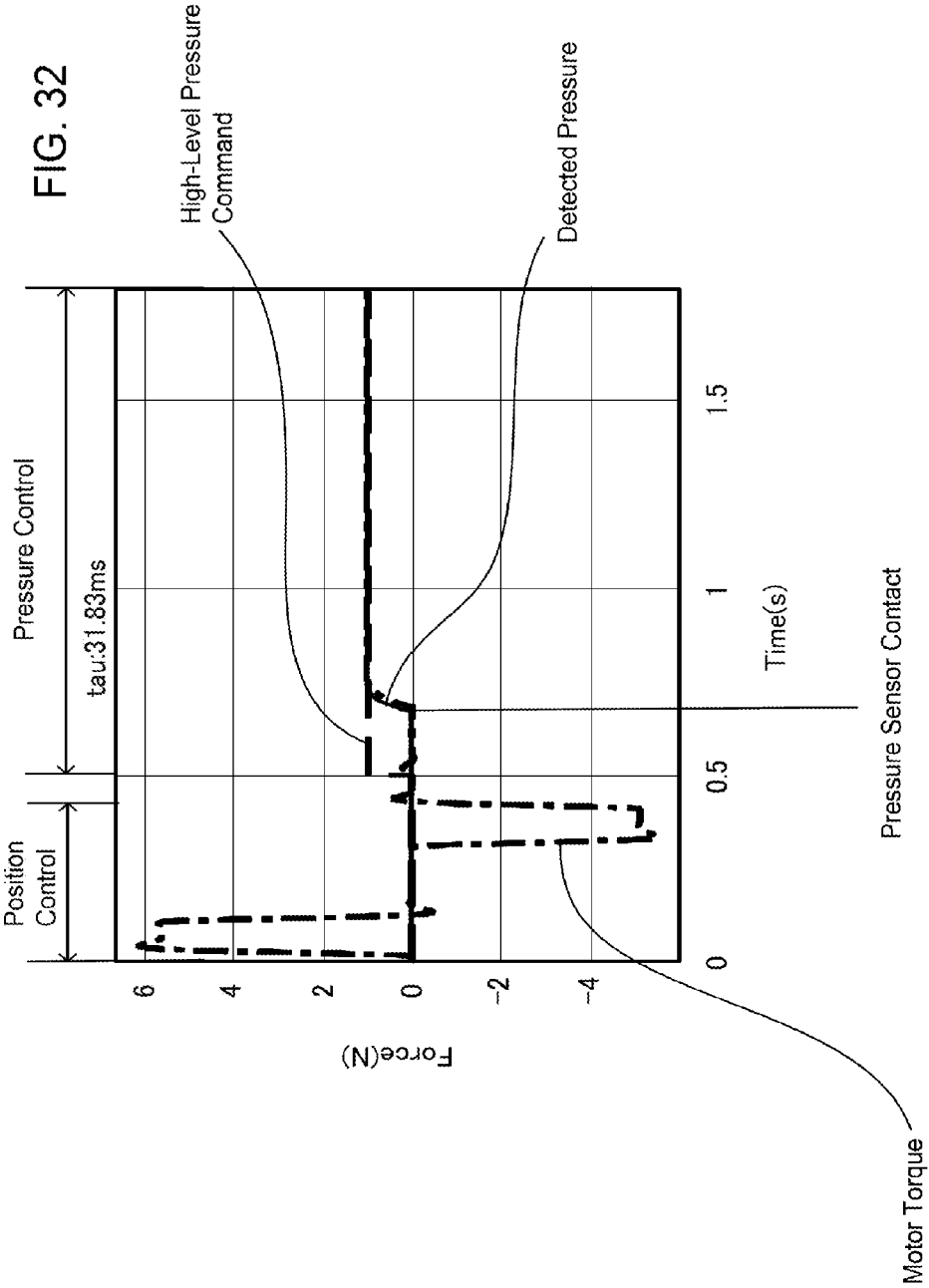
FIG. 32 illustrates simulation results of a detected pressure in a case where a gain that is set using the pole placement method has been applied to the control block of FIG. 28.
Figure 33:
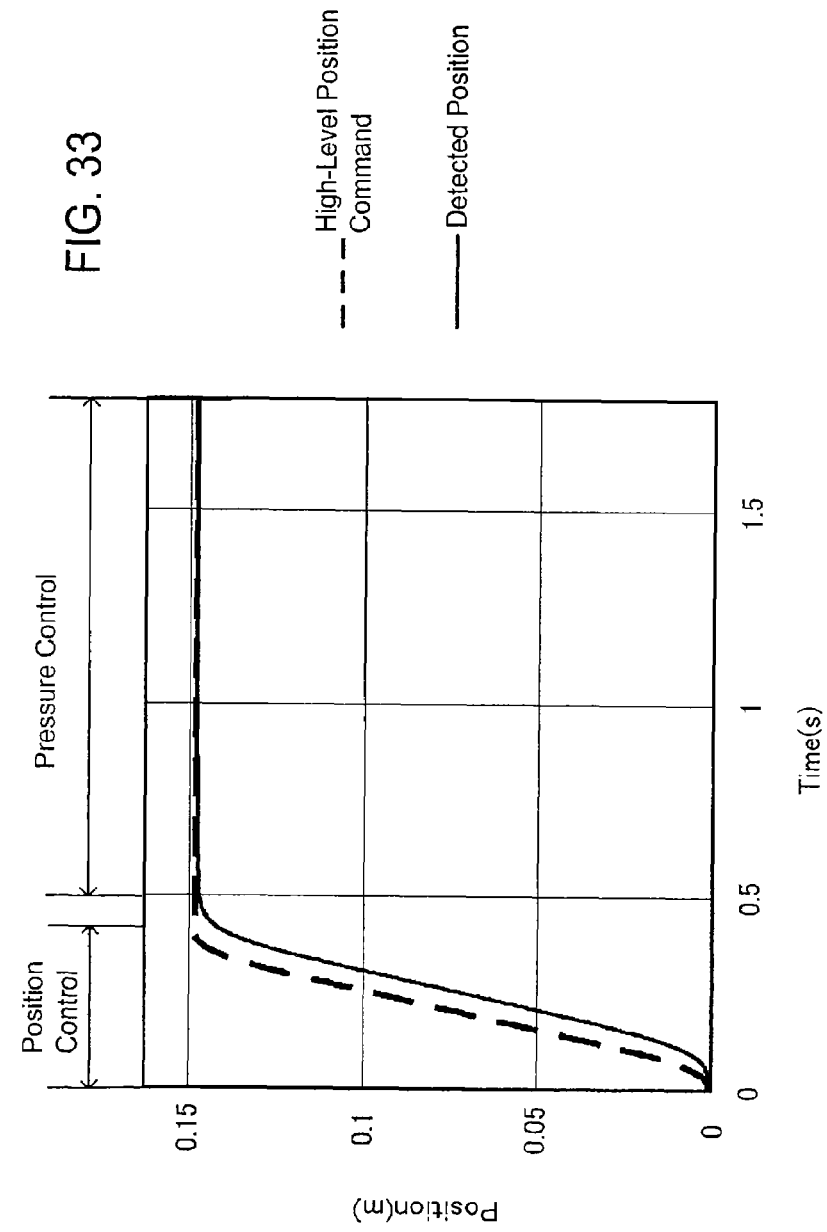
FIG. 33 illustrates simulation results of a detected position in a case where a gain that is set using a position control reference has been applied to the control block of FIG. 28.
Figure 34:
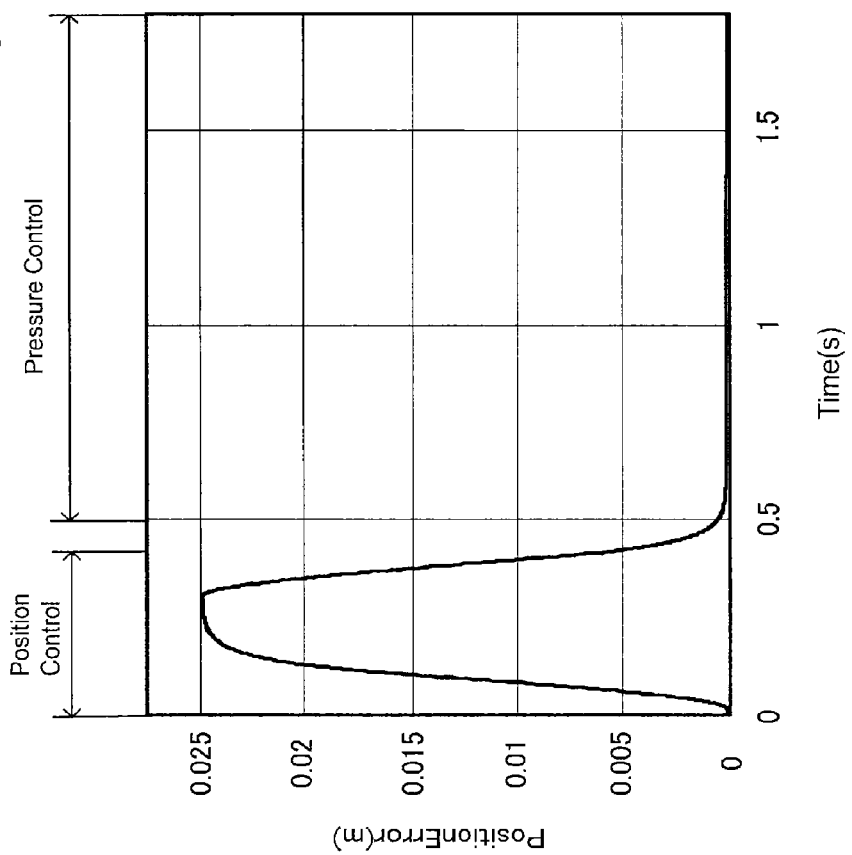
FIG. 34 illustrates simulation results of a position deviation in a case where a gain that is set using the position control reference has been applied to the control block of FIG. 28.
Figure 35:
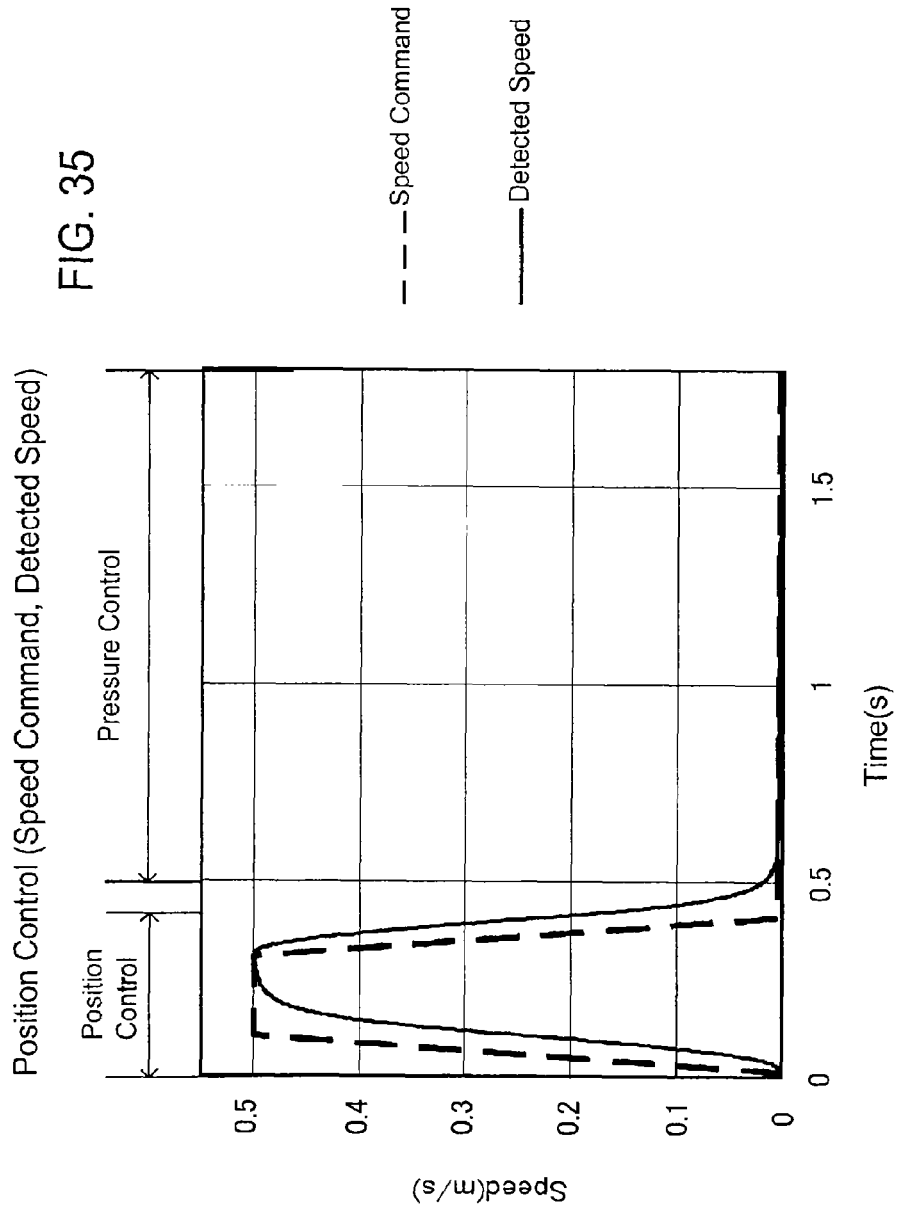
FIG. 35 illustrates simulation results of a detected speed in a case where a gain that is set using the position control reference has been applied to the control block of FIG. 28.
Figure 36:
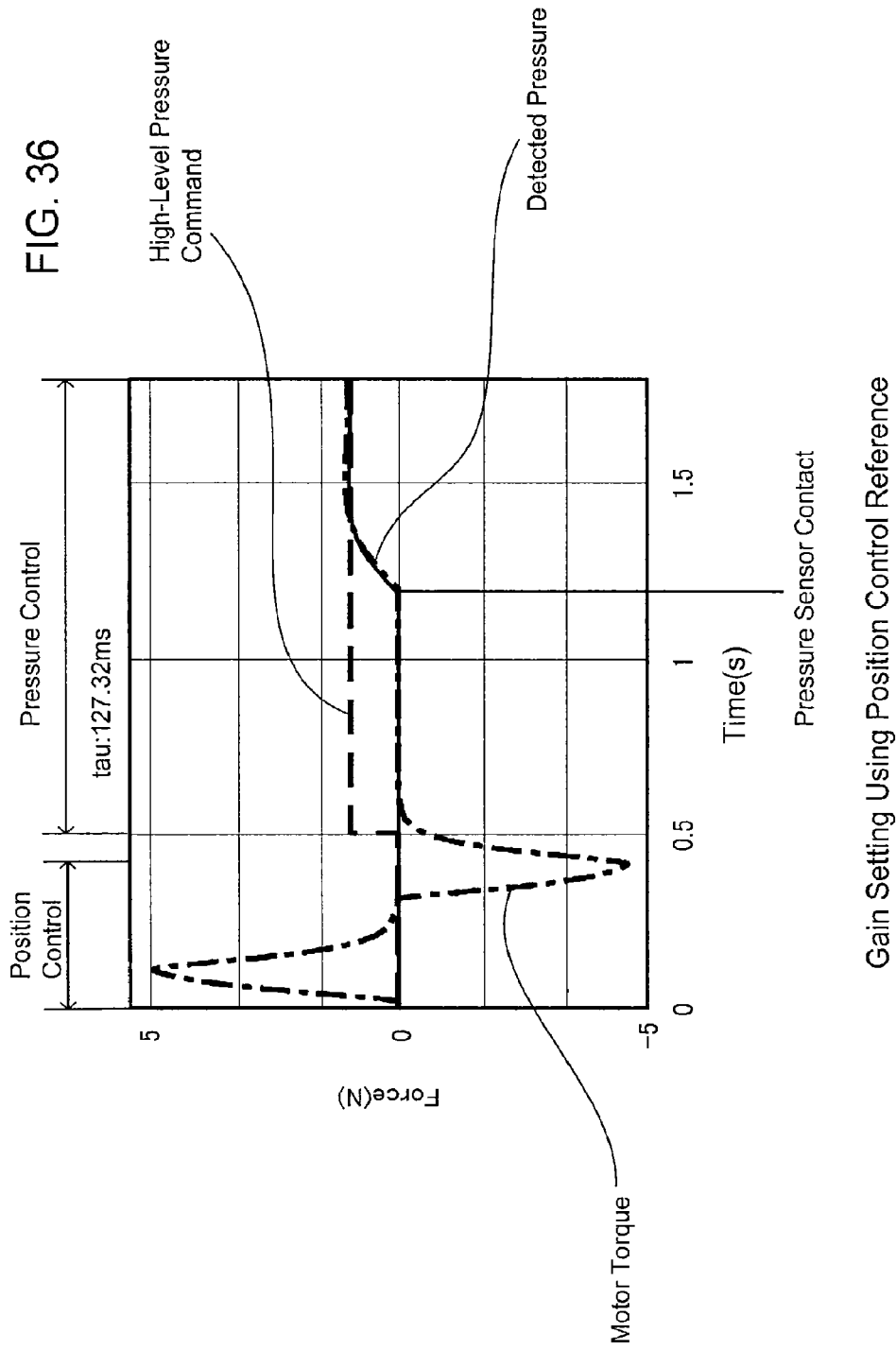
FIG. 36 illustrates simulation results of a detected pressure in a case where a gain that is set using the position control reference has been applied to the control block of FIG. 28.

Operation waveforms in the case where simulation is performed using gains that are calculated using the equations (26)-(29) are illustrated in FIG. 29-32. FIG. 29 corresponds to the high-level position command (PosRef) and the detected position (PosFB); FIG. 30 corresponds to the position deviation; FIG. 31 corresponds to the speed command and the detected speed (SpdFB); and FIG. 32 corresponds to the motor torque, the high-level pressure command (Tref) and the detected pressure (ForceFB). As an operation, which is the same in each of FIG. 29-32, after the high-level control device inputs the high-level position command (PosRef) from 0 sec to 0.4 sec, from 0.5 sec, input of the high-level pressure command (Tref) is automatically switched. The pressure sensor becomes in contact with the object from about 0.6 sec. From FIG. 29-32, it is clear that the speed control and the pressure control can operate in the same control block of FIG. 28.

In the example illustrated in FIG. 29-32, the loop gains ($k_1/k_2$, $k_2$) of position and speed and the position loop integration time ($T_{pi}$) are determined based on the pressure control. However, when loop gains ($k_1/k_2$, $k_2$) of position and speed and a position loop integration time ($T_{pi}$), which are determined based on the position control in a usual way, and a gain ($k_3$) that is calculated using the equation (26) are used, the gains are as illustrated in FIG. 33-36. Since the stability condition is satisfied also with the gains of FIG. 33-36, it is clear that there is no problem. Therefore, when a relation with the gain ($k_3$) is appropriate, it is also possible that the position/speed controller performs adjustment by one-parameter tuning as usual and thereafter adjusts the pressure control gain ($k_3$).

Specifications that are used in the above-described simulations of FIGS. 29-32 and FIG. 33-36 are as listed in the following Table 2. Further, values of the control object are defined as appropriate as common-sense numerical values, and are not values obtained by assuming a particular mechanism.

TABLE 2

|  | FIG. 29-32 | FIG. 33-36 |
|---|---|---|
| J | 1.0 | |
| $K_{st}$ | 10000 | |
| $D_{st}$ | 0.01 | |
| $D_{vis}$ | 0.02 | |
| $\omega$ (rad/s) | $2\pi \times 20$ | $2\pi \times 5$ |
| $k_1$ | 84748 | 40212 (Kp = 80/s) |
| $k_2$ | 502.6248 | $2\pi \times 80$ |
| $k_3$ | 266.2527 | 31.5830 |
| $T_{pi}$ (ms) | 10.7 | 50.0 |

Extension to Multiaxial Synchronous Control

Figure 37:
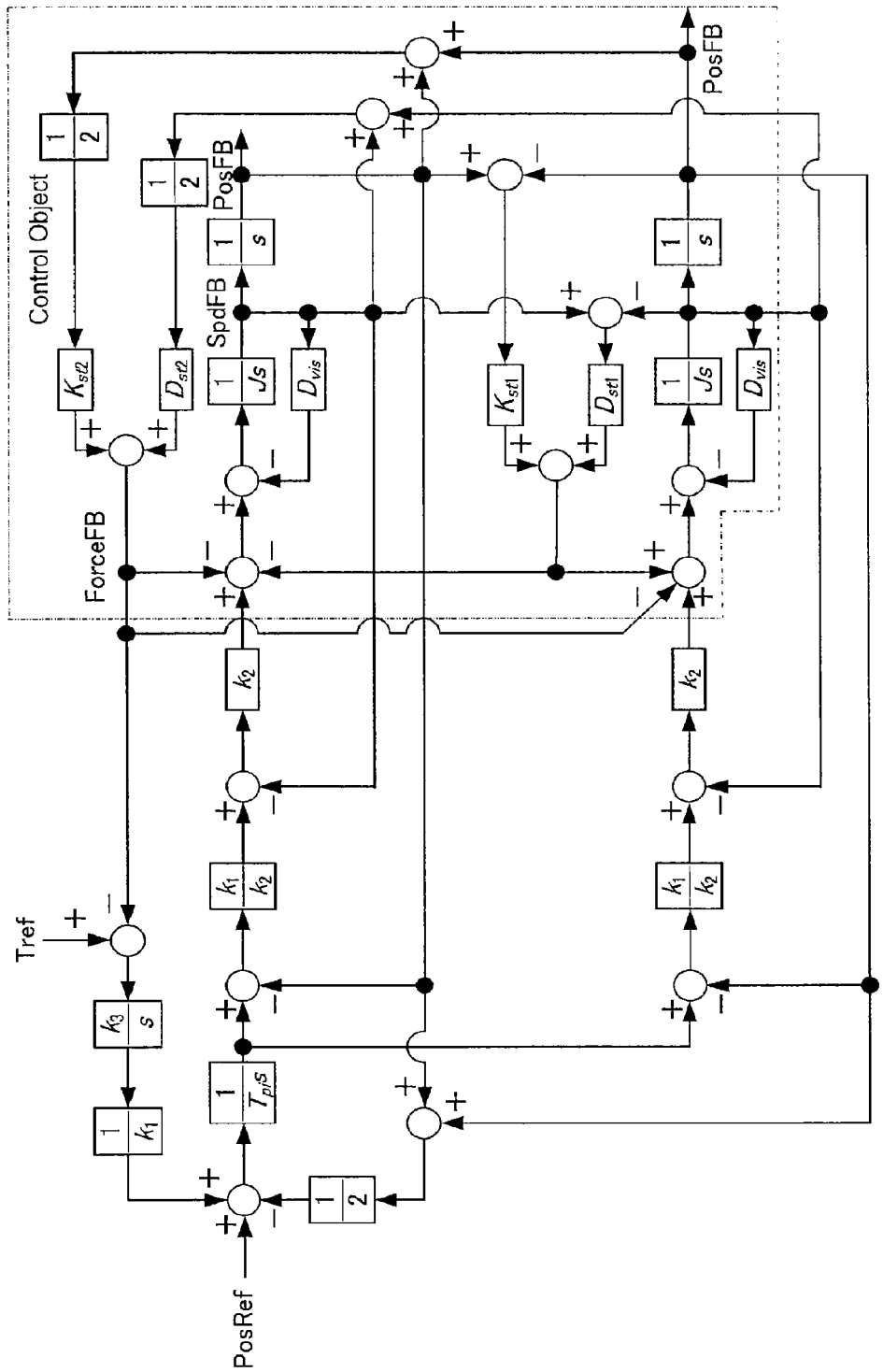
FIG. 37 is a block diagram in a case where the control block of FIG. 28 has been extended to biaxial synchronous control.
Figure 38:
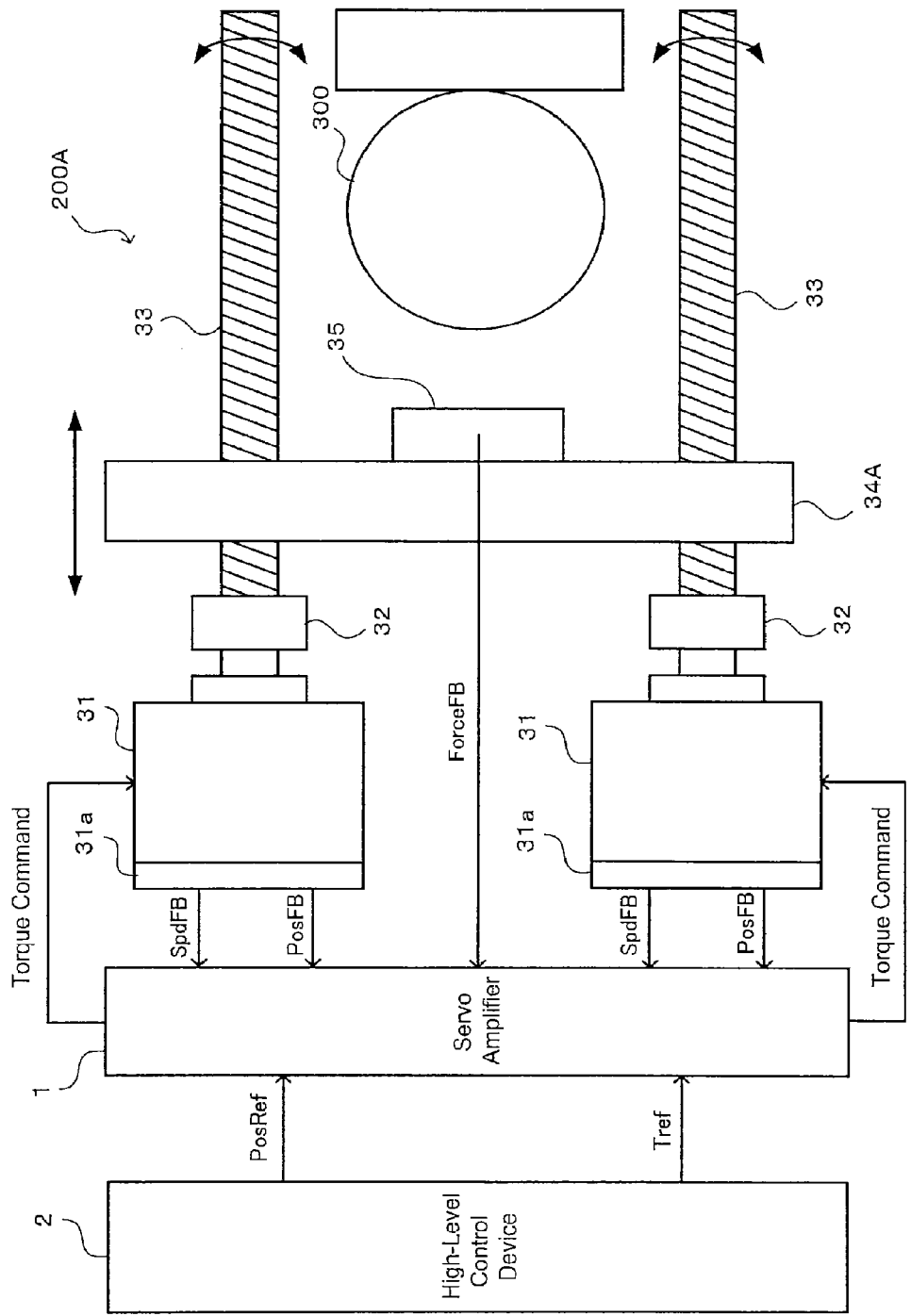
FIG. 38 illustrates an example of a specific structure of a pressure control system that is applied to a servo amplifier of biaxial synchronous control.
Figure 39:
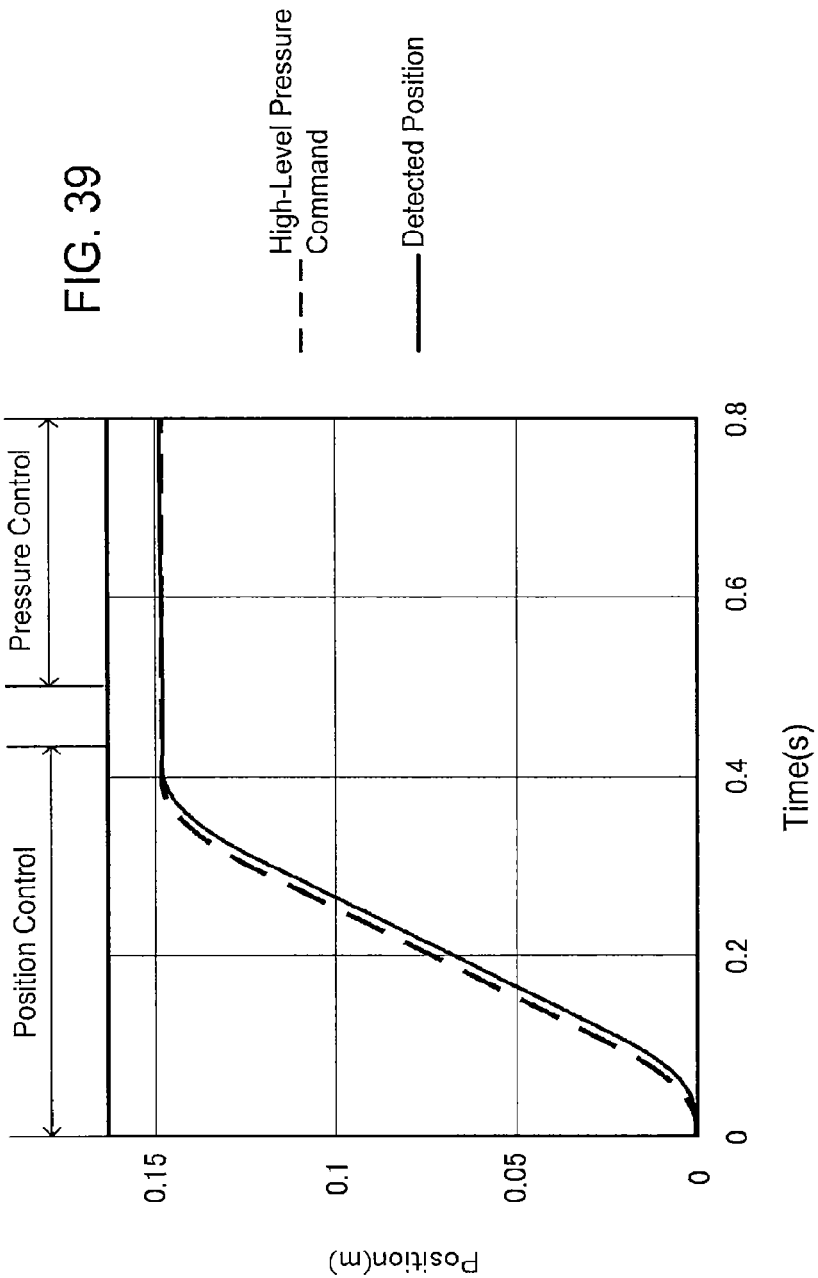
FIG. 39 illustrates simulation results of a detected position in a case where a gain that is set using the pole placement method has been applied to a control block of FIG. 37.
Figure 40:
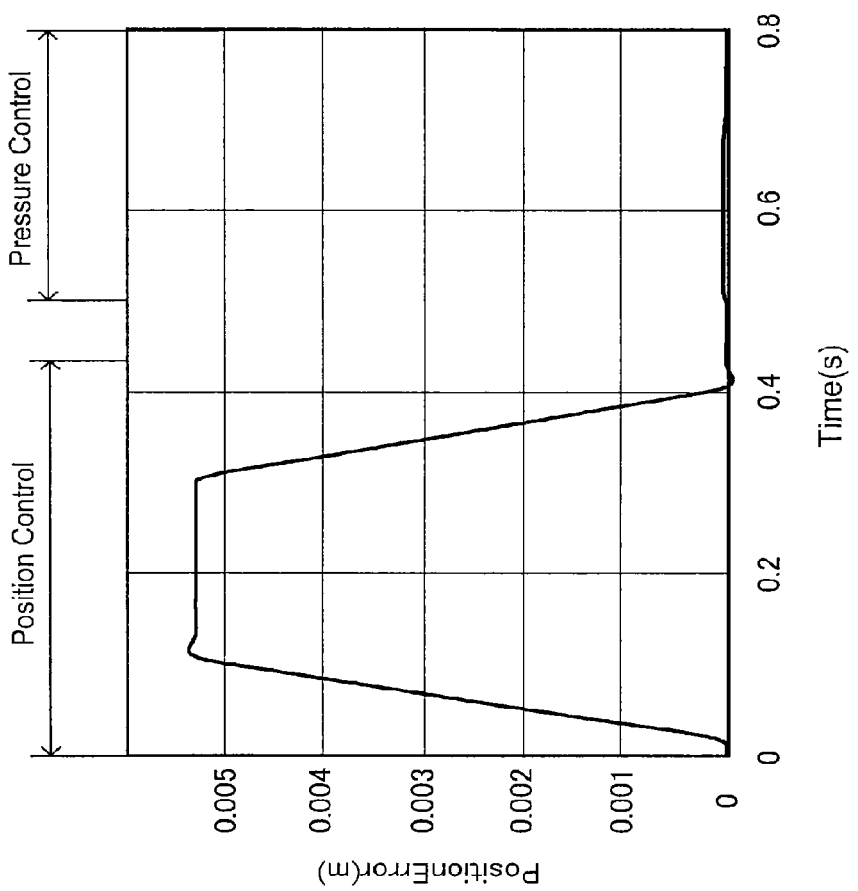
FIG. 40 illustrates simulation results of a position deviation in a case where a gain that is set using the pole placement method has been applied to the control block of FIG. 37.
Figure 41:
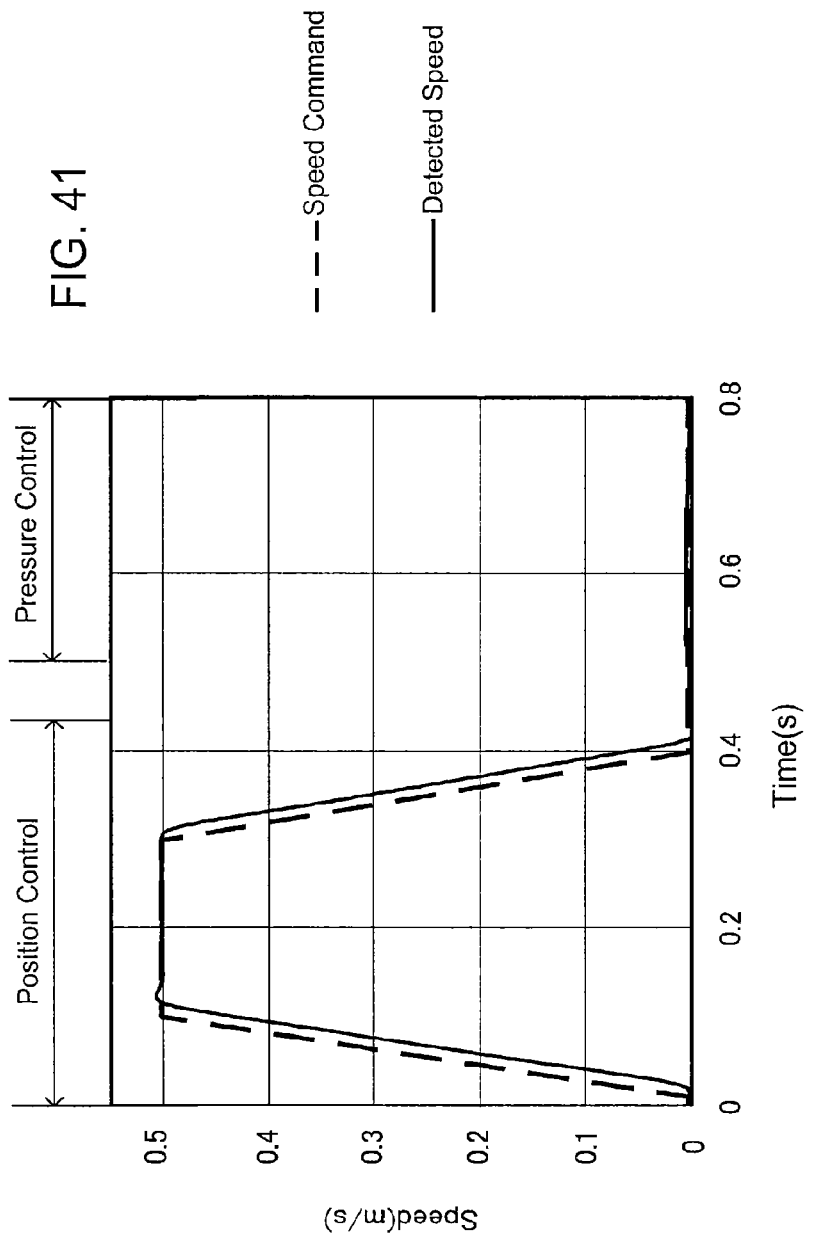
FIG. 41 illustrates simulation results of a detected speed in a case where a gain that is set using the pole placement method has been applied to the control block of FIG. 37.
Figure 42:
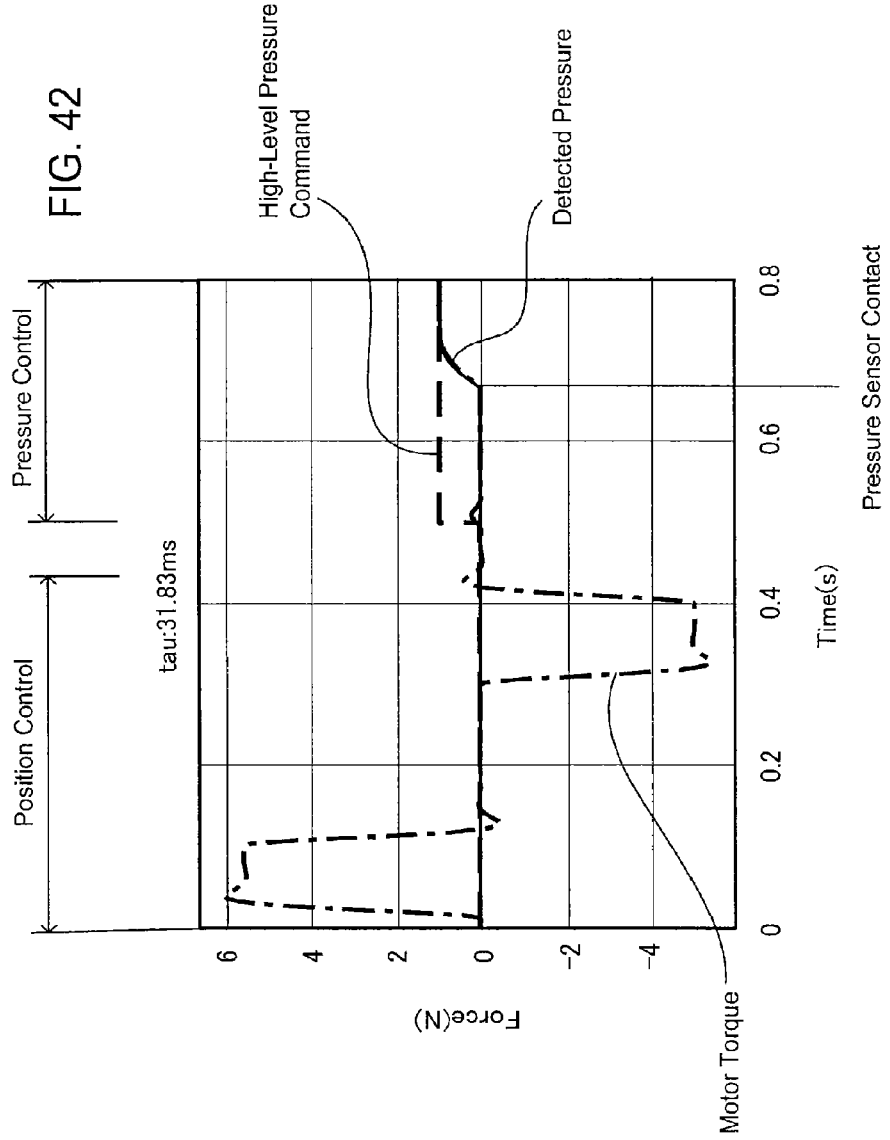
FIG. 42 illustrates simulation results of a detected pressure in a case where a gain that is set using the pole placement method has been applied to the control block of FIG. 37.

As described above, the control block of FIG. 28 can be easily extended to multiaxial synchronous control. FIG. 37 illustrates a diagram of a control block that has been extended to biaxial synchronous control. The control block of FIG. 37 assumes a mechanism in which, for example, as illustrated in FIG. 38 that corresponds to FIG. 2, one movable plate (34A) is provided as a beam extending across a movable part of a linear motion mechanism that is driven by two shafts and a pressure sensor 35 is positioned at a middle position of the movable plate (34A). Although not mentioned in detail here, as a concept, it is characterized in that accumulation toward an integrator, which is one of reasons that cause the two shafts to vibrate, is not for each of the two shafts, but is common for the two shafts.

Waveforms in the case where the control block of FIG. 37 is simulated using the same gains as FIG. 28 are illustrated in FIG. 39-42. In this case, in order to facilitate understanding of an effect of the synchronous control, for a detected speed (SpdFB) and a detected position (PosFB) of the second shaft, a steady-state offset corresponding to 5% of the detected speed (SpdFB) is set. From FIG. 39-42, a difference due to the offset can be observed in a torque command. However, the position control and the detected pressure have the same results as in the case where the control is performed using one shaft.

Addition of Control Path for Loop Stabilization

In the pressure feedback control that is examined above, it is possible that, depending on an inertia moment ratio of the control object or a spring constant, a gain that allows a characteristic equation to have a multiple-root solution is a negative value. Even when the gain is a negative value, since the pressure feedback loop is stable, there is no problem. However, when the speed control and the position control share the same gain, there is a problem that the control loop becomes unstable. In the present examination, a method is examined in which, without depending on characteristics of the control object, a gain that allows a characteristic equation to have a multiple-root solution in any state of the pressure feedback/position control/speed control is a positive value.

Derivation of Control Block of Force Control Base and Speed Control Base

For the control block of the pressure feedback described in FIG. 12, the transfer function from the high-level pressure command (Tref) to the detected pressure (ForceFB) is the following equation (30):

$$\frac{\frac{D_{st}}{J}k_3 s + \frac{k_3 K_{st}}{J}}{s^3 + \frac{1}{J}(D_{vis} + D_{st} + k_2)s^2 + \frac{1}{J}(k_1 + K_{st} + k_3 D_{st})s + \frac{k_3 K_{st}}{J}}. \quad (30)$$

The gains that allow the characteristic polynomial of the equation (30) to have a multiple-root solution can be obtained from the equations (14)-(16) described above. As can be seen from equation (14), depending on J or $K_{st}$, the gain ($k_2$) may be a negative value. This is probably not a significant problem for a force control base. However, for a speed control base, when the pressure sensor is in a non-contact state, the speed control is a positive feedback, and thus there is a problem. In this case, the second term ($K_{st}$) on the right-hand side of the equation (14) causes the gain to be negative and thus it is preferable to eliminate this term. Further, the second term on the right-hand side of the equation (14) causes $K_{st}$ to be included in a first-order coefficient in a characteristic polynomial of the equation (30). Therefore, in order to eliminate $K_{st}$ from the first-order coefficient in the characteristic polynomial of the equation (30), as illustrated in FIG. 43, a control path (H) that cancels a spring reaction force, that is, a control path (H) that directly adds the detected pressure (ForceFB) to a torque command may be added.

Figure 43:
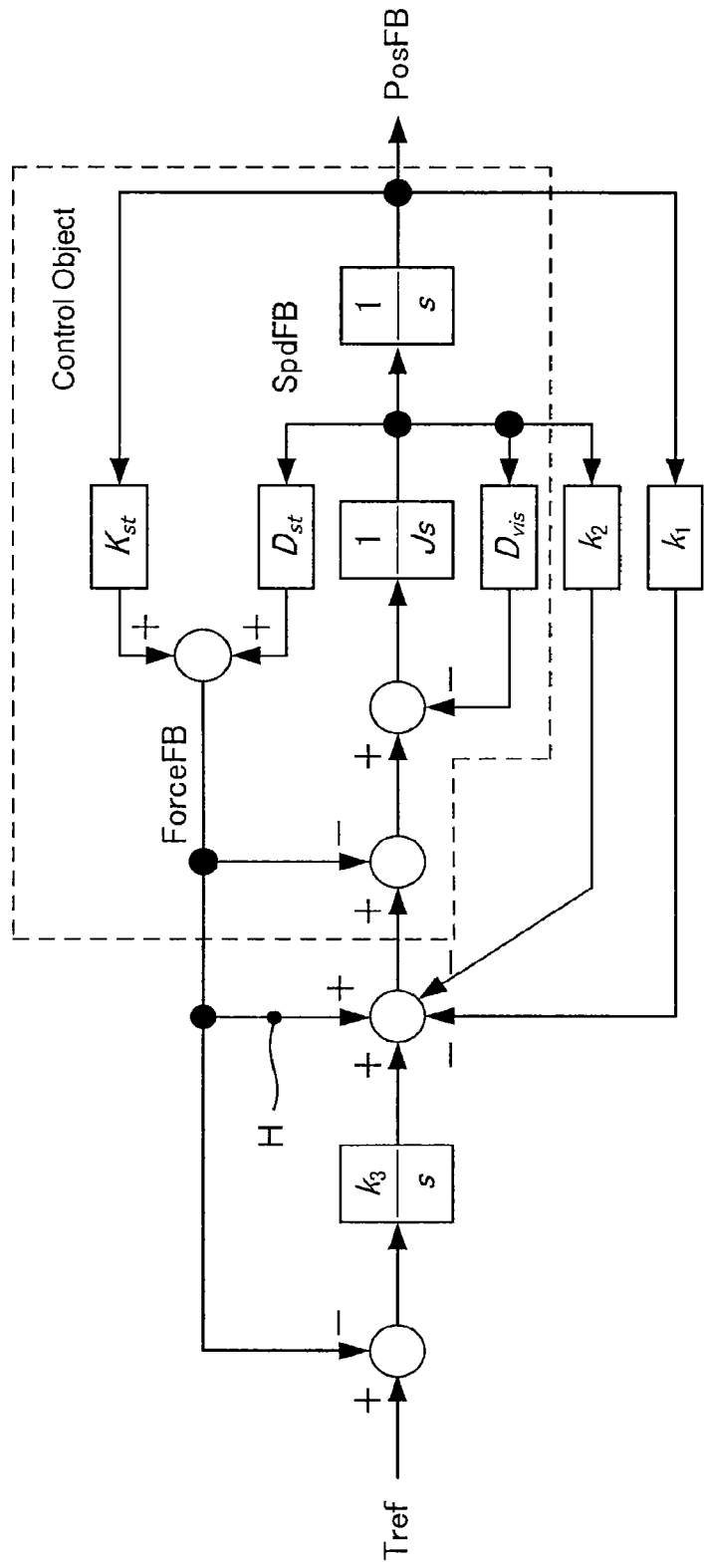
FIG. 43 is a block diagram in a case where a control path for loop stabilization has been added to the control block of FIG. 12.

A transfer function from the high-level pressure command (Tref) to the detected pressure (ForceFB) in the case of FIG. 43 is the following equation (31):

$$\frac{\frac{D_{st}}{J}k_3 s + \frac{k_3 K_{st}}{J}}{s^3 + \frac{1}{J}(D_{vis} + k_2)s^2 + \frac{1}{J}(k_1 + k_3 D_{st})s + \frac{k_3 K_{st}}{J}}. \quad (31)$$

As compared to the equation (30), in the equation (31), $D_{st}$ (in the second-order coefficient) and $K_{st}$ (in the first-order coefficient) are eliminated from the characteristic polynomial. Further, when the control block of the force control base illustrated in FIG. 43 is extended to the speed control using the same method as described in the above Extension to Speed Control section, a control block of FIG. 44 that corresponds to the above-described FIG. 19 is obtained.

Derivation of Control Block of Position Control Base

For the control block of the position control feedback described in FIG. 28, the transfer function from the high-level pressure command (Tref) to the detected pressure (ForceFB) is the following equation (32):

$$\frac{\frac{D_{st}k_3}{JT_{pi}}s + \frac{K_{st}k_3}{JT_{pi}}}{s^4 + \frac{1}{J}(D_{vis} + D_{st} + k_2)s^3 + \frac{1}{J}(K_{st} + k_1)s^2 + \frac{1}{JT_{pi}}(k_1 + D_{st}k_3)s + \frac{K_{st}k_3}{JT_{pi}}}. \quad (32)$$

The gains that allow the characteristic polynomial of the equation (32) to have a multiple-root solution can be obtained from the equations (26)-(29) described above. As can be seen from equation (26), depending on J or $K_{st}$, the gain ($k_1$) may be a negative value. Along with this, the gain ($k_3$) and the position integration time ($T_{pi}$) that are obtained from the equations (28) and (29) may also be negative values. For a position control base, when the pressure sensor is in a non-contact state, the position control is a positive feedback, and thus this is a problem. The second term on the right-hand side of the equation (26) causes the gain to be negative and thus it is preferable to eliminate this term. Further, the second term on the right-hand side of the equation (26) causes $K_{st}$ to be included in a second-order coefficient in a characteristic polynomial of the equation (32). Therefore, in order to eliminate $K_{st}$ from the second-order coefficient in the characteristic polynomial of the equation (26), as illustrated in FIG. 45, a control path (H) that cancels a spring reaction force, that is, a control path (H) that directly adds the detected pressure (ForceFB) to a torque command may be added.

Figure 45:
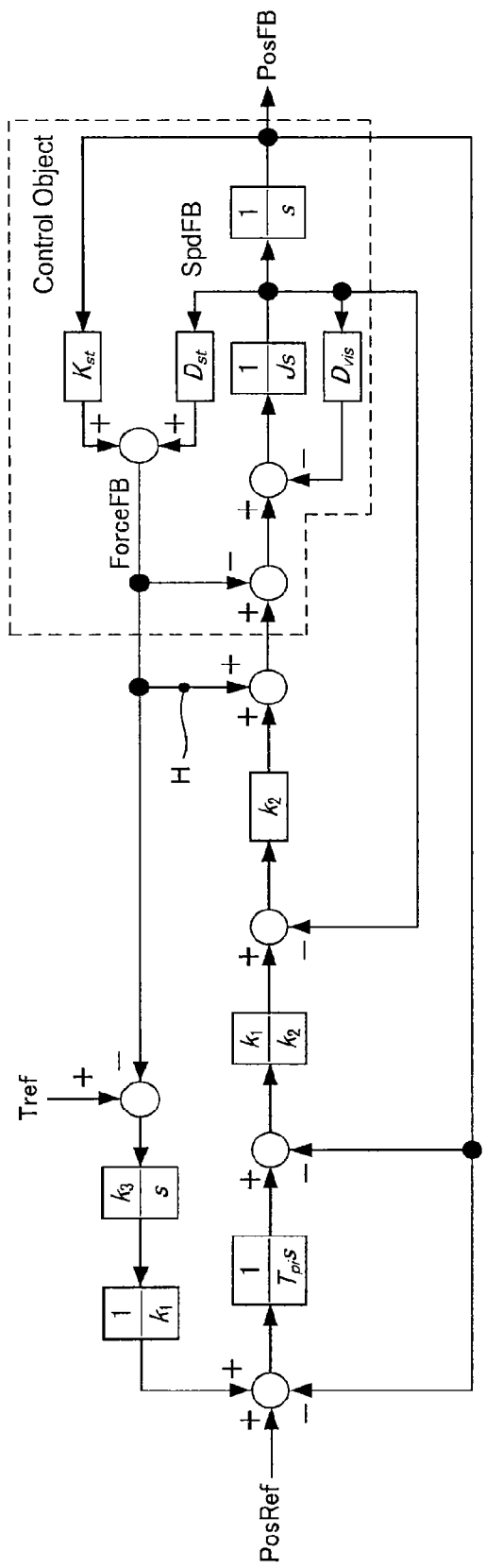
FIG. 45 is a block diagram in a case where a control path for loop stabilization has been added to the control block of FIG. 28.

A transfer function from the high-level pressure command (Tref) to the detected pressure (ForceFB) in the case of FIG. 45 is the following equation (33):

$$\frac{\frac{D_{st}k_3}{JT_{pi}}s + \frac{K_{st}k_3}{JT_{pi}}}{s^4 + \frac{1}{J}(D_{vis} + k_2)s^3 + \frac{k_1}{J}s^2 + \frac{1}{JT_{pi}}(k_1 + D_{st}k_3)s + \frac{K_{st}k_3}{JT_{pi}}}. \quad (33)$$

As compared to the equation (31), in the equation (32), $D_{st}$ (in the third-order coefficient) and $K_{st}$ (in the second-order coefficient) are eliminated from the characteristic polynomial.

As illustrated in FIG. 45, by adding the control path (H) to the control block of the position control base, formulas of the above-described equations (26)-(29) for which the pole placement method is applied are as follows:

$$k_1 = 6\omega^2 J, \quad (26)'$$

$$k_2 = 4\omega J, \quad (27)'$$

$$k_3 = \frac{\omega k_1}{4 K_{st}}, \quad (28)'$$

$$T_{pi} = \frac{k_1}{4\omega^3 J}. \quad (29)'$$

In the above equations, only the equation (26) is changed to the equation (26)'. The term ($-K_{st}$) of the spring constant in the equation (26) is eliminated. Therefore, all the gains always take positive values. That is, even when the sensor is in a non-contact state (position control), the control loop is a negative feedback. Therefore, the control loop can be stabilized. In this way, without affecting characteristics of the control object in both the pressure control feedback and the position control, stable gains can be obtained.

Application of Low Pass Filter

Figure 46:
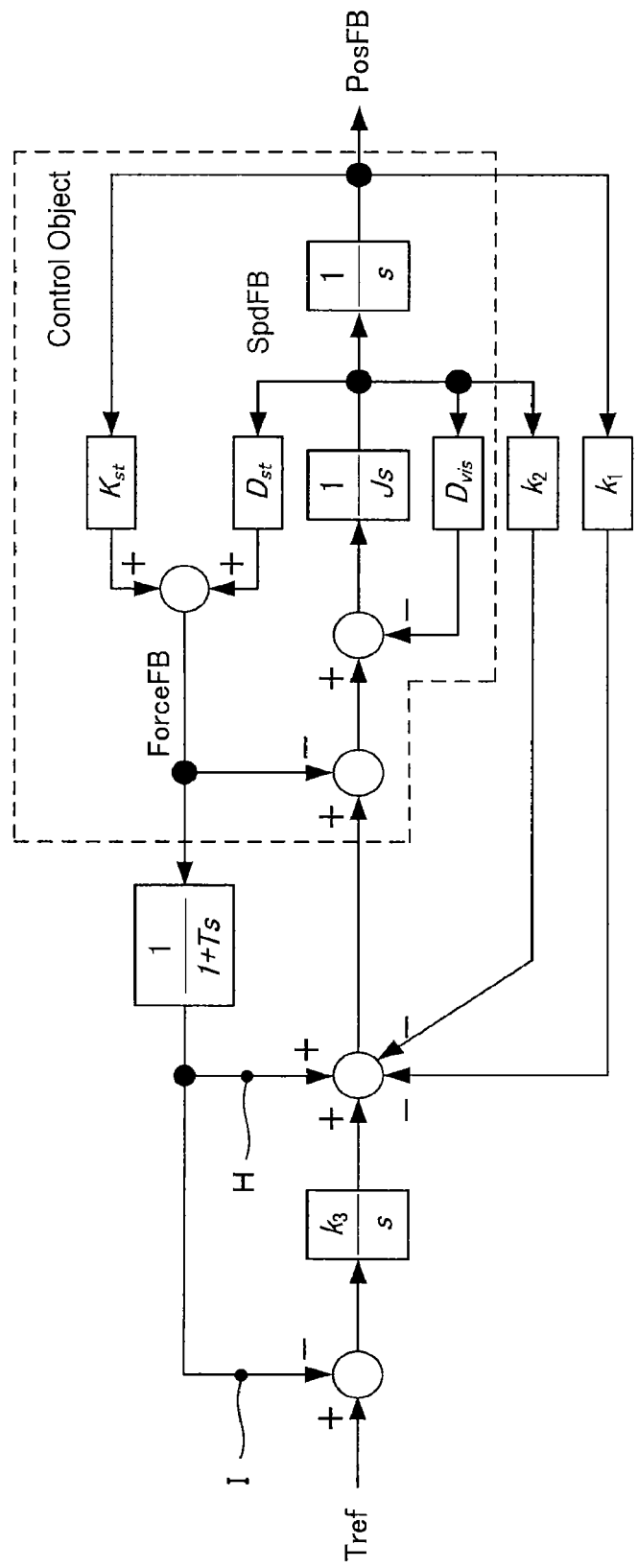
FIG. 46 is a block diagram in a case where one low pass filter has been added to a detected pressure with respect to a control block of FIG. 43.

For example, when the output of the pressure sensor 35 is analog, in order to prevent vibration due to sensor noise, as illustrated in FIG. 46 that corresponds to the above-described FIG. 43, a low pass filter (1/(1+Ts)) is often applied to the detected pressure (ForceFB). Usually, a cutoff frequency in the case where a low pass filter is applied for a purpose of noise reduction is often in a range about from several hundreds of Hz to several kHz. Therefore, there is no need to consider a control response frequency of the pressure control.

However, when the cutoff frequency is set to about several tens of Hz (or less), the control path (H) that is added in the present examination becomes an over compensation, and overshoot in the pressure control feedback loop may occur. This is because the low pass filter affects both the control path (H) that is added in the present examination and a path (I) for taking a pressure deviation relative to the high-level pressure command (Tref) and thereby causing the overshoot. Here, the control path (H) has a role of canceling a reaction force against the machine, and the path (I) for taking the pressure deviation determines a capability of following the high-level pressure command (Tref). That is, when delay in the control path (H) is not minimized, the objective cannot be achieved. On the other hand, influence of delay in the path (I) for taking the pressure deviation can also be regarded as lowering a command following gain. Therefore, even when the delay is large, it does not cause a significant problem.

Figure 47:
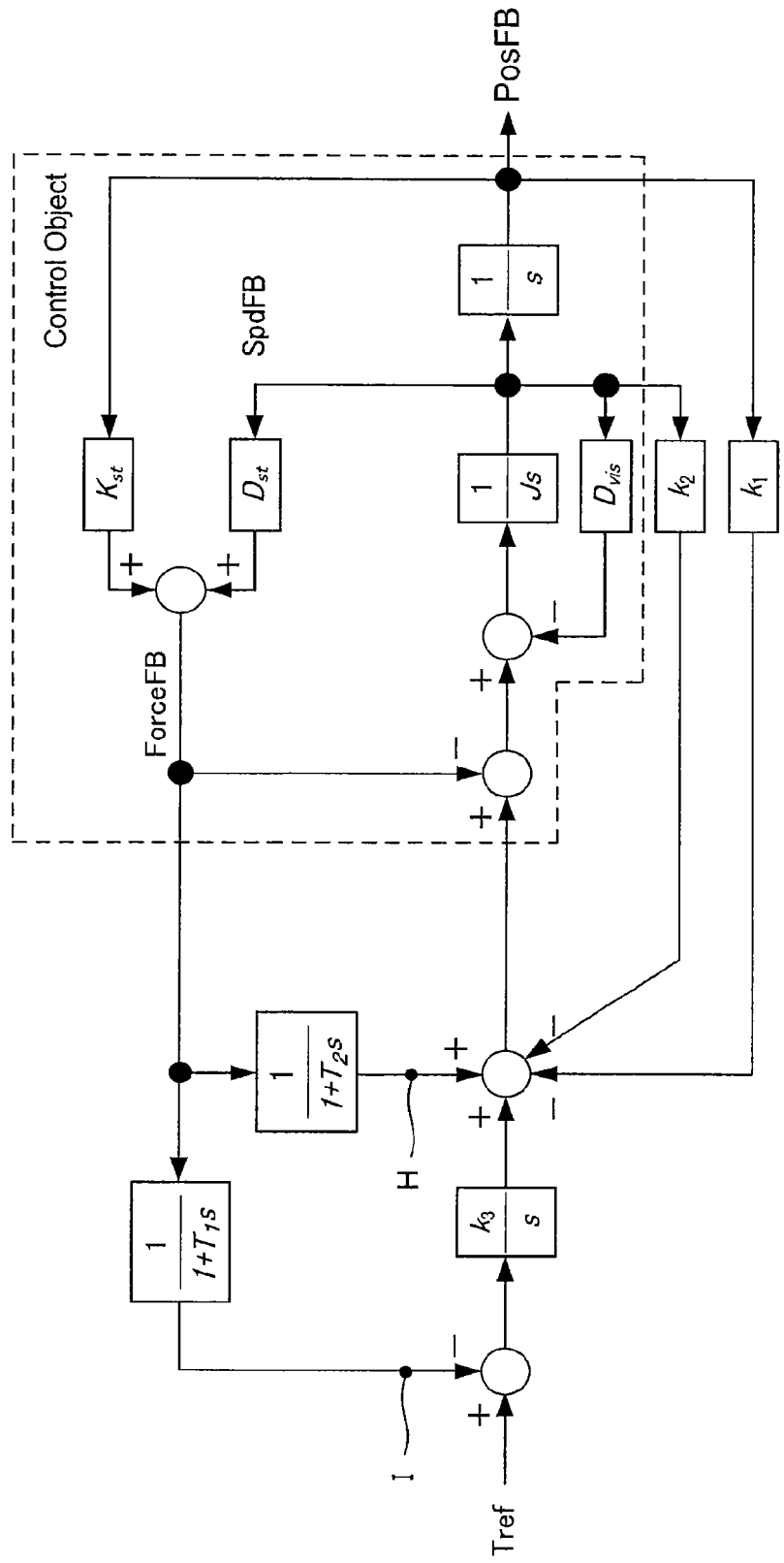
FIG. 47 is a block diagram in a case where, with respect to the control block of FIG. 43, low pass filters have been respectively added to a control path and to a path for obtaining a pressure deviation.

Thus, as illustrated in FIG. 47, low pass filters are separately provided in the control path (H) and in the path (I) for taking the pressure deviation. A time constant ($T_2$) of the low pass filter on the control path (H) is set to be relatively small (for example, $T_2$=0.3 ms), and a time constant ($T_1$) of the low pass filter on the path (I) for taking the pressure deviation is set to be relatively large (for example, $T_1$=3 ms). Thereby, occurrence of the above-described overshoot can be suppressed. This examination is not limited to the control block of the force control base, but can also be similarly applied to control blocks of the speed control base and the position control base (not illustrated in the drawings).

Figure 48:
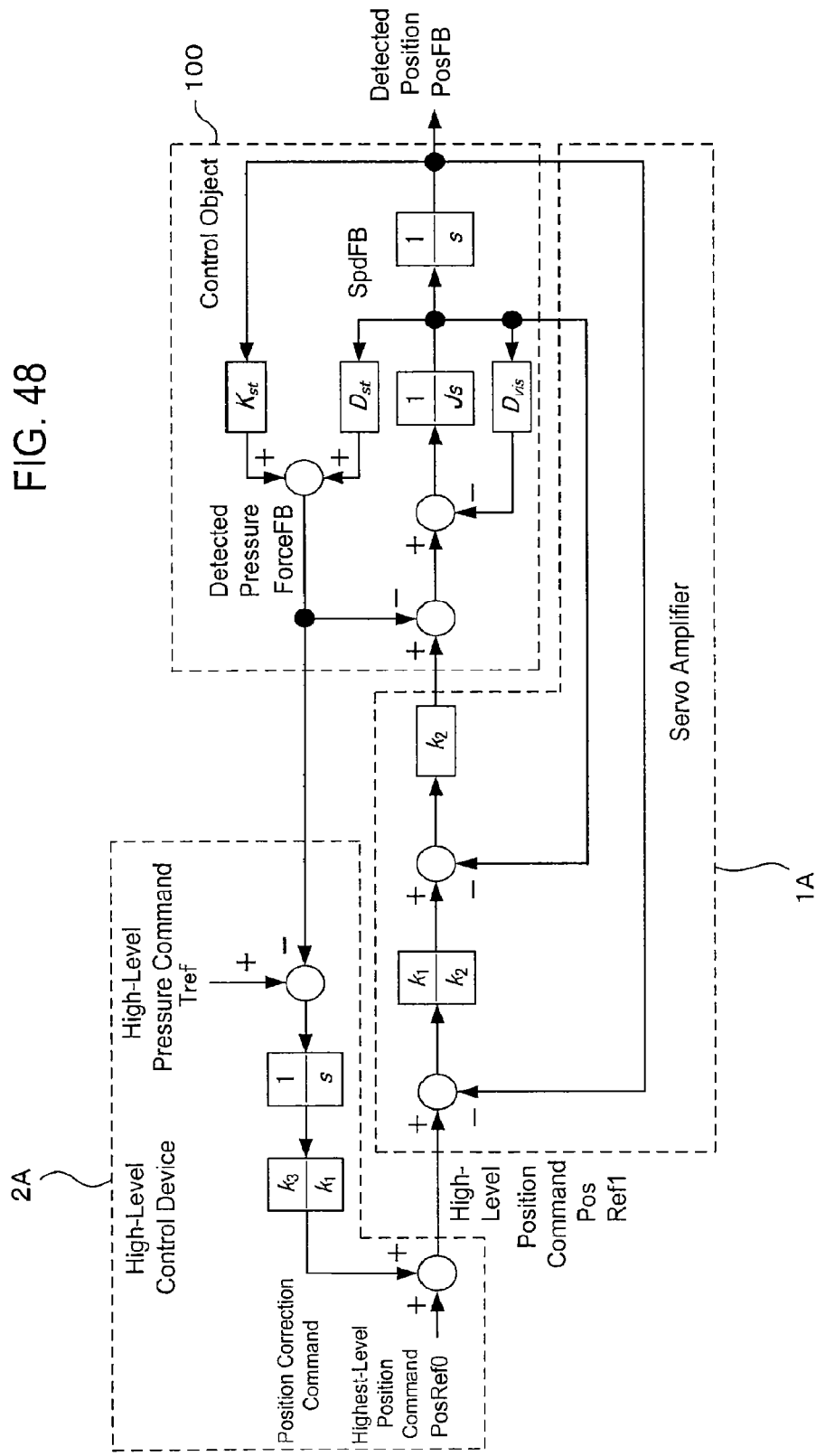
FIG. 48 is a block diagram illustrating a system structure in a case where a pressure control feedback loop is shared by a high-level control device.

Case where Pressure Control Feedback Loop is Shared on High-Level Control Device Side In the above embodiment, the servo amplifier 1 is a single body and has a three-loop structure that includes the position control feedback loop, the speed control feedback loop and the pressure control feedback loop. However, the present invention is not limited to this. For example, as illustrated in FIG. 48 that corresponds to the above-described FIG. 1, it is also possible that only the pressure control feedback loop is provided on a high-level control device (2A) side. In this case, the detected pressure (ForceFB) from the pressure sensor is directly input to the high-level control device (2A). Based on a pressure deviation between the detected pressure (ForceFB) and a high-level pressure command (Tref) that is generated inside the high-level control device (2A), the pressure controller that is formed using software generates a position correction command. Then, the position correction command is added to a highest-level position command (PosRef0) that is generated inside the high-level control device (2A) and the result so obtained is input as a high-level position command (PosRef1) to a servo amplifier (1A). In this way, even when the pressure control feedback loop is shared on the high-level control device (2A) side, the pressure control feedback loop functions in the same way as in the above embodiment. In this case, a combination of the high-level control device (2A) and the servo amplifier (1A) corresponds to a motor control apparatus described in the claims.

Effect in the Present Examination

According to the examination described above, as illustrated in FIG. 6, the model of the control object that includes the motor and the pressure sensor is structured using the method of state feedback, and, as illustrated in FIG. 8, the various gains of a pressure control feedback loop are set corresponding to the control object model. That is, the control object model is formed in which the detected speed (SpdFB) and the detected position (PosFB) are state quantities of the control object, and the detected pressure (ForceFB) is an observable of the control object. By forming the control object model in this way, the block structure of the pressure control feedback loop can be simplified, and the various gains for realizing the stabilization and the command responsiveness of the block structure can be easily adjusted. As a result, a functional constant pressure control can be realized.

Further, according to the above examination, the pressure control feedback loop is formed such that a value as a torque command is input to the control object, the value being obtained by multiplying a deviation between the high-level pressure command (Tref) that is externally input and the detected pressure (ForceFB) by the gain ($k_3$) and integrating the resulting value and then subtracting from the resulting value a product of the detected position (PosFB) and the gain ($k_1$) and a product of the detected speed (SpdFB) and the gain ($k_2$) (see FIG. 12). By forming the pressure control feedback loop in this way, the pressure control can be realized in which, corresponding to behaviors of the detected speed (SpdFB) and the detected position (PosFB), which are the state quantities of the control object, the detected pressure (ForceFB), which is an observable, is caused to gradually approach the high-level pressure command (Tref), which is a target pressure. In particular, by integrating the deviation between the high-level pressure command (Tref) and the detected pressure (ForceFB), a steady-state deviation can be eliminated.

Further, according to the above examination, by setting the gains such that the relation $$k_1 > J \cdot K_{st} \cdot k_3 / k_2 - K_{st} \quad (5)'$$

is satisfied, the stability of the pressure control feedback loop with respect to the control object can be ensured.

Further, according to the above examination, by setting the gains such that the relations $$k_1 \approx 3\omega^2 - K_{st} \quad (14)$$

$$k_2 \approx 3\omega \cdot J \quad (15)$$

$$k_3 \approx (J/K_{st}) \cdot \omega^3 \quad (16)$$

are satisfied, the optimum values of the gains as functions of one parameter, the response frequency ($\omega$), can be easily set.

Further, according to the above examination, the speed control feedback loop can be additionally extended in which, by multiplying the gain ($k_2$) by the deviation between the detected speed (SpdFB) and the high-level speed command (SpdRef) that is externally input, the detected speed (SpdFB) can be caused to gradually approach the high-level speed command (SpdRef), which is a target speed (see FIG. 17 and the like).

Further, according to the above examination, the position control feedback loop can be additionally extended in which, by multiplying the gain ($k_1$) by the deviation between the detected position (PosFB) and the high-level position command (PosRef) that is externally input, the detected position (PosFB) can be caused to gradually approach the high-level position command (PosRef), which is a target position (see FIG. 26 and the like).

Further, according to the above examination, by multiplying the gain ($k_1$) by a result obtained by integrating the deviation between the detected position (PosFB) and the high-level position command (PosRef), a positional displacement due to a steady-state disturbance in the position control feedback loop can be avoided and, for example, application to the multiaxial synchronous control becomes possible (see FIGS. 28 and 37). In other words, in the case of the above embodiment, the position controller is provided with an integrator ($1/T_{pi}s$) (not particularly illustrated in the drawings).

Figure 44:
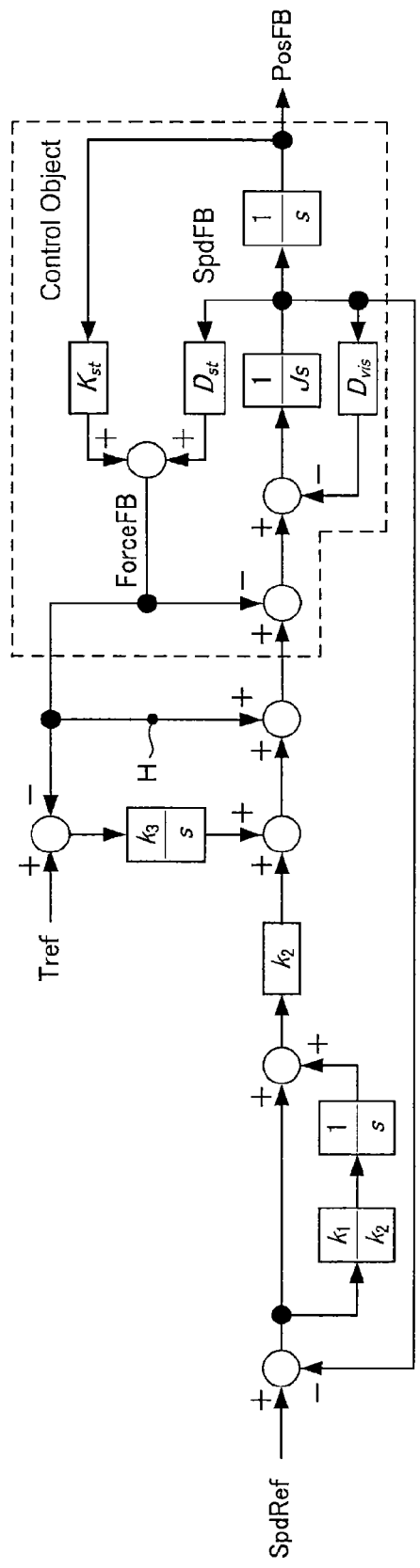
FIG. 44 is a block diagram in a case where a control path for loop stabilization has been added to a control block of FIG. 19.

Further, according to the above examination, in the speed control feedback loop, by adding the detected pressure (ForceFB) to the torque command and inputting the resulting command to the motor, even when the pressure sensor is in a non-contact state (position control), the position control feedback loop is a negative feedback and is stable (see FIGS. 44 and 45). As a result, in both the pressure control and the position control, without affecting the characteristics of the control object, the gains that allow stabilization to be realized can be set.

Further, according to the above examination, the high-level control device (2A) executes: generating a pressure deviation between the generated high-level pressure command (Tref) and the detected pressure (ForceFB); generating a position correction command by inputting the pressure deviation to the pressure controller $((1/s)\cdot(k_3/k_1))$; and adding the position correction command to the generated highest-level position command (PosRef0) and inputting the resulting command as the high-level position command (PosRef1) to the servo amplifier (1A). As a result, the function of the pressure control feedback loop can be shared on the high-level control device (2A) side. Therefore, the position control and the pressure control can be switched and executed using the common servo amplifier (1A) that is provided with only the position control feedback loop and the speed control feedback loop.

In the above description, "equal" does not mean "equal" in a strict sense. That is, "equal" means "substantially equal" when tolerances and errors in design and in manufacturing are within allowed ranges.

Further, in addition to those already described above, methods according to the above-described embodiment and modified embodiments may also be appropriately combined and utilized.

In order for a pressure control feedback loop to operate stably and with high command responsiveness, it is desirable that various gains be strictly adjusted, and settings of these control gains greatly depend on a block structure of the pressure control feedback loop. In this regard, in the conventional technologies, a block structure of a pressure control feedback loop tends to become complicated and gain adjustment is difficult.

Further, when a position control feedback loop and a pressure control feedback loop, which are separately provided, are switched and utilized, due to differences in block structures and various gains between the two feedback loops, linearity is not maintained. Therefore, depending on some condition, an impact occurs during the switching.

A motor control apparatus according to an embodiment of the present invention, a motor control method according to an embodiment of the present invention and a motor control program according to an embodiment of the present invention allow functional constant pressure control to be realized.

A motor control apparatus that performs pressure control by drive of a motor according to one aspect of the present invention includes a pressure control feedback loop that corresponds to a control object model that is provided with the motor and a pressure sensor. The control object model: outputs, as a detected speed of the motor, a value that is obtained based on an input pressure command, a sensor reaction force, a movable part viscous damping force and a movable part mass, and outputs, as a detected position of the motor, a value that is obtained by integrating the detected speed; uses, as the movable part viscous damping force, a value that is obtained by multiplying the detected speed by a movable part viscous damping coefficient; uses, as a sensor viscous damping pressure, a value that is obtained by multiplying the detected speed by a sensor viscous damping coefficient; uses, as a sensor spring pressure, a value that is obtained by multiplying the detected position by a sensor spring constant; outputs, as a detected pressure of the pressure sensor, a value that is obtained by adding the sensor spring pressure to the sensor viscous damping pressure; and uses, as the sensor reaction force, the detected pressure.

Further, a motor control apparatus for controlling a motor that drives a control object that is provided with a pressure sensor according to another aspect of the present invention includes: a position control feedback loop that inputs, to a position controller, a position deviation between a high-level position command that is externally input and a detected position of the motor, and generates a speed command; a speed control feedback loop that inputs, to a speed controller, a speed deviation between the speed command and an output speed of the motor, and generates a torque command and inputs the torque command to the motor; and a pressure control feedback loop that inputs, to a pressure controller, a pressure deviation between a high-level pressure command that is externally input and a detected pressure that is detected from the pressure sensor, and generates a position correction command and adds the position correction command to the high-level position command.

Further, a motor control method according to another aspect of the present invention, in which the high-level position command and the high-level pressure command are input to a servo amplifier that corresponds to a motor control apparatus, includes: inputting the high-level position command until the pressure sensor is at a position that is close to a planned contact position of the pressure sensor while the high-level pressure command is set to a value that is substantially equal to 0; and, after the pressure sensor is positioned at a proximity position of the planned contact position, inputting the high-level pressure command at a predetermined value while the high-level position command is set to the proximity position.

Further, a motor control program according to another aspect of the present invention, which is executed by a processor that is provided in a high-level control device that inputs the high-level position command and the high-level pressure command to a servo amplifier that corresponds to a motor control apparatus, allows the following to be executed: inputting the high-level position command until the pressure sensor is at a position that is close to a planned contact position of the pressure sensor while the high-level pressure command is set to a value that is substantially equal to 0; and, after the pressure sensor is positioned at a proximity position of the planned contact position, inputting the high-level pressure command at a predetermined value while the high-level position command is set to the proximity position.

Further, a motor control method according to another aspect of the present invention, in which a high-level position command is input to a servo amplifier that has a position control feedback loop and controls a motor, includes: generating a pressure deviation between a generated high-level pressure command and a detected pressure that is detected from a control object that includes the motor; generating a position correction command by inputting the pressure deviation to a pressure controller; and inputting to the servo amplifier a value obtained by adding the position correction command to a generated high-level position command.

Further, a motor control program according to another aspect of the present invention, which is executed by a processor that is provided in a high-level control device that inputs a high-level position command to a servo amplifier that has a position control feedback loop and controls a motor, allows the following to be executed: generating a pressure deviation between a generated high-level pressure command and a detected pressure that is detected from a control object that includes the motor; generating a position correction command by inputting the pressure deviation to a pressure controller; and inputting, to the servo amplifier, a value obtained by adding the position correction command to a generated high-level position command.

According to an embodiment of the present invention, functional constant pressure control becomes possible.

Obviously, numerous modifications and variations of the present invention are possible in light of the above teachings. It is therefore to be understood that within the scope of the appended claims, the invention may be practiced otherwise than as specifically described herein.

What is claimed is:

1. A motor control apparatus for controlling a motor that performs pressure control, comprising:
   processing circuitry configured to:
      calculate a movable part viscous damping force by multiplying a detected speed, obtained from a sensor detecting characteristics of the motor, by a movable part viscous damping coefficient,
      calculate a sensor viscous damping pressure by multiplying the detected speed, obtained from the sensor detecting characteristics of the motor, by a sensor viscous damping coefficient,
      calculate a position of the motor by integrating the detected speed obtained from the sensor detecting characteristics of the motor,
      output the calculated position of the motor,
      calculate a sensor spring pressure by multiplying the calculated position of the motor by a sensor spring constant,
      calculate a pressure by adding the calculated sensor spring pressure to the calculated sensor viscous damping pressure,
      output the calculated pressure,
      calculate an updated speed of a motor based on an input pressure command, a sensor reaction force generated from the calculated pressure, the calculated movable part viscous damping force, and a movable part mass, and
      output the calculated updated speed.

2. The motor control apparatus according to claim 1, wherein the processing circuitry is configured to receive a high-level pressure command that is externally input, and calculate the input pressure command by multiplying a deviation between the high-level pressure command and the calculated pressure by a third gain, integrating a resulting value, and subtracting from the resulting value a product of the calculated position and a first gain and a product of the detected speed and a second gain.

3. The motor control apparatus according to claim 2, wherein the first gain, second gain and third gain are set to satisfy a relationship, $k_1 > J \cdot K_{st} \cdot k_3 / k_2 - K_{st}$, where J represents the movable part mass, $K_{st}$ represents the sensor spring constant, $k_1$ represents the first gain, $k_2$ represents the second gain, and $k_3$ represents the third gain.

4. The motor control apparatus according to claim 3, wherein the first gain, second gain and third gain are set to satisfy relationships, $k_1 \approx 3\omega^2 \cdot J - K_{st}$, $k_2 \approx 3\omega \cdot J$, and $k_3 \approx (J/K_{st}) \cdot \omega^3$, where $\omega$ represents a response frequency.

5. The motor control apparatus according to claim 2, wherein the circuitry is configured to multiply the second gain by a deviation between the detected speed and the high-level speed command that is externally input.

6. The motor control apparatus according to claim 2, wherein the circuitry is configured to multiply a deviation between the calculated position and the high-level position command that is externally input.

7. The motor control apparatus according to claim 6, wherein the circuitry is configured to integrate a deviation between the calculated position and the high-level position command and multiply the first gain by a resulting value.

8. The motor control apparatus according to claim 3, wherein the circuitry is configured to multiply the second gain by a deviation between the detected speed and the high-level speed command that is externally input.

9. The motor control apparatus according to claim 3, wherein the circuitry is configured to multiply a deviation between the calculated position and the high-level position command that is externally input.

10. The motor control apparatus according to claim 9, wherein the circuitry is configured to integrate a deviation between the calculated position and the high-level position command and multiply the first gain by a resulting value.

11. The motor control apparatus according to claim 4, wherein the circuitry is configured to multiply the second gain by a deviation between the detected speed and the high-level speed command that is externally input.

12. The motor control apparatus according to claim 4, wherein the circuitry is configured to multiply a deviation between the calculated position and the high-level position command that is externally input.

13. The motor control apparatus according to claim 12, wherein the circuitry is configured to integrate a deviation between the calculated position and the high-level position command and multiply the first gain by a resulting value.

14. A motor control apparatus for controlling a motor that drives a control object with a pressure sensor, comprising:
   circuitry configured to
      calculate a position deviation between a high-level position command that is externally input and a detected position of a motor, obtained from a sensor detecting characteristics of the motor, that drives a control object,
      calculate a speed command based on the position deviation,
      calculate a speed deviation between the speed command and an output speed of the motor,
      calculate a torque command based on the speed deviation, input the torque command to the motor, calculate a pressure deviation between a high-level pressure command that is externally input and a detected pressure that is detected from a pressure sensor of the control object, calculate a position correction command based on the pressure deviation, and add the position correction command to the high-level position command to calculate the position deviation.

15. The motor control apparatus according to claim 14, wherein the circuitry includes integrator circuitry configured to integrate the pressure deviation.

16. The motor control apparatus according to claim 14, wherein the circuitry includes proportioning circuitry configured to multiply the position deviation.

17. The motor control apparatus according to claim 14, wherein the circuitry is configured to add the detected pressure to the torque command and input a resulting value to the motor.

18. The motor control apparatus according to claim 15, wherein the circuitry includes proportioning circuitry configured to multiply the position deviation.

19. The motor control apparatus according to claim 15, wherein the circuitry is configured to add the detected pressure to the torque command and input a resulting value to the motor.

20. A method for controlling a motor that drives a control object with a pressure sensor, comprising:

calculating a position deviation between a high-level position command that is externally input and a detected position of a motor that drives a control object;

calculating a speed command based on the position deviation;

calculating a speed deviation between the speed command and an output speed of the motor;

calculating a torque command based on the speed deviation;

inputting the torque command to the motor;

calculating a pressure deviation between a high-level pressure command that is externally input and a detected pressure that is detected from a pressure sensor of the control object;

calculating a position correction command based on the pressure deviation; and adding the position correction command to the high-level position command to calculate the position deviation.

* * * * *